(12) United States Patent  (10) Patent No.: US 8,446,046 B2
Fells et al.  (45) Date of Patent: May 21, 2013

(54) POWER SYSTEM

(75) Inventors: Julian Andrew John Fells, West Sussex (GB); David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 836 days.

(21) Appl. No.: 12/572,296

(22) Filed: Oct. 2, 2009

(65) Prior Publication Data

US 2010/0084918 A1 Apr. 8, 2010

Related U.S. Application Data

(60) Provisional application No. 61/102,602, filed on Oct. 3, 2008, provisional application No. 61/142,745, filed on Jan. 6, 2009.

(51) Int. Cl.
  *H01F 37/00* (2006.01)
  *H01F 38/00* (2006.01)
(52) U.S. Cl.
  USPC .......................................................... 307/104
(58) Field of Classification Search
  USPC .......................................................... 307/104
  See application file for complete search history.

(56) References Cited

U.S. PATENT DOCUMENTS

| | | | |
|---|---|---|---|
| 4,654,573 A | 3/1987 | Rough et al. | |
| 5,367,242 A | 11/1994 | Hulman | |
| 5,905,372 A | 5/1999 | Kuffner et al. | |
| 6,028,413 A | 2/2000 | Brockmann | |
| 6,330,175 B2 | 12/2001 | Shirato et al. | |
| 6,445,936 B1 | 9/2002 | Cannon et al. | |
| 6,665,520 B2 | 12/2003 | Romans | |
| 6,671,525 B2 | 12/2003 | Allen et al. | |
| 7,253,601 B2 * | 8/2007 | Ishio | 324/117 H |
| 2008/0157603 A1 | 7/2008 | Baarman et al. | |
| 2009/0001932 A1 | 1/2009 | Kamijo et al. | |
| 2009/0015210 A1 | 1/2009 | Kojima | |
| 2009/0284369 A1 | 11/2009 | Toncich et al. | |
| 2010/0171367 A1 | 7/2010 | Kitamura et al. | |

FOREIGN PATENT DOCUMENTS

| | | |
|---|---|---|
| EP | 0357829 | 3/1990 |
| EP | 0886363 | 12/1998 |

(Continued)

OTHER PUBLICATIONS

International Search Report and Written Opinion for International Application No. PCT/US2009/059310, mailed Mar. 31, 2010.

*Primary Examiner* — Hal Kaplan
(74) *Attorney, Agent, or Firm* — Warner Norcross & Judd LLP

(57) ABSTRACT

The present invention provides methods and apparatus for reducing power consumption. One method includes detecting the presence of an object, identifying whether the object is a valid device and restricting power if its not a valid device. Another method includes temporarily applying a low amount of power to the primary unit to detect a load, supplying more power to determine if its a valid secondary device, and restricting power if its not. An apparatus for reducing power consumption includes two power inputs, where the lower power input powers a sense circuit. A switch selectively decouples the higher power input from the primary subcircuit during detection mode and couples the higher power input to the primary subcircuit during power supply mode.

51 Claims, 46 Drawing Sheets

FOREIGN PATENT DOCUMENTS

| | | |
|---|---|---|
| EP | 1962402 | 8/2008 |
| JP | 09-103037 | 4/1997 |
| JP | 09103037 | 4/1997 |
| WO | 2006001557 | 1/2006 |
| WO | WO 2006/106310 | 10/2006 |
| WO | WO 2008/037428 | 4/2008 |

* cited by examiner

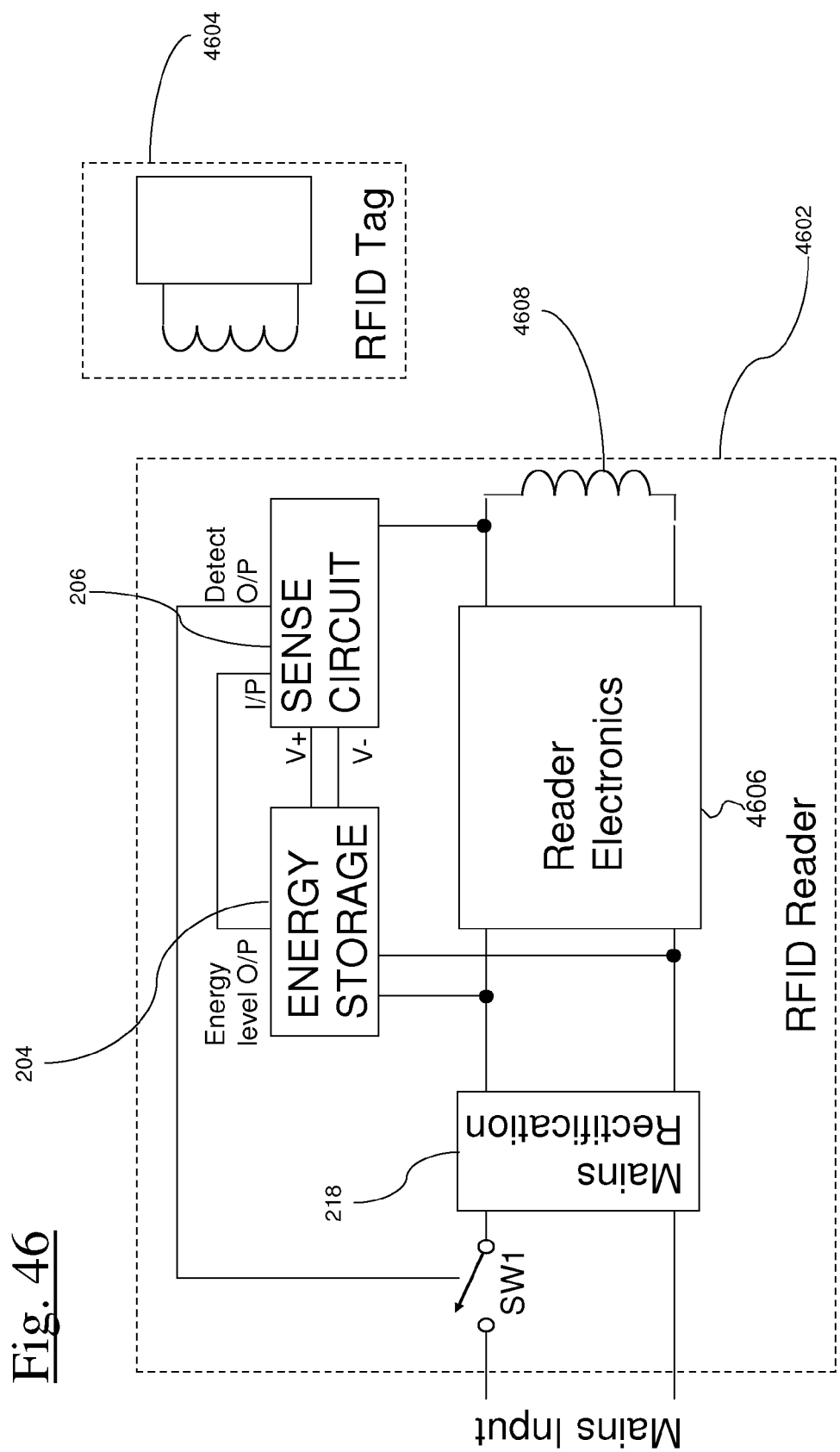

POWER SYSTEM

BACKGROUND OF THE INVENTION

It is more convenient to be able to power portable devices without the need to plug in a traditional power cable into the device. For example some wireless power systems include a portable device that when placed near a wireless power supply unit can receive power without the need for a direct electrical contact. However, when there is no device on the unit (or when the only devices on the unit are fully charged) it is possible to keep the power consumption at a minimum.

Some wireless power units have a standby mode, whereby it periodically transmits power for a short period to look for devices. If the unit detects a valid device that is requesting power and determines that there are no foreign objects that would get hot or hinder power transfer in the vicinity then the unit may come out of standby. The power level of the pulses in standby mode are sufficiently high to transfer enough power to the portable device so that it can communicate back, because it is possible that the device's batteries may be fully depleted. The length of the pulses are long enough to determine that the device is a valid device and that there are no foreign objects present that may get hot or otherwise interfere with the system. The time between the pulses is short enough that the user gets quick feedback that the unit is operational. There is therefore a limit to how low the power consumption can be during standby.

In addition to the power for determining the presence of devices to be powered, there are practical limitations that increase the power consumption. For instance, in some inductive power supplies a DC power source is used even between the transmitted pulses. This means that mains rectification losses are always present and can be considerable. In some scenarios, multiple DC voltages are used and it would not be practical to start these up within the pulse duration, so DC conversion losses might always be present. The microprocessor in the unit that drives the pulse width modulation for the inverter typically is relatively high performance and consumes a certain amount of power continuously.

These and other factors make it challenging for a wireless power system to have low standby power. One attempted solution is to have a switch, so that the user switches the unit on before placing a device on it. However, this considerably detracts from the main benefit the system provides—the convenience of just putting the device on the wireless power supply. With careful design it is possible to achieve standby powers as low as 0.5 W. However, there is a desire for these figures to be reduced further. A typical mobile phone charger may only be used for 3 hours a week and spend the rest of the time in standby. Assuming an average of 4 W consumption during charging and 0.5 W during standby, the annual energy consumption would be 0.624 kWH to charge the phone and 4.38 kWH whilst in standby. This means that seven times as much energy is wasted in standby compared to the energy used. The impact of shipping 100M units (10% of annual cell phone sales in 2007) would mean approximately 50 MW of power generation capacity just to service the standby. There is increasing awareness that energy wastage through electronic devices left on standby may contribute to climate change. As a result there are initiatives to reduce the power consumption of electronic devices whilst in standby.

There have been several devices aimed at reducing the standby power of televisions and other appliances using remote controls (U.S. Pat. No. 6,330,175, WO2006106310). However, these are not applicable to wireless power systems.

In addition to wireless power systems, other systems for example contactless card systems also suffer from power wastage in standby.

SUMMARY OF THE INVENTION

The present invention is directed to methods and apparatuses for reducing power consumption in a wireless power supply.

One embodiment of a method for reducing power consumption includes detecting the presence of an object within proximity of a primary unit, sending a pulse of power to the object in response to detecting presence, determining whether a valid secondary device is present in proximity to the primary unit in response to sending the pulse of power to the object, and in response to a determination that a valid secondary device is not present, restricting power supplied to the primary unit.

Another embodiment of a method for reducing power consumption includes applying a pulse of low power to the primary unit, detecting whether there is a draw of power in the primary unit indicative of a load within proximity of the primary unit, upon detecting a load, supplying power to the primary unit at a higher level than the pulse of low power, determining whether a valid secondary device is present in proximity to the primary unit in response to the supply of power at the higher level, and in response to a determination that a valid secondary device is not present, restricting power supplied to the primary circuit.

One embodiment of a primary unit includes a first power input, a second power input, a primary subcircuit capable of transferring power to a secondary device, a switch, and a sense circuit. The first power input supplies power during power supply mode and the second power input supplies power during detection mode. The second power input provides less power than the first power input. The switch selectively couples and decouples the first power input to the primary subcircuit. The sense circuit is powered by the second, lower, power input and detects the presence of an object within proximity of the primary unit. During detection mode the operates the switch to decouple the primary subcircuit from the first power input. Accordingly, the primary unit consumes less power during detection mode than during power supply mode.

Another embodiment of a primary unit includes a power supply circuit, a detection circuit, a switch to selectively couple and decouple the power supply circuit to a supply of power, and a control circuit. The power supply circuit wirelessly transfers power to a secondary device during a power supply mode. The detection circuit detects the presence of an object within proximity of the primary unit during a detection mode. The control circuit alternately operates the primary unit in detection mode and power supply mode. During detection mode, the control circuit operates the switch to decouple the power supply circuit from the supply of power. The primary unit consumes less power during detection mode than power supply mode.

One embodiment for reducing power consumption includes providing a primary unit capable of selectively operating in a detection mode, an identification mode, and a power supply mode. The method also includes detecting presence of an object within proximity of the primary unit during the detection mode, identifying the object during identification mode, and supplying power wirelessly to the secondary device during the power supply mode. The detection mode includes restricting the supply of power to at least a portion of the primary unit, detecting the presence of an object within proximity of the primary unit, and either staying in the detection mode or entering the identification mode in dependence upon the detecting. The identification mode includes identifying whether the detected object is a valid secondary device, upon identifying a valid secondary device entering the power supply mode, and upon failing to identify a valid secondary device entering the detection mode. The power supply mode includes supplying power to the primary unit at a higher level than during the detection mode, the higher level of power sufficient for the primary unit to function as a wireless power supply.

According to a first aspect of the invention there is provided a method for reducing the power drawn by a primary unit capable of interacting with a secondary device, separable from the primary unit, the method having the following modes:

the first mode comprising the steps of:
preventing or restricting the supply of power to the primary unit;
detecting changes in the number, type, position or distance of objects or object, in proximity to the primary unit;
upon detecting said changes, entering a second mode;
the second mode comprising the steps of:
supplying power to the primary unit at a higher level than the first mode;
identifying if there is a secondary device in proximity;
remaining in the second mode or entering the first mode in dependence upon the identification.

The first mode may use power from a different source than the second mode. For example, the first mode may take power from an energy storage element. The second mode may enter the first mode if there is no secondary device present. The second mode may also include the step of determining if the primary unit should interact with the secondary device and if not enter the first mode. The second mode may also determine if there are objects in addition to the secondary device and in consequence enter the first mode. The detection method may be different from the identification method. The detection method and/or identification method may determine an inductance or a change in inductance of the primary coil. For example, the detection method and/or identification method may determine the inductance or inductance change by measuring the frequency of an oscillator coupled to the primary coil.

According to a second aspect of the invention there is provided a method for reducing the power drawn by a primary unit used to transfer power and/or information wirelessly to/from a secondary device, the secondary device being separable from the primary unit, the method having the following modes:

the first mode comprising the steps of:
preventing or restricting the supply of power to the primary unit;
detecting changes in the number or position of objects or object, in proximity to the primary unit;
upon detecting said changes, entering a second mode;
the second mode comprising the steps of:
supplying power to the primary unit at a higher level than the first mode;
identifying if there is a secondary device in proximity;
upon identifying that there is a secondary device entering a third mode;
the third mode comprising the steps of:
supplying power to the primary unit at a higher level than the first mode;
transferring power and/or information between the primary unit and the secondary device.

The first mode may take power from a different source to the second mode and/or third mode. For example, the first and/or second mode may take power from an energy storage element. The third mode may supply power to the primary unit at a higher level than the second mode. The second mode may enter the first mode if there is no secondary device present and the third mode if there is a secondary device present. The second mode may also include the step of determining if the primary unit should interact with the secondary device before entering the third mode. The second mode may also determine if there are objects in addition to the secondary device and in consequence enter the first mode. The third mode may also determine that the primary unit and secondary device have finished transferring power and/or information and enter the first or second mode.

According to a third aspect of the invention there is provided a method for reducing the power drawn by a primary unit capable of interacting with a secondary device, separable from the primary unit, the method having the following modes:

the first mode comprising the steps of:
preventing or restricting the supply of power from the power supply to the primary unit;
taking power from an energy storage element, separate from said power supply; identifying if there is a secondary device in proximity;
upon determining that there is a secondary device entering a second mode;
the second mode comprising the steps of:
supplying power to the primary unit from the power supply;

The first mode may detect that an object is in proximity before identifying whether or not it is a secondary device. For example, the second mode may additionally supply power to the energy storage element to recharge it.

There may also be a third mode which is entered from the second mode if the energy storage unit goes below a predetermined threshold, the mode comprising the steps of: supplying power to the energy storage element to recharge it; detecting or identifying if there is a secondary device in proximity; upon determining that there is a secondary device entering said second mode; entering said first mode if the energy storage unit becomes fully charged.

According to a fourth aspect of the invention there is provided a method for reducing the power drawn by a primary unit used to transfer power and/or information wirelessly to/from a secondary device, the secondary device being separable from the primary unit, the method comprising the following modes:

the first mode comprising the steps of:
preventing or restricting the supply of power from the power supply to the primary unit;
taking power from an energy storage element;
detecting or identifying if there is a secondary device in proximity;
upon determining that there is a secondary device entering a second mode;
the second mode comprising the steps of:
supplying power to the primary unit at a higher level than the first mode;
transferring power and/or information between the primary unit and the secondary device.

The first mode may detect that an object is in proximity before identifying whether or not it is a secondary device. For example, the second mode may additionally supply power to the energy storage element to recharge it.

There may also be a third mode which is entered from the second mode if the energy storage unit goes below a predetermined threshold, the mode comprising the steps of: supplying power to the energy storage element to recharge it; detecting or identifying if there is a secondary device in proximity; upon determining that there is a secondary device entering said second mode; entering said first mode if the energy storage unit becomes fully charged.

According to a fifth aspect of the invention there is provided a primary unit for interacting with a secondary device, separable from the primary unit, with reduced power, the primary unit comprising:
- a detection unit for detecting the presence of an object in proximity to the primary unit;
- an identification unit for identifying a secondary device detected by said detection unit,
- at least one switch operable for stopping or restricting the supply of power to at least part of the primary unit.
- wherein the at least one switch is operated in dependence of the detection unit and/or the identification unit.

The detection unit may be the same as the identification unit or separate from the identification unit. The identification unit may require more power than the detection unit to operate. The identification unit may take its power from a different source to the detection unit. The detection unit and/or identification unit may take power from an energy storage element.

There may be first and second switches operable to supply power or increase the supply of power top the primary unit, the first switch activated by the detection unit and the second switch activated by the identification unit.

According to a sixth aspect of the invention there is provided a primary unit for transferring power and/or information wirelessly to/from a secondary device separable from the primary unit, with reduced power, the primary unit comprising:
- a detection unit for detecting the presence of an object in proximity to the primary unit;
- an identification unit for identifying a secondary device detected by said detection unit;
- at least one switch operable for stopping or restricting the supply of power to at least part of the primary unit;
- an antenna for transferring power and/or information between the primary unit and the secondary device;
- wherein the at least one switch is operated in dependence of the detection unit and/or the identification unit such that power is reduced when no secondary devices require power and/or information transfer.

The antenna may be coupled to the detection unit and/or the identification unit. The detection unit may be the same as the identification unit. The detection unit may be separate from the identification unit. The identification unit may require more power than the detection unit to operate. The identification unit may take its power from a different source to the detection unit. The detection unit and/or identification unit may take power from an energy storage element. The identification unit may take its power from a different source to the detection unit.

There may be first and second switches operable to supply power to the primary unit at different levels, the first switch activated by the detection unit and the second switch activated by the identification unit.

According to a seventh aspect of the invention there is provided a primary unit for interacting with a secondary device, separable from the primary unit, with reduced power, the primary unit comprising:
- a power input for receiving power from an external source;
- an energy storage unit;
- an identification unit for detecting and/or identifying a secondary device;
- a switch operable for stopping or restricting the supply of power from the power input to at least part of the primary unit;
- wherein in the absence of secondary devices in proximity to the primary unit, said switch is operated to stop or restrict power and the identification unit is powered from the energy storage unit;
- wherein upon the identification unit establishing a secondary device requiring interaction, the switch is operated to allow the supply of power from the power input.

The energy storage element may be recharged from the power input.

According to an eighth aspect of the invention there is provided a primary unit for transferring power and/or information wirelessly to/from a secondary device separable from the primary unit, with reduced power, the primary unit comprising:
- a power input for receiving power from an external source;
- an energy storage unit;
- an identification unit for detecting and/or identifying a secondary device;
- a switch operable for stopping or restricting the supply of power from the power input to at least part of the primary unit;
- an antenna for transferring power and/or information between the primary unit and the secondary device;
- wherein in the absence of secondary devices in proximity to the primary unit, said switch is operated to stop or restrict power and the identification unit is powered from the energy storage unit;
- wherein upon the identification unit establishing a secondary device requiring power and/or information, the switch is operated to allow the supply of power from the power input to the antenna.

The energy storage element may be recharged from the power input.

According to a ninth aspect of the invention there is provided a system for transferring power and/or information between a primary unit and a secondary device, separable from the primary unit, the system comprising:
- a primary unit, the primary unit comprising:
- a detection unit for detecting the presence of an object in proximity to the primary unit;
- a transceiver for transmitting and/or receiving information or power at least one switch operable for stopping or restricting the supply of power to at least part of the primary unit.
- a secondary device, the secondary device comprising:
- a transceiver for transmitting and/or receiving information or power;
- wherein when there are no secondary devices requiring power and/or information in proximity to the primary unit, the switch is operated to stop or restrict power;
- wherein upon the detection unit detecting the presence of an object, the primary unit receives information from any secondary devices that may be present;
- wherein upon the primary unit determining that there is a secondary device present, power and/or information is exchanged between the primary unit and the secondary device.

According to a tenth aspect of the invention there is provided a system for transferring power and/or information between a primary unit and a secondary device, separable from the primary unit, the system comprising:

a primary unit, the primary unit comprising:
  a power input for receiving power from an external source;
  an energy storage unit;
  an identification unit for detecting and/or identifying a secondary device;
  a switch operable for stopping or restricting the supply of power from the power input to at least part of the primary unit;
  an antenna for transferring power and/or information between the primary unit and the secondary device;
a secondary device, the secondary device comprising:
  an antenna for transferring power and/or information between the primary unit and the secondary device;
  wherein in the absence of secondary devices in proximity to the primary unit, said switch is operated to stop or restrict power and the identification unit is powered from the energy storage unit;
  wherein upon the identification unit establishing a secondary device requiring power and/or information, the switch is operated to allow the supply of power from the power input to the antenna.

According to an eleventh aspect of the invention there is provided a power supply for converting alternating current (AC) mains electricity to direct current (DC) and supplying an external device, with reduced power dissipation, the power supply comprising:
  a power input for receiving an AC voltage from the mains;
  a rectifier for converting said AC voltage to a DC voltage.
  a switch coupled to the power input and said rectifier;
  a power output to supplying said DC voltage to the external device;
  a signal input for operating the switch so as to prevent said AC voltage being delivered to said rectifier;
  wherein an external device is able to receive DC power via the power output;
  wherein an external device is able to operate the switch via the signal input to prevent power being dissipated in the rectifier.

The power supply may additionally include a DC to DC converter to convert the DC voltage from the rectifier to a different DC voltage at the power supply output.

According to a twelfth aspect of the invention there is provided a system for supplying power to a unit, the system comprising:
  a power supply, the power supply comprising:
    a power input for receiving an AC voltage from the mains;
    a rectifier for converting said AC voltage to a DC voltage.
    a switch coupled to the power input and said rectifier;
    a power output to supplying said DC voltage to the external device;
    a signal input for operating the switch so as to prevent said AC voltage being delivered to said rectifier
  a unit, the unit comprising:
    an energy storage element;
    a signal output;
    wherein said unit is able to receive DC power via the power output;
    wherein said external device is able to operate the switch via the signal output and signal input to prevent power being dissipated in the rectifier.
    wherein said external device may be powered by said energy storage element when said switch has been operated to prevent said AC voltage being delivered to said rectifier.

According to a thirteenth aspect of the invention there is provided an accessory for reducing the power consumption of a unit, the accessory comprising:
  a switch, which in operation is coupled to the input power supply of the unit
  a sensor for detecting the proximity of devices or objects in proximity to the unit
  wherein the accessory operates the switch in dependence upon the sensor.

According to a fourteenth aspect of the invention there is provided a method for reducing the power consumption of a pre-existing unit, the method comprising:
  adding a switch to the input power supply of said pre-existing unit
  adding a sensor to the pre-existing unit for detecting devices or objects in proximity to the pre-existing unit
  operating the switch in dependence of the sensor.

According to a fifteen aspect of the invention there is provided a primary unit for supplying power and/or information wirelessly to a secondary device, separable from the primary unit, the primary unit comprising:
  a proximity sensor;
  a switch coupled between the electricity supply and the primary unit;
  wherein the switch is operated in dependence of the proximity sensor;
  wherein substantially no power is transferred from the electricity supply to the primary unit when there are no devices detected by the proximity sensor.

According to a sixteenth aspect of the invention there is provided a system comprising any primary unit as above and a portable device that may receive power and/or information wirelessly from the primary unit.

All these aspects have the advantage that the overall power consumption is reduced. This and other objects, advantages, and features of the invention will be more fully understood and appreciated by reference to the description of the current embodiment and the drawings.

BRIEF DESCRIPTION OF THE DRAWINGS

FIG. 46 shows an embodiment of FIG. 2 using radio frequency identification

DESCRIPTION OF THE CURRENT EMBODIMENTS

Figure 1:
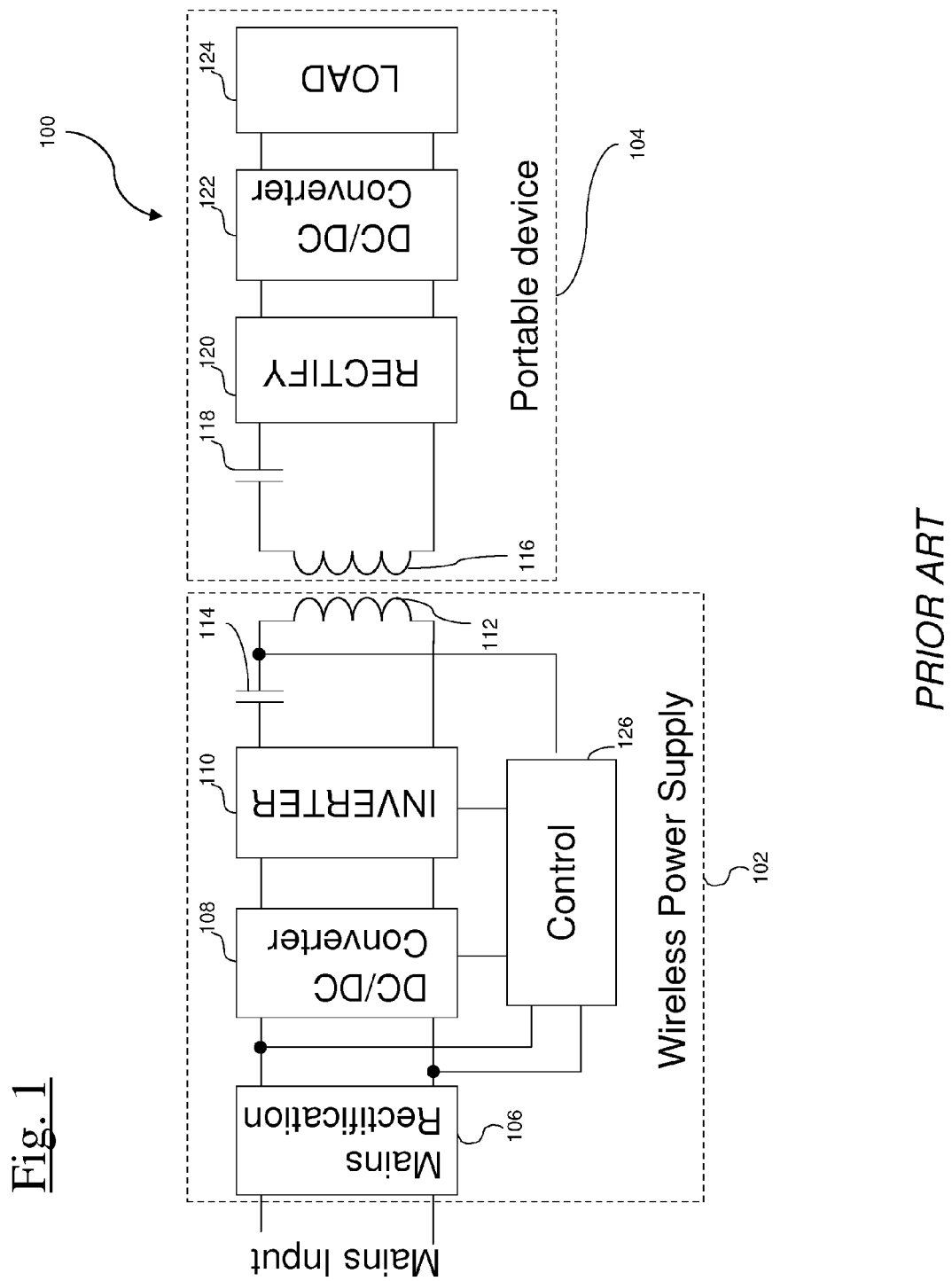
FIG. 1 shows an example of a prior art wireless power system

FIG. 1 shows an example of a wireless power system 100, which uses electromagnetic induction. There is a wireless power supply 102 which takes electrical power and transmits this power to a portable device 104. The charger takes an AC electrical input from the mains. This is rectified using a mains rectifier 106 to produce DC power. This DC power is down-converted to a lower voltage using a DC-DC Converter 108. The down-converted voltage is used to drive an Inverter 110. The Inverter 110 generates an AC voltage which is applied to the tank circuit, which includes a capacitor 114 and a primary coil 112. The portable device 104 has a secondary coil 116, and sometimes a resonant capacitor 118, which couples to the primary coil 112, thereby producing a voltage. This voltage is rectified with rectifier 120 and is down-converted to a lower voltage using a DC/DC converter 122 to supply the Load 124. The Load 124 is representative of the power requiring parts of the portable device 104, and includes for example the battery and charging circuit. There is a Control element 126 in the Wireless power supply 102. This is used to adjust the DC/DC converter 108 to regulate the coil voltage and generate the pulse width modulated signals for the inverter 110. It may also used for device detection and to detect the presence of foreign objects which could adversely affect operation.

The following embodiment descriptions are not intended to limit the scope of the invention that is described, but rather to enable a person skilled in the art to make and use the invention. Like reference numerals are used throughout the figures to designate similar components.

Figure 2:
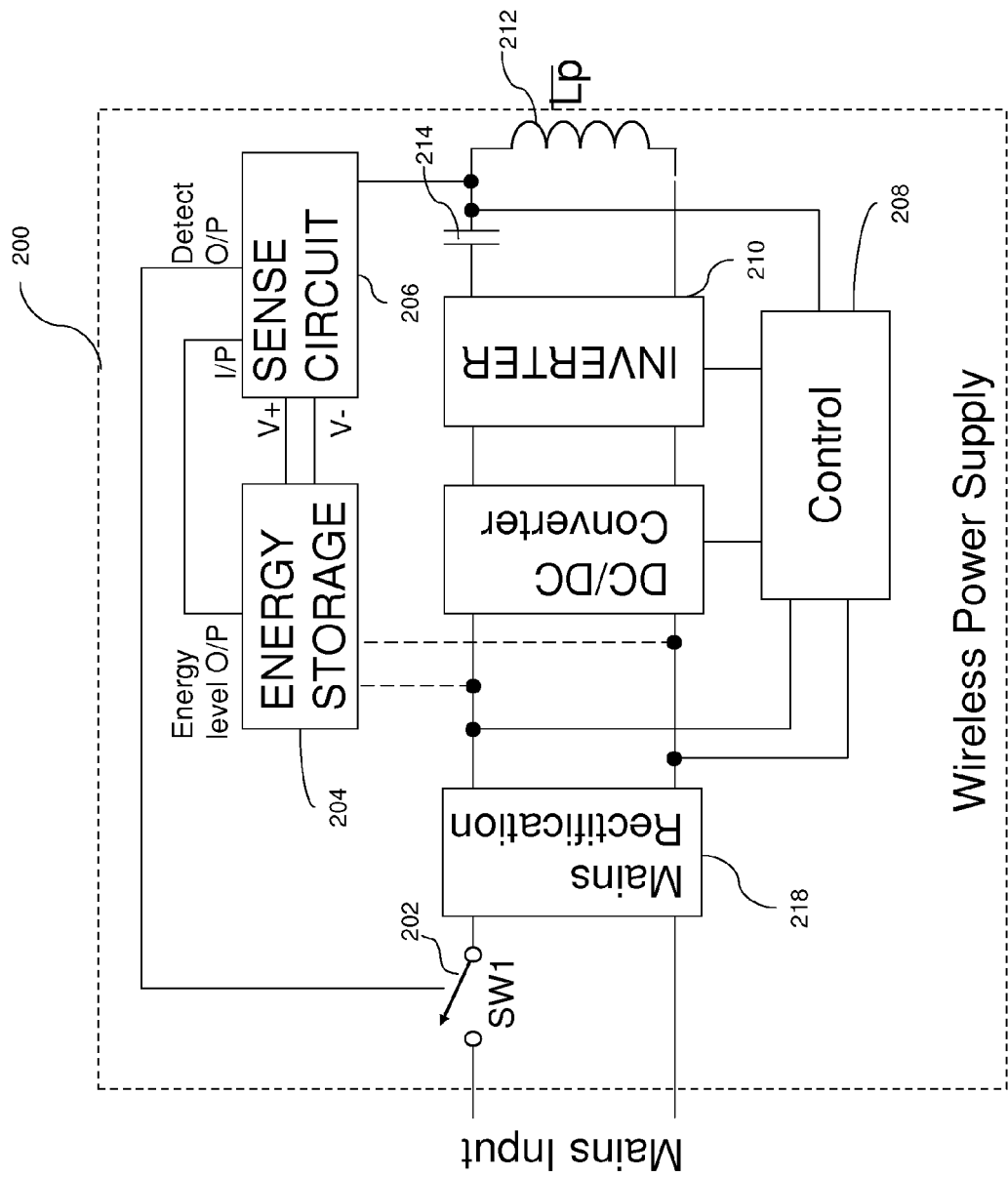
FIG. 2 shows an embodiment of an ultra low power wireless power supply

FIG. 2 shows a wireless power supply 200 of one embodiment of the invention. This embodiment includes a Mains Rectifier 218, a DC/DC Converter 216, an inverter 210, a capacitor 214, a primary coil 212, and a control unit 208. This embodiment also includes a switch, SW1 202, an Energy Storage 204 unit and a Sense Circuit 206. When the Wireless power supply or primary unit 200 is in standby (known here as 'Ultra Low Power' or ULP mode), SW1 202 is open, so that no power is drawn from the mains. In the ultra low power mode, the only power drawing element is the Sense Circuit 206. The Sense Circuit 206 takes its power from the Energy Storage element 204. The Sense Circuit 206 detects when an object is placed in (or removed from) the proximity of the Wireless power supply 200, but does not determine whether or not the object is a legitimate object, such as a valid secondary device, nor whether or not it desires power. If the Sense Circuit 206 detects that an object has been placed on (or in proximity to) the wireless power supply 200, then SW1 202 is closed allowing the circuits in the wireless power supply 200 to receive power. Optionally, the Energy Storage element 204 may take power to be recharged when SW1 202 is closed. The Control element 208 in the Wireless power supply 200 then determines i) whether there is a valid device present, ii) if there is a valid device whether it desires power; iii) whether there is a foreign object present. If there is a valid device requiring power and no foreign objects present, then the control unit 208 will activate the Inverter 210 to supply current to the tank circuit, which includes the primary coil 212 and capacitor 214, to deliver power to the portable device (not shown).

Foreign objects may be detected using a method disclosed in GB2414121, which is incorporated herein by reference. If a valid device is detected, then it communicates its power requirement to the Wireless Power Supply 200. The wireless power supply 200 measures the power being drawn from the primary coil 212 and compares it to the power requirement communicated by the device. In one embodiment, if there is no significant difference between the two values then the wireless power supply 200 determines that there is a valid device and no foreign objects present and therefore enables full power delivery to the device.

One advantage of this arrangement is that the Sense Circuit 206 can be made to consume very low power, because it does not need to do anything more complicated than determine if a change in inductance has taken place. The inductance change threshold can be set to be relatively low to get high sensitivity. A false trigger will not have a dramatic effect on power consumption, as the Control Unit 208 in the wireless power supply 200 will optionally make sure that there is a valid device before delivering full power. In general, the current to sense an inductance change is far lower than the current to transfer power to the portable device and hence a significant power saving is possible. It should be noted that these switches can be configured to isolate the sense circuit 206 and minimize losses. It should also be noted that alternatives using blocking diodes and various switch circuits may provide an alternative solution with minimal losses.

Figure 3:
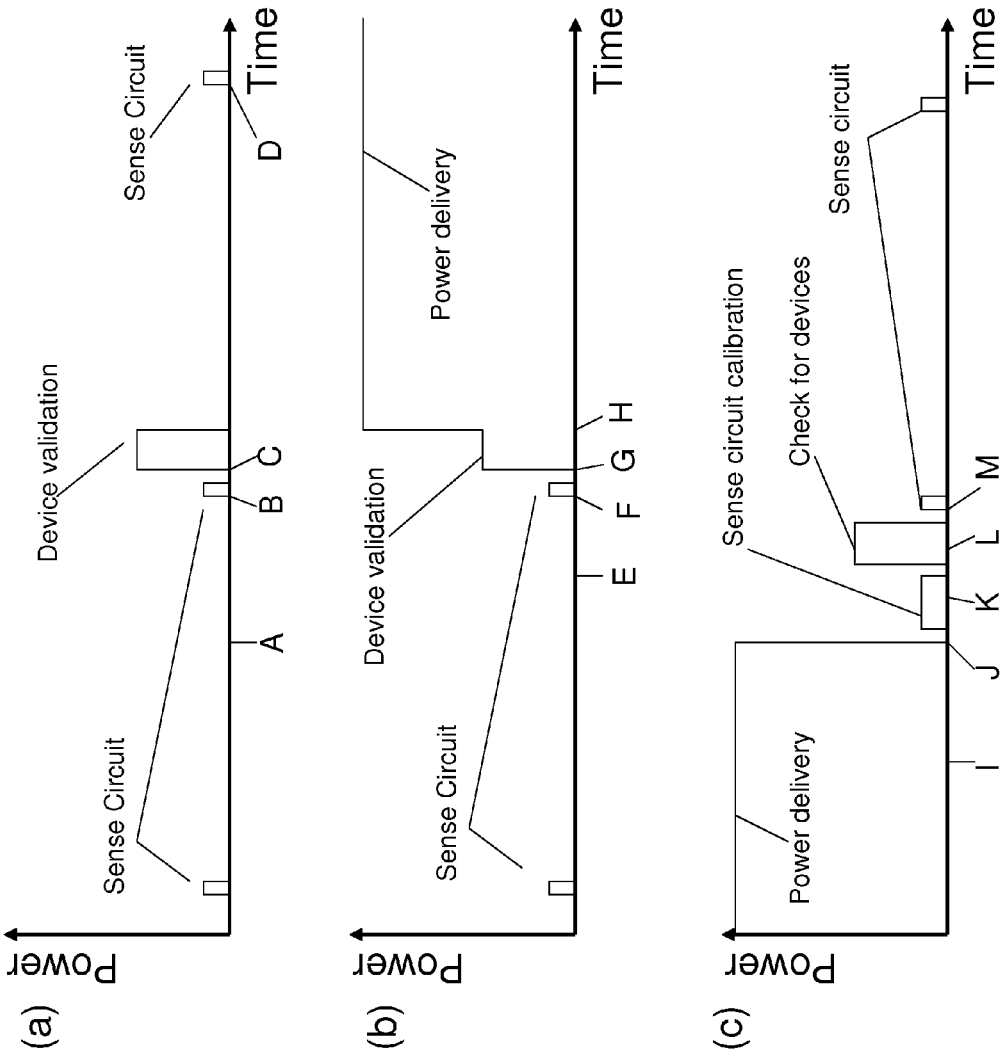
FIG. 3 shows example timing diagrams of power to the primary coil

FIG. 3 shows example timing diagrams of the power delivered to the primary coil 212 (not to scale). FIG. 3(a) shows an example when a foreign object is placed on the wireless power supply 200 at time A. Periodically, the sense circuit 206 powers up to see if an inductance change has occurred since the previous measurement. After the foreign object has been placed on the wireless power supply 200, an inductance change will be detected at the next sense point, B. This will then trigger the system to connect the mains. At point C, the system will look to see if it is a valid device, whether it requires power and whether there are foreign objects present. As the object is foreign, the system will not power up, but will remain in ultra low power mode. At the next sense point D, the inductance will be the same as that at point B because the foreign object is still there. Accordingly no inductance change will be observed and the system will remain in ultra low power mode. It will remain in ultra low power mode until the next inductance change. When the object is removed, this will cause another inductance change and the system will again look for valid devices.

FIG. 3(b) shows an example timing diagram when a valid device is placed on the wireless power supply 200 at time E. At the next sense point (time F), the wireless power supply 200 will detect the inductance change, connect the mains and at point G look for valid devices. It will determine that a valid device is present. As a result at point H the system will deliver full power to the portable device. When the device is fully charged, the control unit 208 will determine that no further power is required and place the system in ultra low power mode (providing there are no other valid devices requiring power). Removing the device will trigger The Sense Circuit 206, but full power will only be delivered when a valid device requiring power is placed on the wireless power supply 200. It should be noted that the system is able to work if both a foreign object and a valid device are placed at the same time. It is also able to work if multiple foreign objects are placed at the same time but removed at different times and vice versa.

FIG. 3(c) shows an example timing diagram when there is a device receiving power and subsequently this device no longer requires power (for example because it has become fully charged or because the device was removed). At point I the wireless power supply 200 is delivering power to the device (or devices) present. At point J the system determines that there are now no devices requiring power and therefore stops delivering power. At point K, the system performs a calibration inductance measurement. This is the inductance measurement that subsequent measurements will be compared to in order to trigger the Sense Circuit 206. This may take longer than a normal measurement as it is important to make sure that the calibration measurement is a valid one and not a rogue measurement. At point L the system makes another check to determine if there are valid devices present, as it is possible that a device may have been placed on the unit just before the Calibration measurement was made. Assuming no devices were detected, at point M the system goes into the ultra low power state in which low power inductance measurements are periodically made to sense for another device being placed in proximity.

Figure 4:
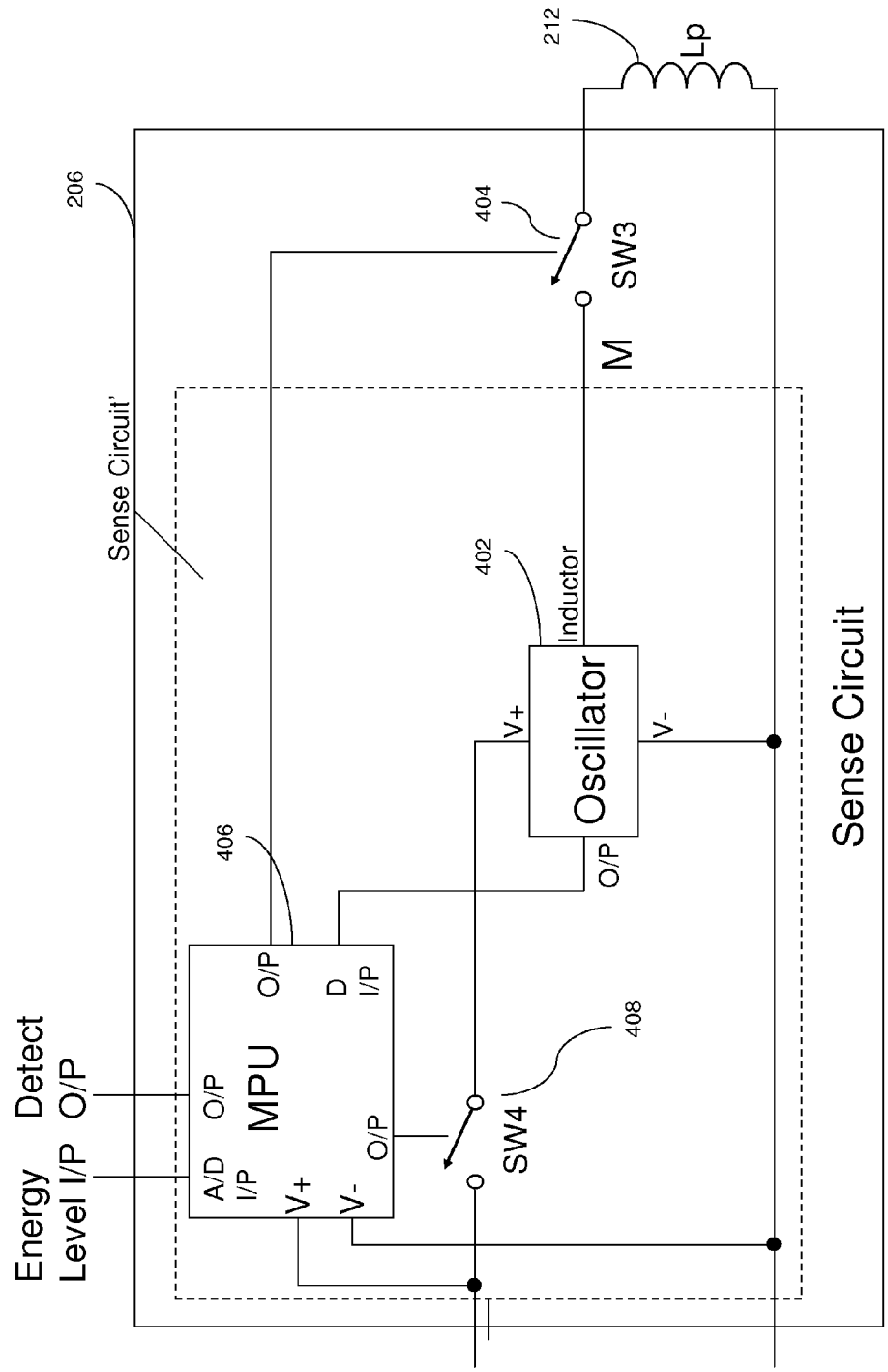
FIG. 4 shows a representative sense circuit

FIG. 4 shows one way of implementing the Sense Circuit 206. In this embodiment, the Sense Circuit 206 uses a variable frequency oscillator to detect the inductance change. The Sense circuit 206 has an Oscillator 402, the frequency of which is determined in part by an external inductance. This external inductance is provided by the primary coil 212. If the primary coil 212 has one end connected to ground, then it can be advantageous to use an oscillator topology in which the inductor is ground connected. This enables the primary coil 212 to be connected to the Sense Circuit 206 using a single switch. Rather than directly connecting the primary coil 212 to the Sense Circuit 206, the primary coil 212 can be inductively coupled (for example by winding turns around the primary coil 212 lead) or capacitively coupled using an external capacitor or capacitance. In the example shown in FIG. 4, the coil 212, Lp is coupled to the Oscillator 402 via SW3 404. The output of the Oscillator 402 is coupled to the digital input of a microprocessor unit (MPU) 406. The Oscillator 402 may have a digital, sinusoidal or other output. However, if a non-digital output is used, this signal may be converted to a digital one prior to the MPU 406 (for example using a comparator). Irrespective of the form of output, a sinusoidal current in the inductor may be formed, so as to prevent unwanted harmonics from being a cause of electromagnetic interference. In some embodiments, the inductor coil can radiate across a wide frequency range. The MPU 406 makes a relative measurement of the inductance by measuring the frequency of the signal. This is achieved by using internal counters within the MPU 406 and counting the number of pulses within a defined time interval.

Figure 5:
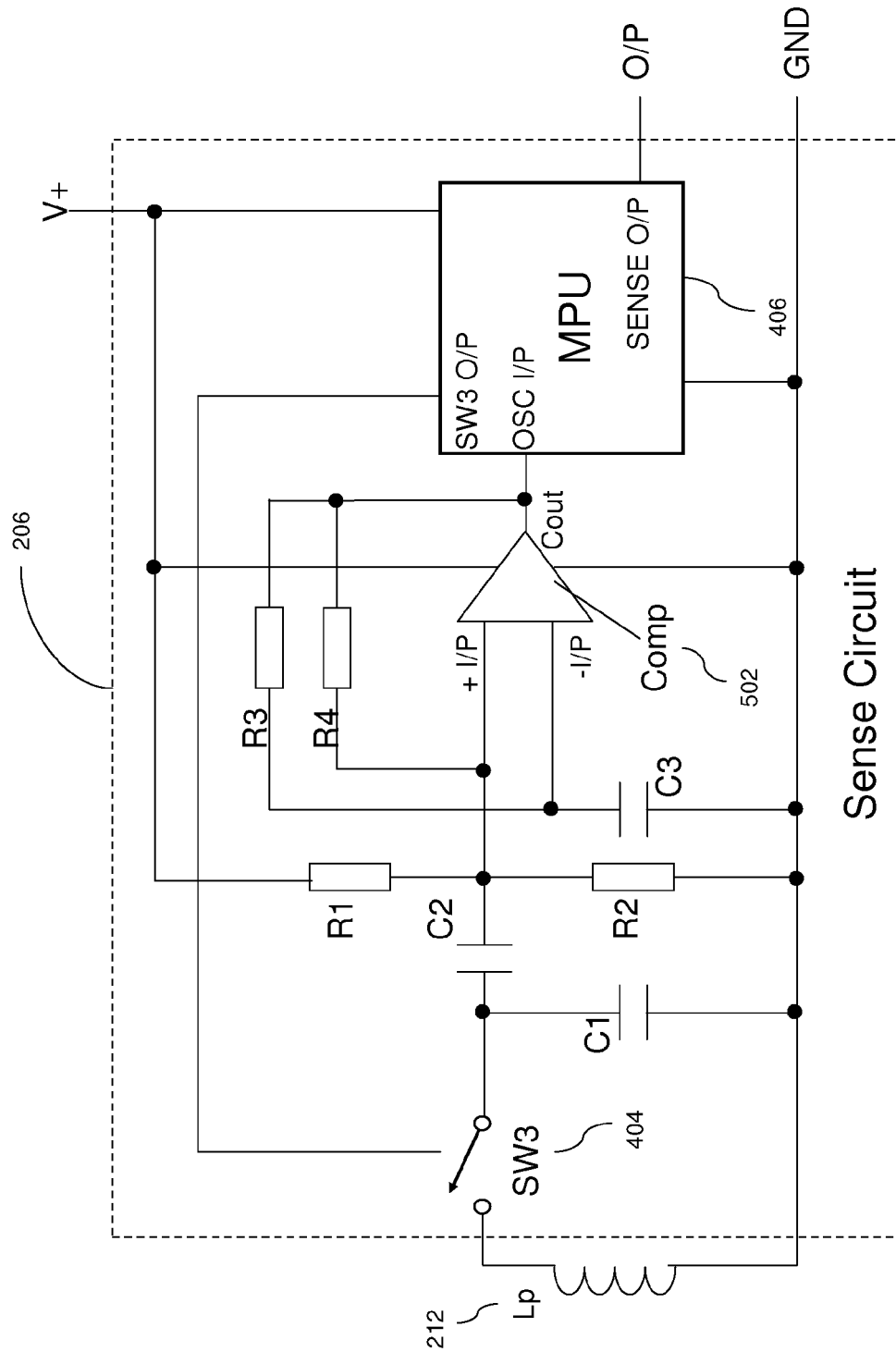
FIG. 5 shows a sense circuit implementation of FIG. 4 using a comparator

FIG. 5 shows the Sense Circuit 206 using one type of oscillator 402, based on a comparator 502. This type of oscillator 402 is well known. See for example http://ironbark.bendigo.latrobe.edu.au/~rice/lc/index2.html. In this type of oscillator 402, the active component is a comparator (Comp) 502 which provides a maximum output if the non-inverting (+I/P) input is greater than the inverting (−I/P) and a minimum output (normally either 0V or close to the negative supply) otherwise. The frequency is determined by the resonant LC tank provided by Lp 212 and C1. C1 may be chosen such that the resonant frequency of the LC circuit, $1/(2\pi\sqrt{(LC)})$, is midway between the frequency input range of the microprocessor and low enough that there is no unwanted radiation from the coil. For example, if the primary coil 212 has an inductance of 60 µH then a value of C1 of approximately 2 nF gives a resonant frequency of 460 kHz. The 2 nF value can be realised using two 1 nF capacitors in parallel. Many microprocessors allow inputs of 1 MHz frequency, so this gives a wide range of frequency variation. The resonant frequency will typically be reduced when a valid device is placed on it if it contains ferrite or material with properties similar to ferrite. For example, the device may have a ferrite core or the device may include materials with higher saturation properties. However metal objects will tend to increase the frequency. In addition to allowing for the inductance change caused by objects and devices, a wide frequency range is available to cope with component tolerances of both the coil and C1. It may also be useful in multiple coil systems as will become apparent later.

The tank circuit is AC coupled to the noninverting input via capacitor C2. The value of C2 should be large to present a low impedance for AC signals. However large capacitors occupy more space and cost more. In one embodiment, a good compromise is 100 nF as this allows a non-electrolytic ceramic capacitor to be used which is both cheap and small. DC bias is provided to the noninverting input via a potential divider formed between resistors R1 and R2. R1 and R2 should be approximately equal to bias the non-inverting input midway between the supply rails. They should be large so as to reduce the bias current between the supply rails, as this will result in power consumption. However it is possible that they be small relative to the input impedance of the comparator 502. A compromise is to make R1=R2=100 k. This should be a factor of 10 less than the input impedance. With a 3V supply this will result in only 15 µA current (45 µW power dissipation) in the bias resistors. Additional positive feedback is provided by resistor R4 (typically 100 k) which can improve the transient performance. DC negative feedback is provided by R3 and brings the inverting input to the same DC value as the noninverting input midway between the supply rails. Capacitor C3 provides an AC short circuit between the inverting input and ground to prevent spurious noise. C3 can take a value of 100 nF for similar reasons to C2.

The oscillator 402 will start from spurious noise at the input to the high gain comparator 502. The signal across the LC tank circuit will be sinusoidal. The output from the comparator however will be digital, thereby enabling direct connection to the microprocessor unit (MPU) 406 digital input (OSC I/P). The supply for the MPU 406, the comparator 502 and the bias resistors is provided from the Energy Storage Unit 204. The MPU 406 is configured so that the OSC I/P is connected to its internal counter. The MPU 406 resets the counter and waits for a specific predetermined time period. At the end of the time period, the MPU 406 reads the counter and uses this value as the indicated inductance measurement. The MPU 406 will initially take a measurement and store it. It will periodically take measurements until a measurement is taken that is sufficiently different from the initial measurement indicating that an inductance change has occurred (as opposed to noise). The Sense Circuit 206 will then respond to this inductance change by appropriately altering its outputs to control external switch(es).

An advantage of this type of oscillator 402 is that it starts up quickly owing to the high gain of the comparator 502 and also that it can oscillate over a wide frequency range and a wide power supply voltage range. This later feature is important as most energy storage technologies typically reduce in voltage over time and being able to operate over a wide and low voltage range can increase the time period over which the unit may operate before the energy storage element is recharged or replaced.

Figure 6:
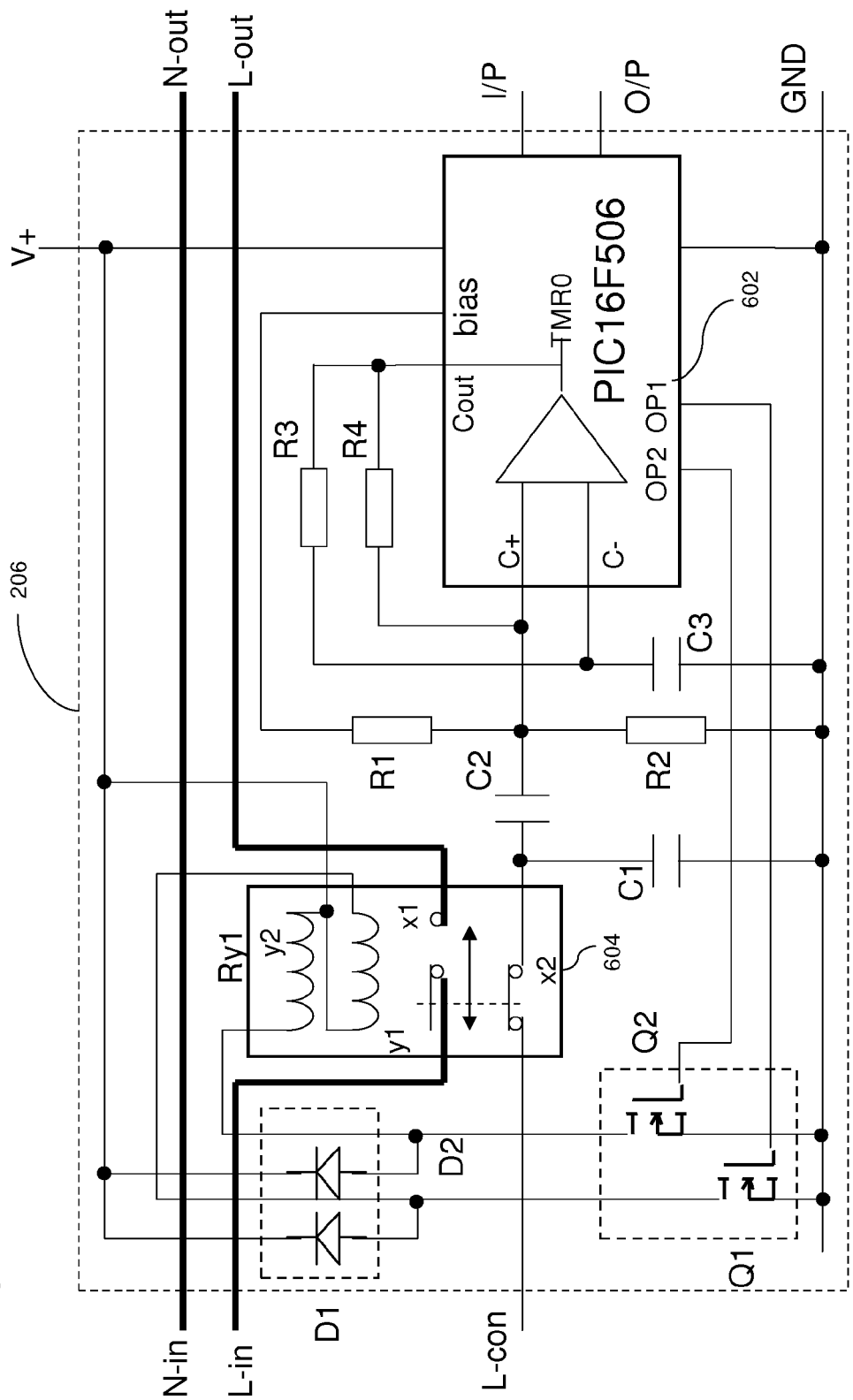
FIG. 6 shows a sense circuit implementation of FIG. 4 using a microcontroller

FIG. 6 Shows another embodiment of a sense circuit. This embodiment uses a specific microcontroller 602, a PIC16F506 manufactured by Microchip® Inc. Similar implementations are possible using microcontrollers or microprocessors from other manufacturers. The PIC16F506 has an internal comparator which can be used to replace the external comparator (Comp) 502 in FIG. 5. This allows a significant reduction in size and cost of the system. The basic oscillator circuit is the same as FIG. 4 and the same component values may be used. Instead of connecting the bias resistor R1 to the positive supply, it is connected to a digital output from the PIC (bias). This output could be configured as any of the digital outputs available, for example RC0. The PIC can source up to 25 mA so supplying the 15 µA is well within its capability. This allows the PIC to switch off the bias when the oscillator is not being used, thereby providing a significant reduction in power consumption. A single relay 604 is used to switch the Mains and also switch the coil. A suitable relay 604 is the Panasonic DE2BL2-3V. This relay 604 has two contacts, (x1, x2). In the 'set' state contact (x1) is connected and contact (x2) disconnected; in the 'reset' state contact (x1) is disconnected and contact (x2) is connected. The relay 604 has two coils (y1, y2). When a pulse (of 2.25V to 3.75V and around 10-100 ms duration) is applied to y1, the relay 604 enters the 'set' state. When a similar pulse is applied to y2, the relay 604 enters the 'reset' state. The relay 604 latches in either the set or reset states and can remain there indefinitely. This has the advantage that the relay 604 consumes no power, except for the very short instants when it is switched. This means that the relay 604 generally does not add to the power consumption in the ultra low power state. Contact x1 is placed in series with the mains live input line which feeds the wireless power system and is used to disconnect the mains when the system is in ultra low power mode. Contact x2 is used to replace switch SW3 404 in FIG. 5 and is used to switch in the coil when the system is in ultra low power mode.

In one embodiment, the MPU 406 ensures that its power supply is not depleted. A simple method of determining the available power is to measure the input voltage as this typically reduces as the energy is depleted. This can be achieved by powering the MPU 406 directly off the Energy Storage Element 204. In the PIC16F506 there is an analogue to digital converter (ADC) which is referenced to the input voltage supply. There is also a 0.6V reference voltage internally generated for calibrating the ADC. By configuring the ADC to read the 0.6V reference it is possible to determine the voltage of the power supply. For example, the PIC16F506 operates down to 2V power supply, but typically a supply of 2.6V is used to ensure reliable operation of the oscillator. Therefore, for example, a threshold of 2.8V may be appropriate for determining an undervoltage condition. The ADC converter has 8 bits (256 levels), so at a power supply of 2.8V, the 0.6V reference should read (0.6/2.8)*256=54. If the reading goes above 54, then it is an indication that the power has dropped below 2.8V. If the system has a rechargeable battery then it can power up for a period of time to recharge it when an undervoltage condition is determined. If the system does not have a rechargeable battery then it can simply light an LED to inform the user that the battery needs replacing. In either case the system may be powered on during an undervoltage condition so that the wireless power unit 200 continues to operate.

In one embodiment, if the MPU 406 employs a voltage regulator on its power supply (e.g. if the Energy Storage unit 204 has a widely varying output voltage), then the undervoltage condition may be determined by using two low tolerance resistors (typically 1% or less) to form a potential divider across the Energy Storage 204 output voltage. If there are no available input pins on the MPU 406 then the bias network (R1, R2) can be used. The exact bias voltage is not critical for the oscillator 402 so the bias resistors could be connected to Energy Storage 204 output rather than the regulated voltage (the ratio of R1 and R2 may be adjusted). When the oscillator 402 is switched off (by switching off the comparators 502, 602), the noninverting input can be temporarily reconfigured to be an analogue input so that the bias voltage can be read.

The relay 604 is controlled by digital outputs OP1 and OP2 from the MPU 406. The digital outputs control transistors Q1 and Q2 to selectively pulse either y1 or y2. These could be configured to be any of the digital output pins available. For example, OP1 could be configured as RC1 and OP2 could be configured as RC2. In the current embodiment, the digital output pins are not able to source or sink sufficient current to activate the relays. External transistors may be employed. MOSFETs, JFET, or another type of transistor may be employed. In one embodiment a transistor with a very high off-resistance is selected to minimize the current consumption when the relays are not being switched. NMOS devices are used in this example, but PMOS devices may also be used. (PMOS devices can allow the relay coils to be ground connected which can improve reliability, an example of which is illustrated later in FIG. 13). Diodes D1 and D2 are used to provide a return path for any back emf generated in the coil. OP1 is coupled to the gate of transistor Q1 and OP2 is coupled to the gate of transistor Q2. The sources of Q1 and Q2 are connected to ground. The drain of Q1 is connected to coil y1 and the drain of Q2 is connected to y2. The common connection between the two coils is connected to the positive supply. In addition there is an output port for transmitting information to the main processor and an input port for receiving information from the main processor. Alternatively a single bidirectional port can be used.

Figure 7:
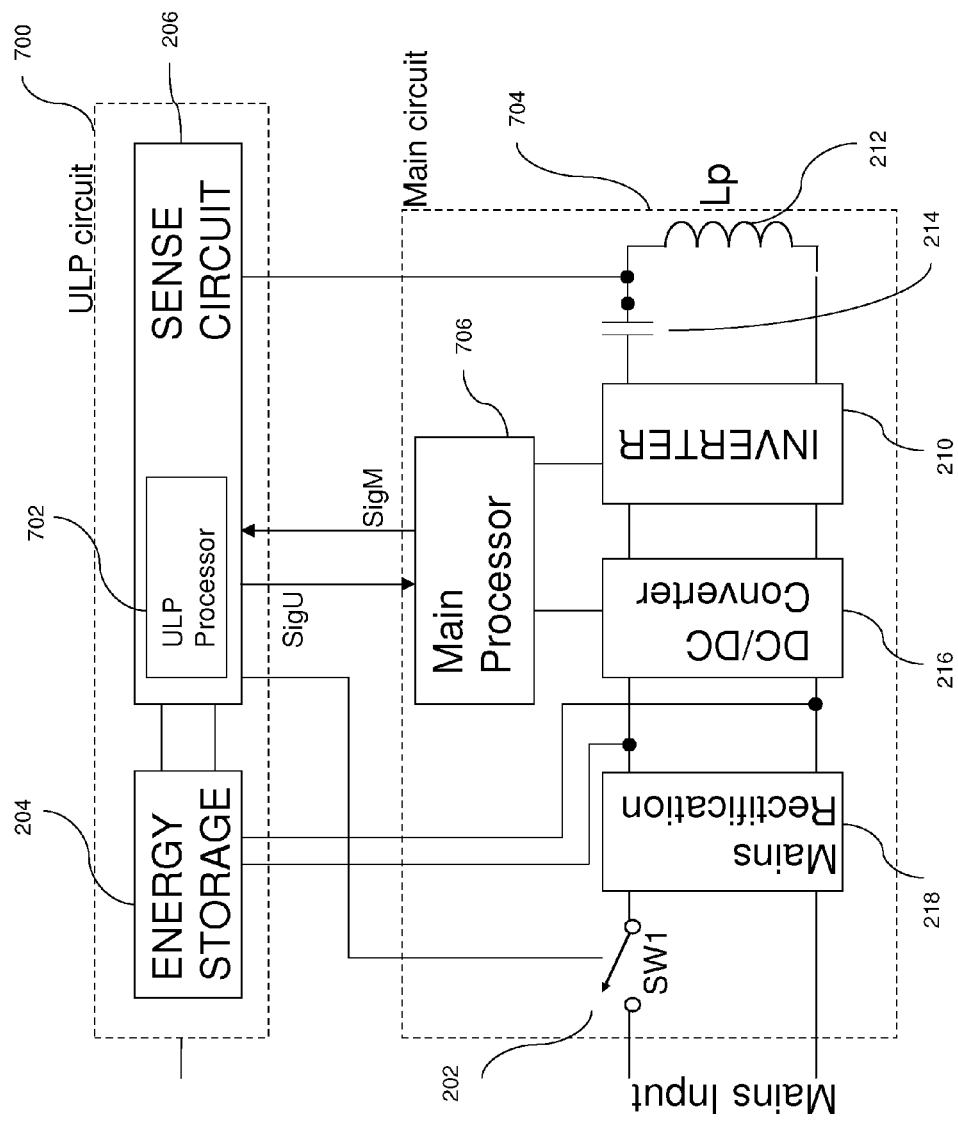
FIG. 7 shows representative ultra low power circuit interface to a wireless power circuit

FIG. 7 illustrates by example how the ultra low power circuit 700 interacts with the main wireless power circuit 704. The ultra low power circuit 700 includes the Energy Storage Unit 204 and the Sense Circuit 206. The Sense Circuit 206 includes a microprocessor, referred to as the ULP processor 702 in this embodiment. The main circuit 704 includes components for wireless power transfer (in this example the main processor 706, switch SW1 202, the mains rectification 218, DC/DC converter 216, Inverter 210, resonant capacitor 214 and primary coil 212). The ULP circuit 700 is continually powered on (though can be in 'sleep' mode when not actively performing functions). The main circuit 704 is controlled by the ULP circuit 700 and only powered on when the ULP circuit 700 activates SW1 202. The output port of the ULP processor 702 (SigU) is connected to an input port of the main processor 706 and an output port of the main processor 706 (SigM) is connected to the input port of the ULP processor 702.

Figure 8:
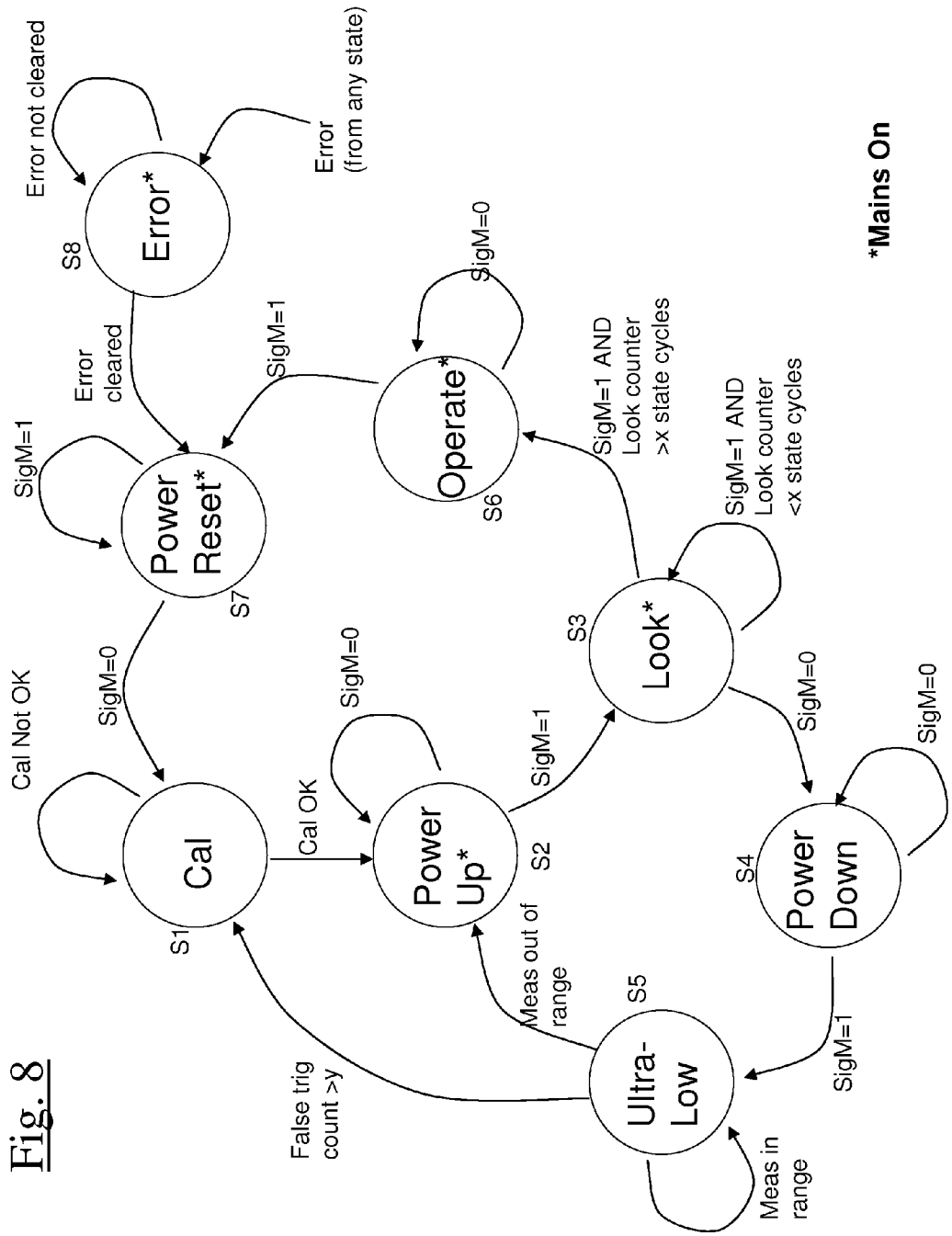
FIG. 8 shows an example state machine executed by a ULP processor

FIG. 8 shows an example state machine executed by the ULP processor 702 in one embodiment of the wireless power supply. After initialisation, the ULP processor 702 starts in the Cal state (S1). In this state, the ULP 702 processor measures the frequency of the oscillator of the sense circuit so that subsequent measurements may be compared against it. In alternative embodiments with different sense circuits this process may be different or unnecessary. The Cal state generates the upper and lower thresholds for frequency comparison. The system remains in the Cal state until a valid calibration has been obtained.

After the Cal state (S1), the system switches the mains on and enters the Power Up state (S2). It is possible that a device may have been put on the system just before the Cal state (S1) was executed, so the system may make a proper check for valid devices before engaging the ultra low power state. It takes time for the main circuit 704 to power up. The state machine therefore remains in the Power Up state (S2) until the main processor 706 asserts a high signal (SigM=1) on its output. After this signal has been received the system initialises the Look Counter to x and enters the Look State (S3).

In the Look state (S3), the system waits for the main processor 706 to determine if there is a valid device or not. If the main processor 706 determines that there is no valid device (or that there is a foreign object present) then it takes the signal low (SigM=0). The Look Counter is decremented each time this state is executed. The system remains in this state until either the main processor 706 asserts a low signal (SigM=0) or the Look counter has reached zero indicating that it has executed this state more than x times. If SigM=0 then the system enters the Power Down state (S4), otherwise the system enters the Operate State (S6).

In the Power Down State (S4), the ULP processor 702 waits for the main circuit 704 to determine that it is safe to power down the mains. The main circuit 704 powers down all the components in an orderly fashion and waits until the coil voltage has reached a value close to zero before asserting SigM=1. After determining SigM=1, the ULP processor switches the Mains off and enters the Ultra Low Power State (S5).

In the Ultra Low Power State (S5), the ULP processor 702 powers up the sense circuit oscillator, measures the frequency and powers down the sense circuit oscillator. If the frequency is outside the threshold limits determined by the Cal Sate then the system switches on the Mains and enters the Power Up State (S2). Until that happens the system remains in the Ultra Low Power State (S5).

If the system enters the Operate State (S6) from the Look state (S3), then it is because the main processor 706 determined that there was a valid device present and no foreign objects present. The main circuit 704 therefore activates all the circuits to supply power to the device. The system remains in the Operate State (S6) until the Main Processor 706 asserts (SigM=1). When SigM=1, the system switches off the Mains and enters the Power Reset State (S7). This indicates that either the device has become fully charged or that it has been removed. After either of these events it may be possible to start again with a new calibration value.

In the Power Reset state, the Main processor 706 switches off the elements of the Main circuit 704 in an orderly fashion, waits for the coil voltage to become close to zero and then asserts SigM=0. When the ULP processor 702 determines that SigM=0 it enters the Cal State (S1).

The Power Reset state is similar to the Power Down state, except that instead of exiting to the Ultra Low Power State (S5), it exits to the Cal State (S1). Instead of having an extra state (S7) it is possible to use an extra variable set by the Look State which indicates whether the state after the Power Down state (S4) should be the Cal State (S1) or he Ultra Low Power State (S5).

A false trigger may occur if the system has drifted (for example because of oscillator drift or because of ambient temperature fluctuation). In order to prevent the system getting stuck in a loop whereby it continually powers up and goes back to Ultra Low Power, it is possible to have a limit on the number of 'False Triggers'. This may be implemented by having a False Trigger Count which increments every time a False Trigger occurs. A counter may be used to count each state and when this counter overflows (e.g. after 256 states) the False Trigger Count is Reset. After the False Trigger Count exceeds a certain threshold, the system enters the Cal State (S1) so that a new calibration can be obtained.

In addition, there is an Error State (S8), which can be entered from any state if an error occurs. There a number of different causes that could generate an error and only a few are listed here. This could be generated by a timeout e.g. if a valid Calibration is not received after a set number of state cycles or the Main Processor 706 does not assert SigM=1 to indicate it has powered up within a set number of state cycles. Once the error has been cleared, the system can enter the Power Reset state (S7), followed by the Calibration State (S1). An undervoltage condition could also put the system into the error state. Alternatively there could be a separate state for the undervoltage condition.

In one embodiment, the ULP processor 702 includes a main ULP processor oscillator clock and a separate watchdog ULP processor oscillator clock or timer. The ULP processor is configured such that it executes a state after every timeout of the watchdog timer. After executing the instructions associated with each state, the ULP processor 702 is put into a low power 'sleep' mode. In this configuration the ULP processor is temporarily suspended and all functions powered down where possible, including the main ULP processor oscillator clock. The watchdog ULP processor timer remains active while the other ULP processor functions are suspended. The power consumption in sleep mode is specified to be less than 1.2 µA at 2V and is typically 100 nA. The time interval between each state is a compromise between maximising the time the processor is in sleep to conserve power and having the time interval short enough that there is little observable delay. A suitable compromise is to set the time interval to be nominally 288 ms by appropriate setting of the Watchdog prescaler.

Figure 9:
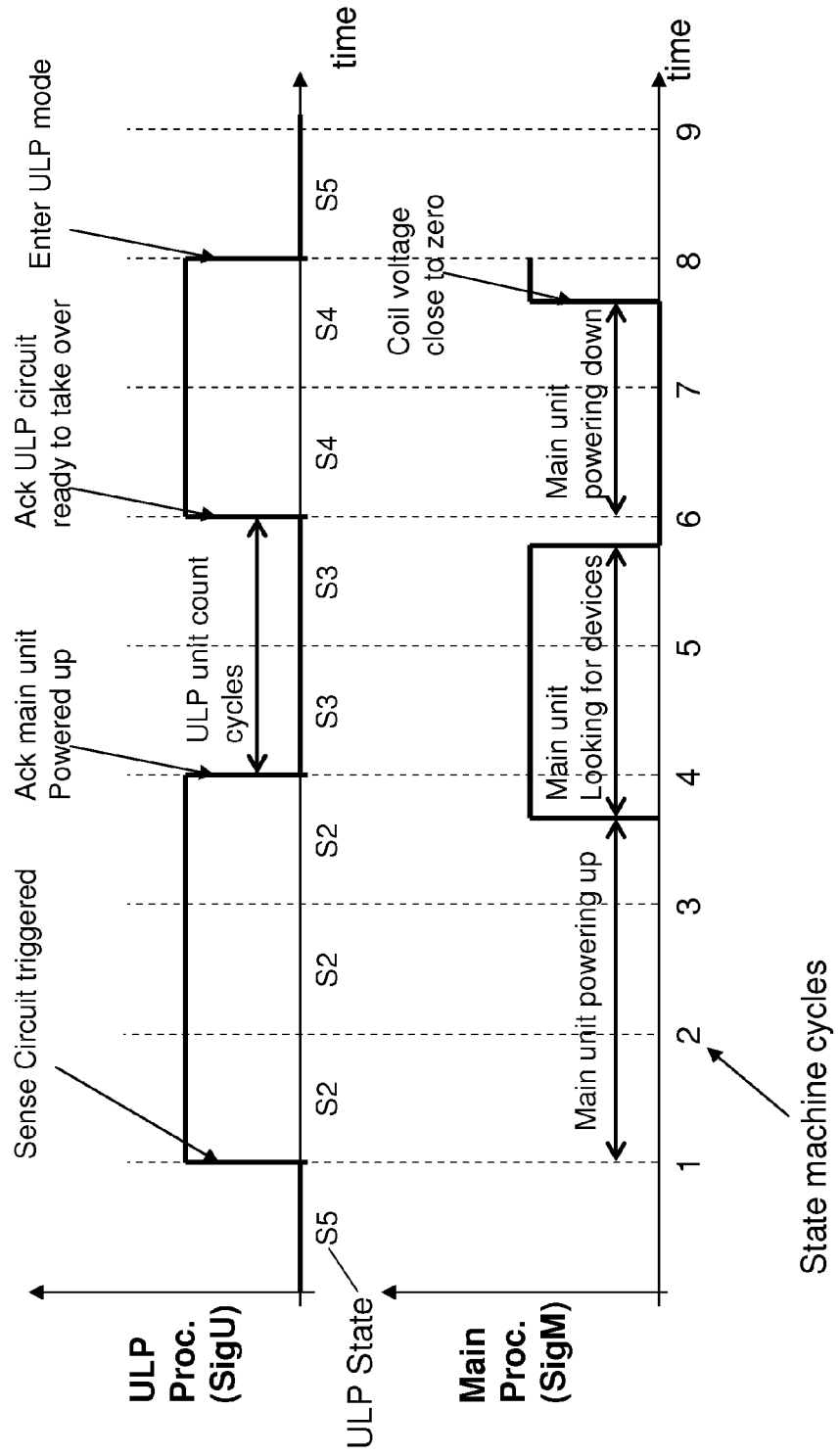
FIG. 9 shows example timing diagrams of the state machine in FIG. 8

FIG. 9 shows some example timing diagrams for a state machine of the form shown in FIG. 8. These show the signal SigU from the ULP processor 702 and the signal SigM from the main processor 706. Initially the system is in the ULP state (S5). On the first state (1 in the diagram) the ULP circuit 700 detects that an inductance change has occurred and switches on the mains and sets SigU=1. The ULP circuit 700 enters the Power Up state (S2). On the next 2 state transitions (2,3), The main circuit 704 is still powering up and so SigM=0. Between the third and fourth transition, the main circuit 704 has fully powered up and set SigM=1. The main circuit 704 now starts looking for devices. On the fourth transition the ULP processor 702 sees that SigM=1, so it acknowledges by setting SigU=0 and then it enters the Look State (S3). During the Look state, the ULP processor 702 counts the state cycles.

If the main processor 706 determines that there is no device present then it sets SigM=0. If this occurs within a fixed number of state cycles (e.g. 5 or 10) then the ULP processor 702 determines that there was no device present. In the example the main processor 706 sets SigM=0 between the fifth and sixth transitions. On the sixth transition the ULP processor 702 sees that SigM=0 indicating that the main processor 706 wishes to power down. The ULP processor 702 signals SigU=0 (to indicate that it is working properly and ready to take over) and then enters the Power Down State (S4).

After the main processor 706 has received the acknowledgement from the ULP processor 702 on the sixth transition it starts to power down all the circuits in an orderly fashion. When this has been completed it waits for the coil voltage to fall below a threshold value (typically close to 0V) and then sets SigM=1. When the ULP processor 702 receives this signal (on the eighth state) it then switches off the Mains and enters the ultra low power state (S5).

If there had been a device present, then instead the main processor 706 would have kept SigM=1 rather than setting SigM=0 between the fifth and sixth states. This would have meant that the number of cycles counted during the Look state would have exceeded the threshold and the ULP processor 702 would have determined that a device was present and consequently it would enter the Operate State (S6). The ULP circuit 700 would remain in the Operate State until it received SigM=0 upon which it would enter the Power Reset State (S7).

The software to implement the state machine can be written directly in the assembly language of the MPU or it can be written in a higher level language (for example C) and compiled to assembly language or a hybrid of the two can be used. It is advantageous to use assembly language to implement the measurement function as it means that only a single 8-bit counter is required. The measurement can be made over a time interval fixed by a set number of instruction cycles executed by the MPU. The MPU can periodically check to see if the counter has overflowed and increment an overflow counter byte if this happens (taking care to ensure that this branch does not alter the time taken). The measurement time interval is a trade off between having high sensitivity and ensuring that the MPU is in sleep mode for most of the time. A suitable compromise is 1 ms, but shorter or longer periods may be used. The PIC may be configured to use the internal 4 MHz oscillator to give low power consumption whilst allowing accurate measurements to be made.

The calibration routine may set the upper and lower thresholds in order to trigger the Sense Circuit 206. The number of periods counted during any particular measurement period will typically vary by one depending on the phase of the oscillator 402 with respect to the phase of the internal clock at the time the measurement is made. It is possible to make a series of measurements for the calibration routine (e.g. 5 or 10) to determine the highest and lowest counts. The Lower Threshold can then be set to be a fixed number of counts (e.g. 2) below the lowest reading and the Upper Threshold can be set to be a fixed number of counts about the highest reading.

Before each measurement or series of measurements the oscillator 402 and bias circuit may be turned on. This is achieved by switching on the comparator 502 and switching on the port to apply the bias. Likewise these should be switched off after each measurement or series of measurements.

It is possible to conserve power in the ultra low power mode as the system will likely be in this mode for the vast majority of the time. The amount of time it takes for the oscillator 402 to wake up and stabilize may vary from device to device and over time and temperature. Rather than wait for a set period of time (which may include some extra margin) it is possible to reduce the time the oscillator 402 is switched on for to conserve power. A number of measurements are taken in a loop and this loop is exited early if the measurement falls between the Upper and Lower thresholds. It is unlikely that random noise will result in a measurement between the two thresholds (even if this does occur, the system will trigger on the next state transition if an inductance change has taken place). For example, a series of seven 1 ms measurements are taken and the loop exits on the first valid measurement. Using this technique, the total measurement time to make a decision is typically 2 ms (because the oscillator generally starts up in less than 1 ms). This results in extremely low power consumption during ultra low power, because the MPU 406 and oscillator 402 is only active for 2 ms each state transition. If the time between state transitions is 288 ms, then the MPU 406 is in sleep mode (with oscillator off) for 99.3% of the time. Using a PIC16F506, the power consumption of the system in ultra low power mode is typically only around 30 µW. This means that non-rechargeable batteries (e.g. 2×AA or 2×AAA alkaline cells) could be used as the lifetime would be a number of years.

Although the example shows a synchronous state machine, whereby there is an equal time interval between each state, it is possible to use an asynchronous state machine, or to use an alternative implementation without a state machine. The state machine or algorithm could be implemented in hardware, in an application specific integrated circuit (ASIC) in a field programmable gate array (FPGA) instead of a microprocessor.

Instead of communicating between the ULP processor 702 and the main processor 706 as described, the processors could communicate more complex messages using a serial or a parallel link. They could use a standard such as an I2C bus. The ULP processor 702 could communicate information to the main processor 706 relating to the measurements made. This could enable the main processor 706 to deduce information about the devices. For example from the inductance change measured, the main processor 706 could deduce that the device is of a particular type and therefore adapt its frequency and/or voltage/current/power levels accordingly. This could allow a faster start-up as it would avoid the need to send multiple pings of different frequency to establish the device type. The frequency could be adapted by varying the frequency of the signal applied to the coils and/or varying a capacitance and/or inductance to change the resonant frequency of the system. The system could alternatively, or in addition to, use the knowledge of the absolute frequency of oscillation to establish the resonant frequency of the system directly.

There are numerous other oscillator circuits that may be used instead of the LC comparator oscillator. For example and without limitation, oscillators based on JFETs, bipolar or MOSFET transistors, operational amplifiers or logic gates may be used. Various oscillator topologies including without limitation Hartley, Clapp and Armstrong may be used. Rather than measuring the inductance of the primary coil 212, a separate coil may be used for sensing the presence of a device or other object.

Figure 10:
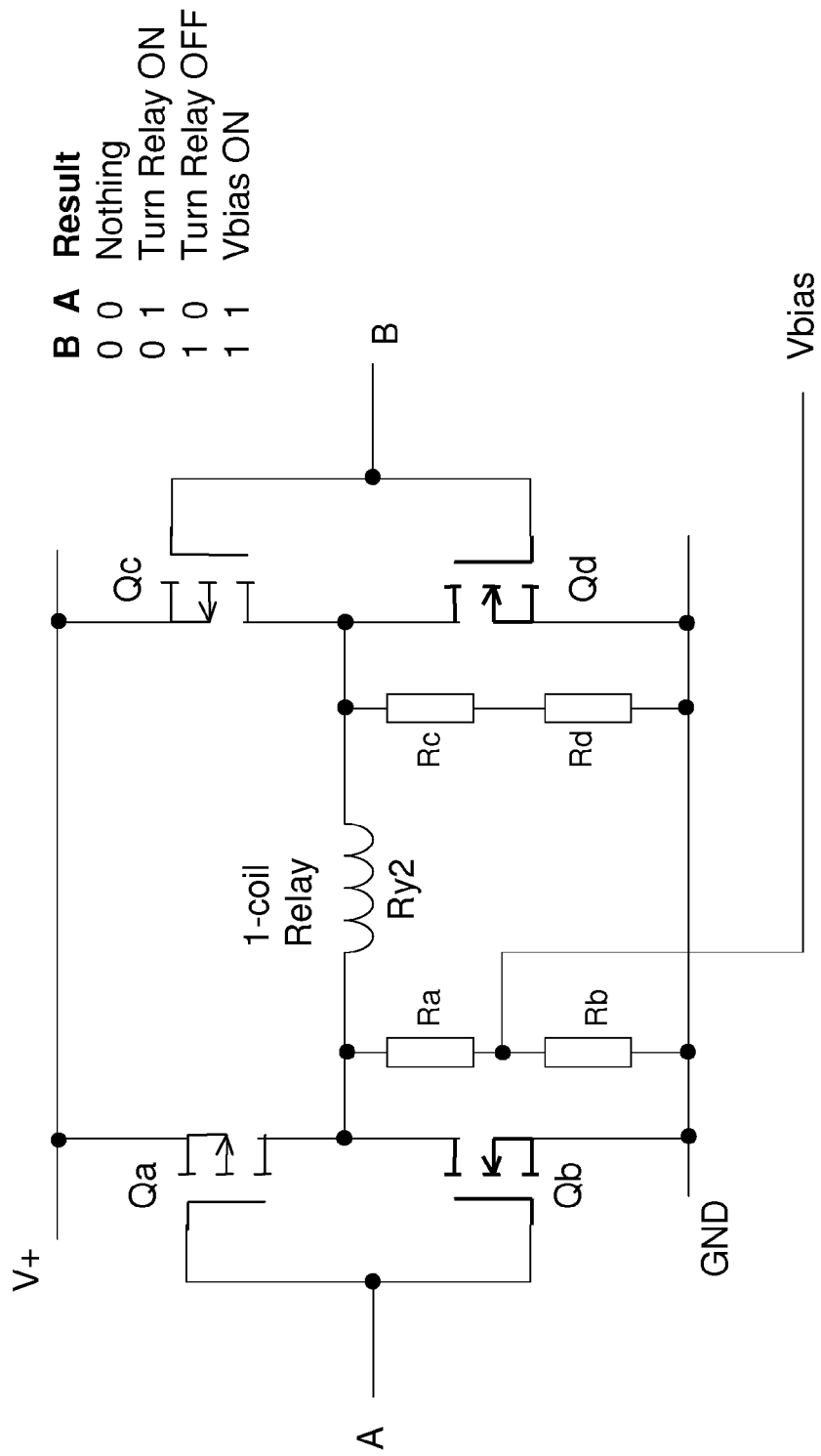
FIG. 10 shows a single coil relay driven by complementary FETs

Instead of using 2-coil latching relays, it is possible to use a single coil latching relay. This may allow a cost reduction as the relay has only one coil instead of 2. Such a relay requires a short (~5 ms) pulse of current in one direction to 'set' it and a pulse of current in the opposite direction to 'reset it'. Such a relay can be driven by using 4 MOSFET transistors in a bridge configuration. FIG. 10 shows a single coil relay driven by two complementary MOSFET pairs Qa, Qb, Qc, Qd (the resistors Ra, Rb, Rc and Rd are not required for driving the relay). If A and B are both low (0) then no current flows. Likewise if A and B are both high (1). However if A=1 and B=0 current flows in one direction (e.g. 'set'). Conversely if A=0 and B=1 current flows in the opposite direction (e.g. 'reset'). By applying a pulse to A, the relay will latch in the 'set' state and by applying a pulse to B, the relay will latch in the 'reset' state.

A low specification MPU 406 may be used so as to reduce both cost and size. By novel multiplexing of the pins it is possible to use an 8-pin PIC12F510 instead, saving cost. The separate I/O port for the bias can be eliminated by combining it with the two ports required to drive the relay. In FIG. 10 the four resistors Ra, Rb, Rc and Rd are used for supplying the bias to the oscillator 402. By example, they could each be 100 k Ohm resistors. The presence of these resistors does not materially affect the operation of the relay drive. If A=1 and B=0 current flows through the relay in one direction and in the opposite direction for A=0 and B=1. No current will flow through the relay if A=B=0 or if A=B=1. However if A=B=1, Vbias will nominally be at half the supply voltage and if A=B=0, Vbias will be nominally 0V. This enables a convenient way of switching the bias to the oscillator 402 on and off without the need for a separate I/O port. The resistors should be relatively well matched to prevent extraneous current. Rc and Rd could be replaced by a resistor twice that of Ra. Although extra current flows through the resistors when the relays are switched, the pulses are very short and the extra current (~15 µA) is negligible compared to the current through the relay (typically 50 mA).

Figure 11:
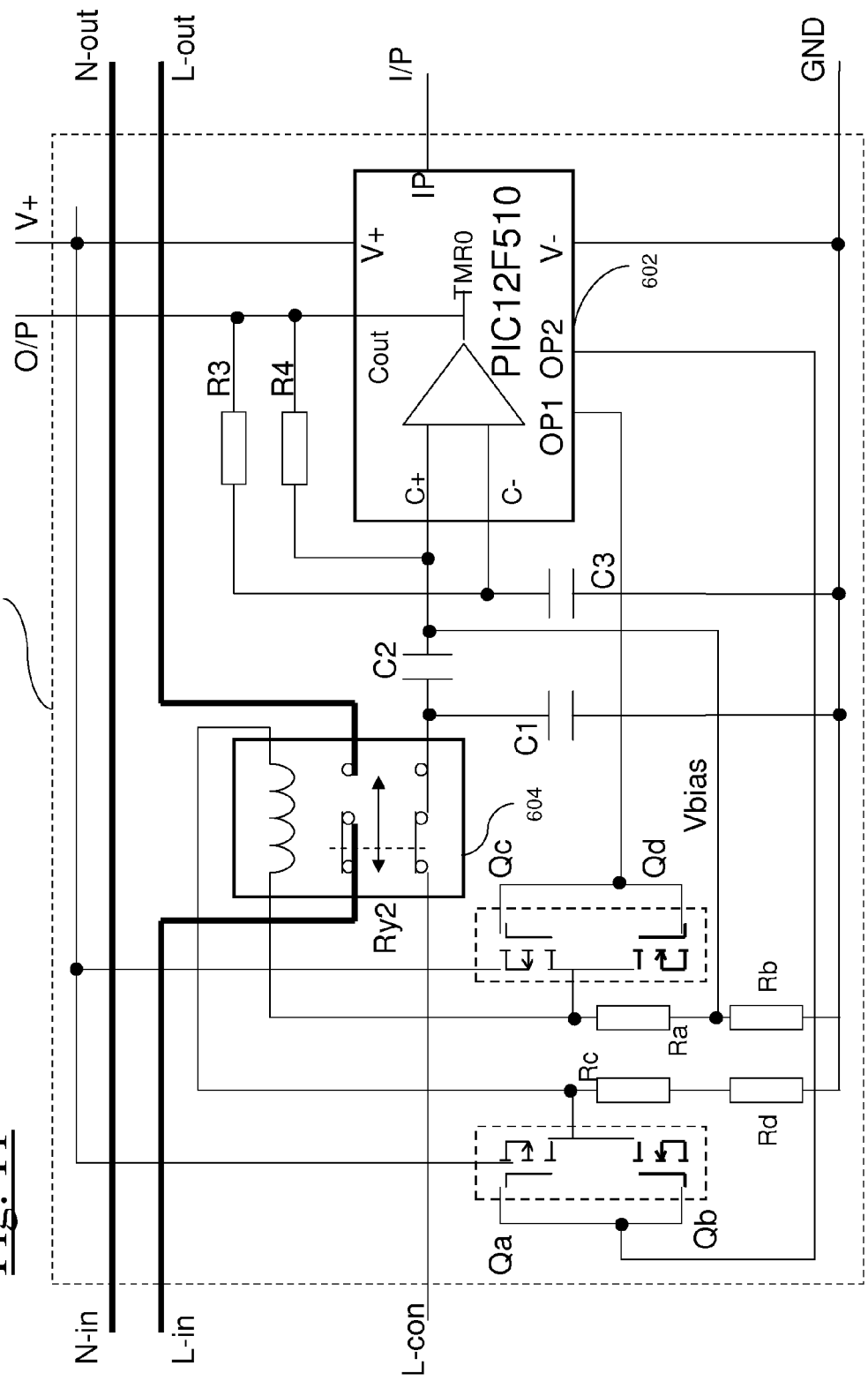
FIG. 11 shows a sense circuit implementation of FIG. 4 using a microcontroller and a single coil relay

The output port for the ULP processor 702 to communicate with the Main processor 706 can be multiplexed with the comparator output pin used for the oscillator 402, 602. When the oscillator is running, the main processor 706 will generally be switched off so there may be no need for the output port to be enabled during this time. FIG. 11 shows an implementation of the system using a PIC12F510 and a single coil relay, using the bias configuration of FIG. 10 (using the same labels).

The use of a single relay for switching both the Mains and the Coil together can be advantageous for saving cost. However a drawback is that there can be extra time delays between powering up and powering down. This will be evident after a calibration has been performed and the system powers up to check for devices before going into ultra low power mode. An alternative is to use two separate relays, one for the coil and another for the Mains. This means that it is not necessary to power everything down when performing a calibration. An alternative is to use a single relay, but hold up the power to the main processor 706 (for example with a capacitor) so that it remains powered up whilst the Mains is switched off momentarily for the calibration.

Figure 12:
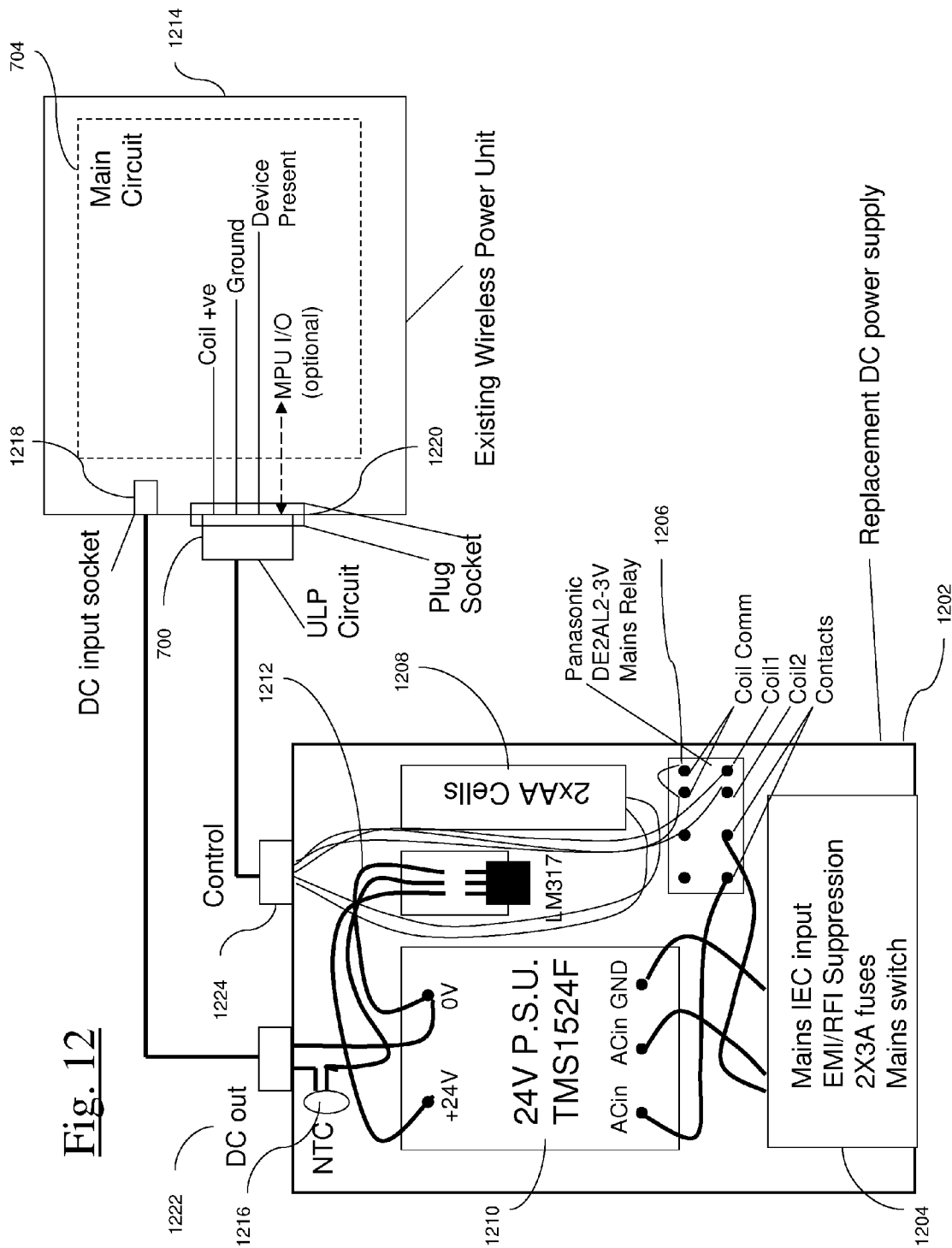
FIG. 12 shows a retro-fit application of the ultra low power system

FIG. 12 shows an alternative embodiment of the invention in which the ultra low power system is 'retro-fitted' as an aftermarket accessory. This could be used to upgrade wireless power systems from the same manufacturer or from a different (third-party) manufacturer. Optionally the wireless power system may be designed to enable easier upgrading in the future. In FIG. 12, the DC power supply used to supply DC power to the wireless power supply 1214 is replaced with the 'Replacement DC Power Supply' 1202. The Replacement DC power supply 1202 has a mains input socket, fuses, an EMI/RFI suppression filter on the input. The Live terminal is routed via the Mains Relay 1206 to the input of a switch mode power supply 1210. Optionally the Neutral terminal can be routed via the relay or it can be wired to the power supply directly. The output 1212 of the power supply 1210 is regulated via a voltage regulator LM 317 which also has overload and short circuit protection. The output of the regulator goes through a negative temperature coefficient thermistor (NTC) 1216 to the DC power output socket 1222. It is possible that the wireless power supply 1214 will have a large inrush current generated when the device is powered up. This is a large spike of current (maybe as high as 20 A or more) for a short period of time and may be caused by charging up large capacitors present across the systems power rails. The NTC thermistor 1216 is a resistor which reduces in resistance when it heats up. The thermistor limits the current when the mains is first switched on and then heats up so that it has low losses during normal operation. A value of around 10 Ω may be appropriate.

As well as the DC power socket 1222 there is also a control socket 1224 (these two could be combined so that only a single cable is required). The contacts for the relay 1206 (Coil1, Coil2 and Coil Comm) are routed to the control socket 1224. Also present are two AA cells 1208, the terminals of which are also routed to the control socket 1224. The AA cells 1208 could be located in a battery compartment which is accessible without exposing other connections (for example the live mains) in the Replacement DC Power Supply 1202. The AA cells could be primary or rechargeable cells.

Figure 13:
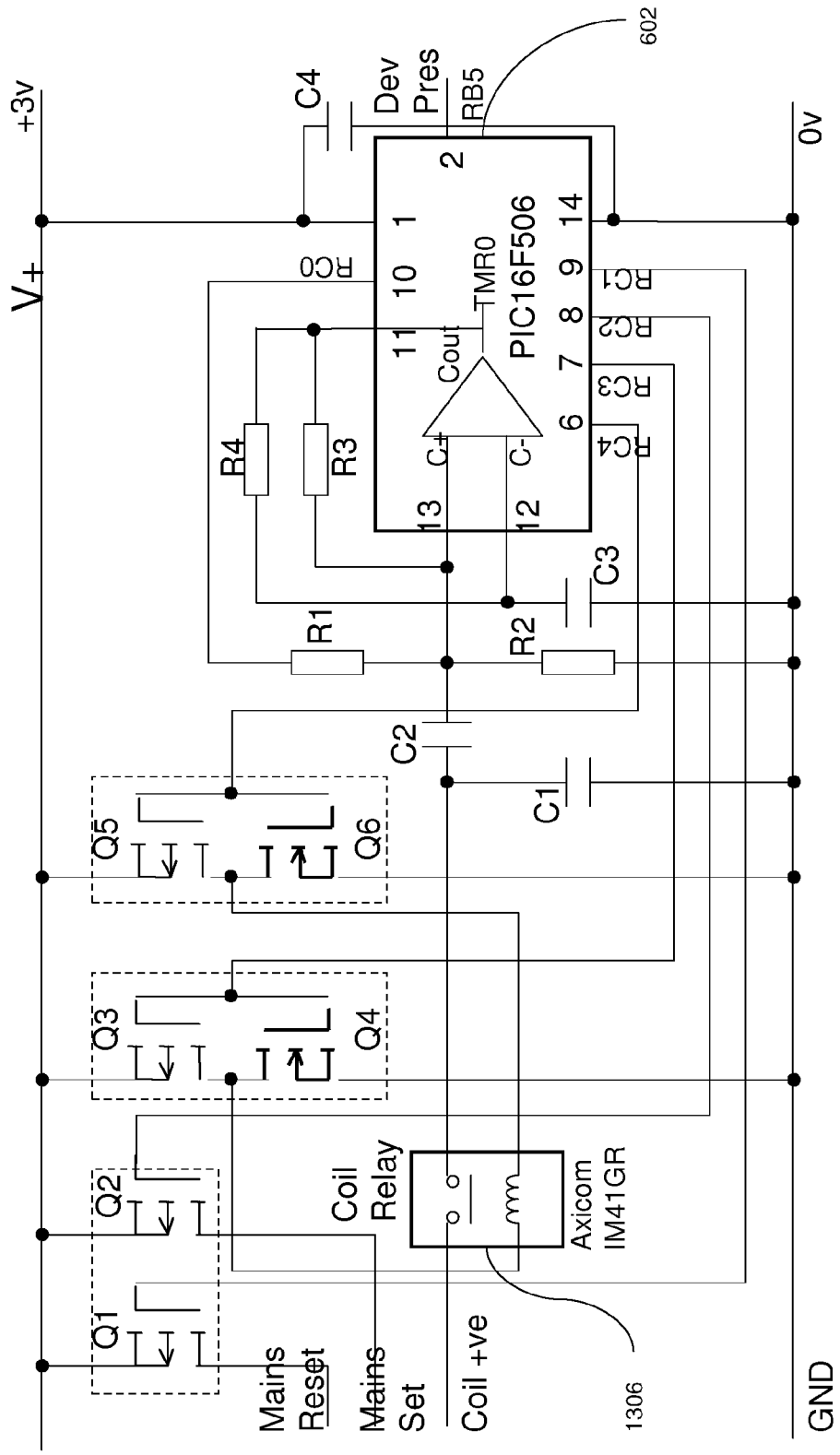
FIG. 13 shows a sense circuit implementation of FIG. 4 using a second relay

The DC power socket 1222 is connected to the existing power input socket 1218 on the wireless power supply 1214. The control socket 1224 is connected to the ULP circuit, an example of which is shown in FIG. 13. The ULP circuit has a Sense Circuit 206 similar to that of FIG. 6. However, in this configuration there is a second relay 1306 used to connect and disconnect the coil from the sense circuit 206 (the first relay 1206 being located in the replacement DC power supply). A small surface mount single coil relay is used (Axicom IM41GR). The circuit connects to the coil terminal, the ground terminal and an output from the main processor 706 which indicates a 'Valid Device Present' signal. The 'Valid Device Present' signal should only be active when there is a device receiving power or ready to receive power (as opposed to a fully charged device present or an object not configured for receiving power present). This Valid Device Present signal could be an output from the main processor 706 which is used to control an LED output (for example the wireless power supply may illuminate an LED when a device is charging). The system could be retrofitted to the circuit board by supplying a kit which the user solders to the existing board. Alternatively the user could have the operation performed by sending the unit back to the manufacturer or retailer.

The wireless power unit may be designed for future upgrading by routing the pins on the main circuit board out to a socket 1220. The circuit can be very small and therefore actually integrated into a plug which connects to this socket on the main circuit board 704. The socket could be positioned and designed such that there is no unsightly protrusion. Optionally I/O pins may be routed from the main processor 706 to the socket so that the full communication between the main processor 706 and the ULP processor 702 is possible enabling a control system like the one illustrated in FIG. 8 to be implemented. There may also be a connection to enable the main processor 706 to determine if an ultra low power system is present so that it can execute different software code if one is present. Alternatively a retrofit operation would also involve a re-programming (re-flashing) of the main processor 706 software to adapt the code for ultra low power operation.

Figure 14:
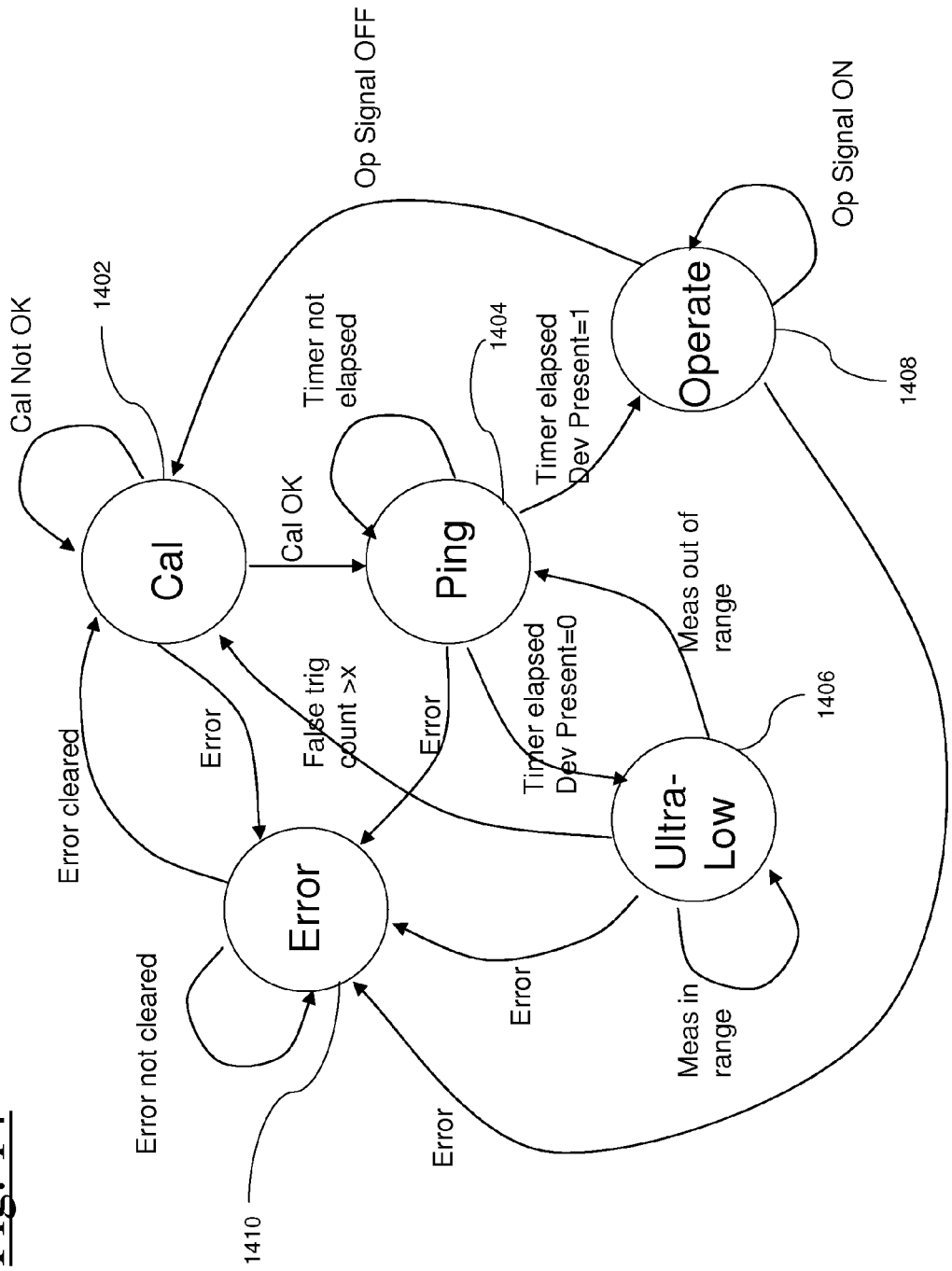
FIG. 14 shows an example state machine of a wireless power system not designed for upgrading

If the wireless power system has not been designed for future upgrading, then the ULP processor 702 can implement a state machine similar to the one in FIG. 14. The system starts in the Calibration State 1402. A calibration measurement is made and used to determine the upper and lower measurement thresholds for triggering an inductance change. After a valid calibration measurement has been made the system enters the Ping state 1404. The system remains in the Ping state for a set period of time, determined by decrementing a Ping counter on each state transition. After the Ping counter has reached zero, the system moves to the Ultra Low Power state 1406 if Device Present=0. If, however, Device Present=1, the system moves to the Operate state 1408. The counter should be set such that there is sufficient time for a device to be detected and the Device Present output enabled.

In the Ultra Low Power state 1406, the system measures the inductance on each state transition. It remains in this state until a measurement is made which is outside the upper and lower thresholds set by the Calibration state 1402. When such a measurement is found, the False trigger count is decremented and if it has not reached zero the system enters the Ping state 1404. If the false trigger count reaches zero, the system enters the Calibration state 1402. The false trigger counter is periodically reinitialised.

In the Operate state 1408, the system looks at the Device Present pin on each state transition. The system remains in the operate state 1408 until Device Present=0 and then moves back to the Calibration state 1402.

If the wireless power system encounters an error, the system moves to the error state 1410 until the error is cleared, at which point the system moves to the calibration state 1402.

Figure 15:
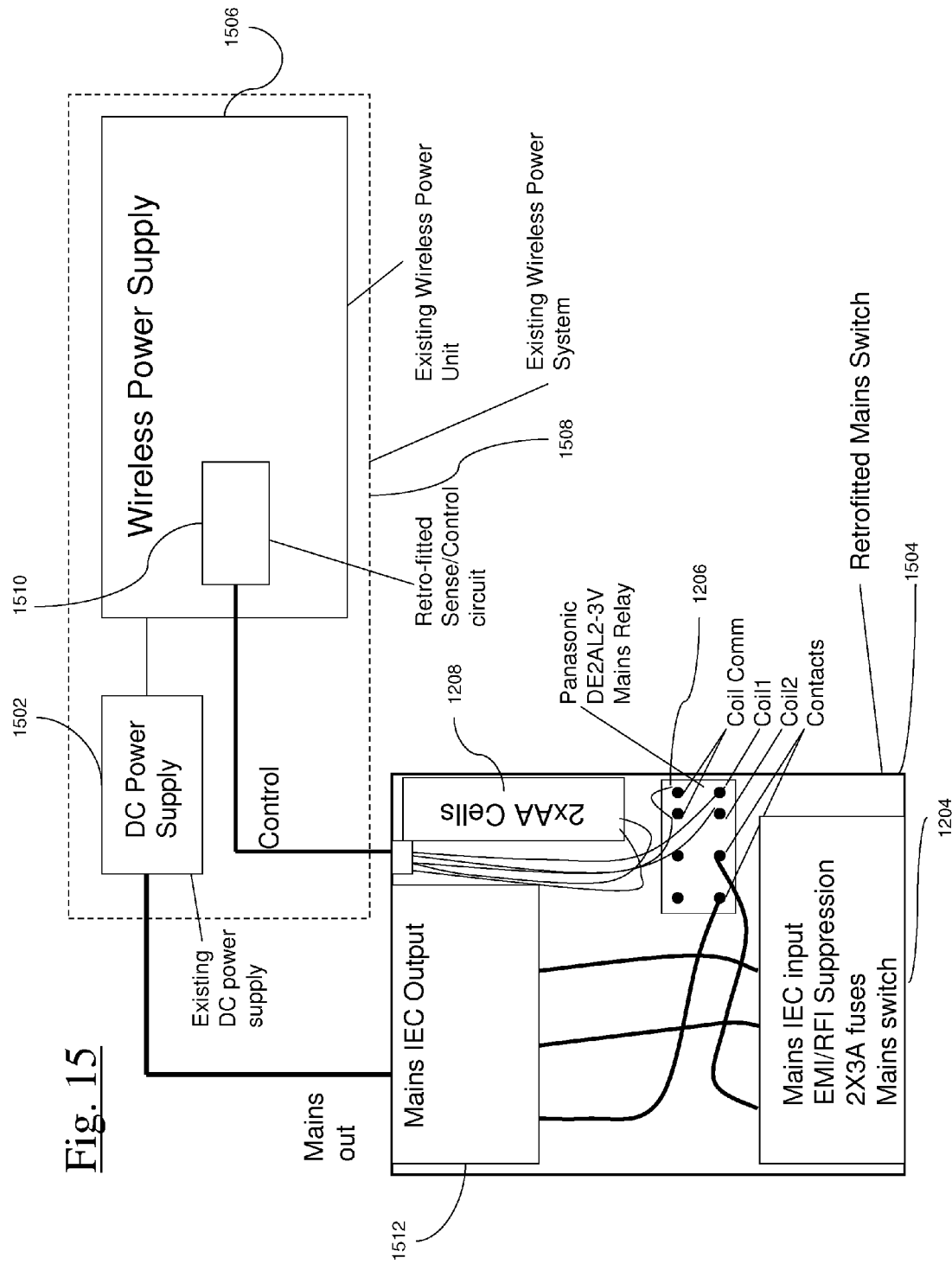
FIG. 15 shows an implementation where an existing DC power supply is retained

FIG. 15 shows an embodiment in which the existing DC power supply 1502 is retained. Instead there is a Mains switch 1504 which is retrofitted between the mains socket and the mains input of the existing wireless power supply system 1508. This system can be used if the existing wireless power unit 1506 has an integral DC power supply 1502 or if the DC power supply is a separate unit (not shown). The Mains switch includes the mains relay 1206, the energy storage element 1208 and a connector for the control cable. The control cable connects to a separate Sense/Control circuit 1510 which is retrofitted to the existing wireless power supply 1506.

The Sense/Control circuit 1510 includes a ULP circuit, for example the ULP circuit shown in FIG. 13. Alternatively The Sense/Control circuit 1510 could be completely independent and not require any connection to the main circuit as described in later embodiments. For example a separate proximity detector may be used. This is particularly convenient for retrofitting third-party systems where the main circuit is not accessible.

If there is no Device Present pin available, the control circuit can simply switch the mains on when there is a device detected by the proximity detector and off when there is no device detected.

Two relays may be used in the retrofit example so that the oscillator circuit has relatively short leads to the primary coil. This enables the AC resistance to be reduced to ensure reliable oscillator operation. The MOSFETs for the mains relay 1206 could alternatively be located within the replacement power supply.

Figure 16:
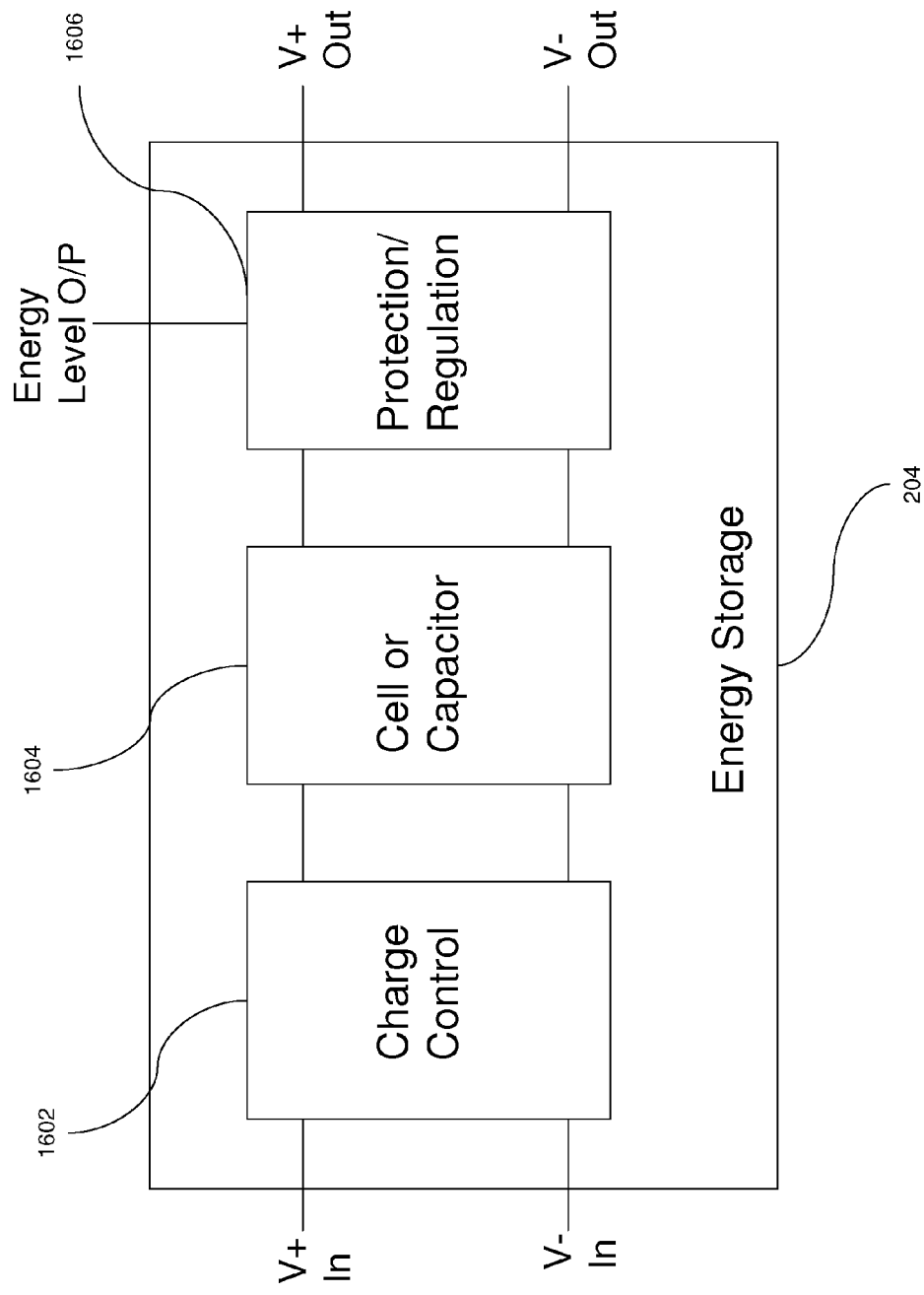
FIG. 16 shows an embodiment of a representative rechargeable energy storage unit

FIG. 16 shows one implementation of the Energy Storage Unit 204 in which the energy storage unit can be recharged from the main circuit 704. The Energy Storage unit 204 takes DC power as its input. This is coupled to a charge controller 1602 which supplies power to an energy storage element 1604. The energy storage element 1604 is optionally a supercapacitor, but other elements may be used such as a battery or other form of electrical energy storage. One form of charge controller 1602 that may used is a Buck regulator in which the output capacitor is replaced by the supercapacitor. Feedback is used to drive the Buck regulator such that constant current is delivered to the supercapacitor. The energy storage element 1604 is coupled to the Energy Storage Unit output. There may also be protection circuits 1606 and/or voltage/current regulation/limitation 1606. In one embodiment there is also an output which is indicative of the energy level of the energy storage element 1604.

In the this embodiment, the Energy Storage element 1604 is monitored so that it does not deplete fully, preventing operation of the Sense Circuit 206. This may be charged from the power input when the Wireless power supply is delivering power to the load. In addition, the Sense Circuit 206 periodically monitors the energy in the Energy Storage element 1604 via the Energy Level Output from the Energy storage unit 204. If this gets below a certain threshold, the Sense Circuit 206 activates SW1 202 so that the Energy Storage element 1604 can be recharged.

Figure 17:
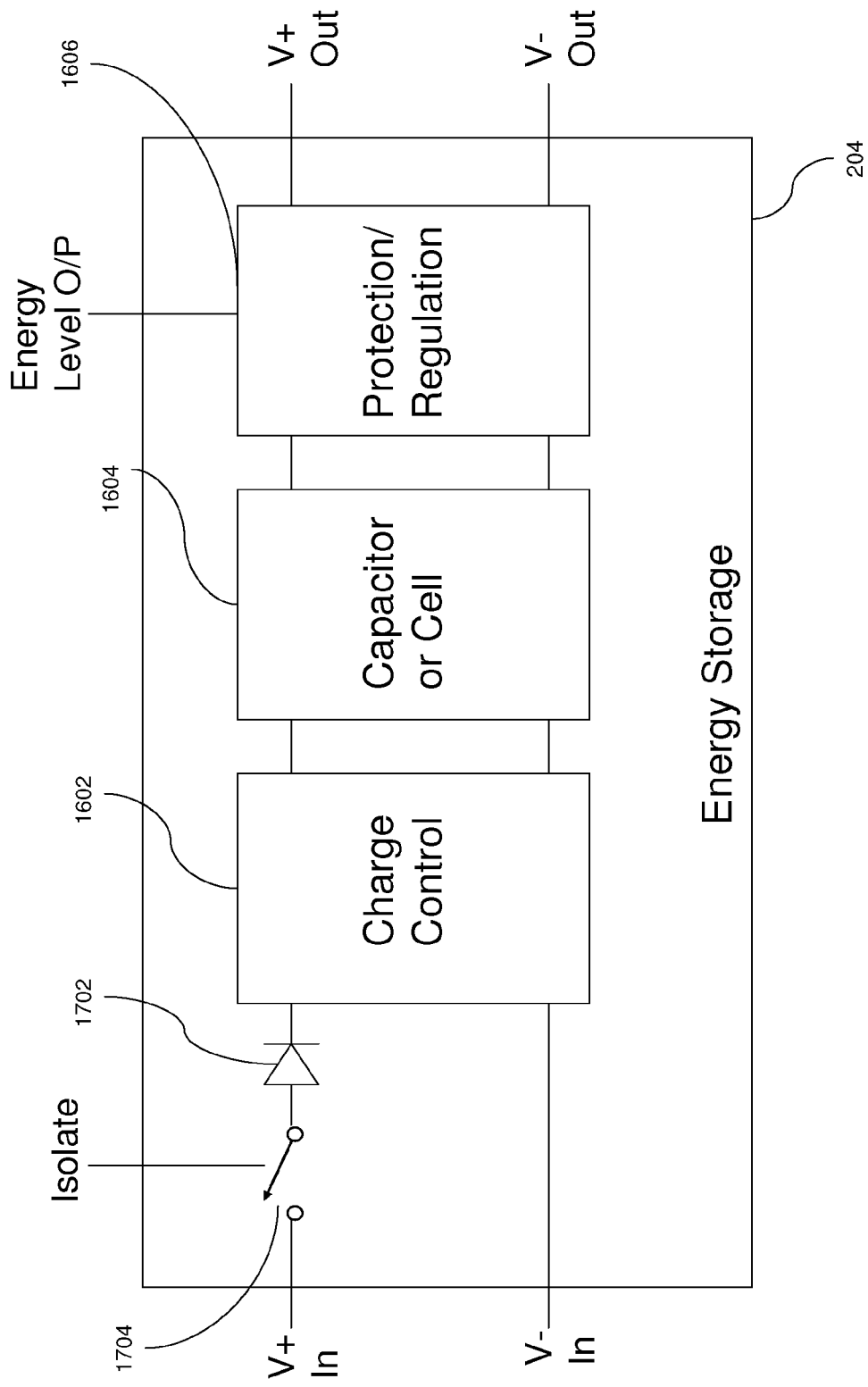
FIG. 17 shows an implementation of FIG. 16 that prevents back feed into the charging circuitry

FIG. 17 shows an Energy Storage unit 204 in which there is additionally a diode 1702 to prevent back feed of current into the charging circuitry. There is also a switch 1704 in this embodiment. The switch 1704 may be opened when the Sense Circuit 206 is being powered from the Energy Storage Unit 204 to prevent reverse leakage current from depleting the capacitor or cell. Instead of using a rechargeable Energy Storage unit 204, it is also possible to use a non-rechargeable primary cell. In this case, a battery compartment with a removable cover is used so that the battery or batteries may be removed when they are exhausted.

Figure 18:
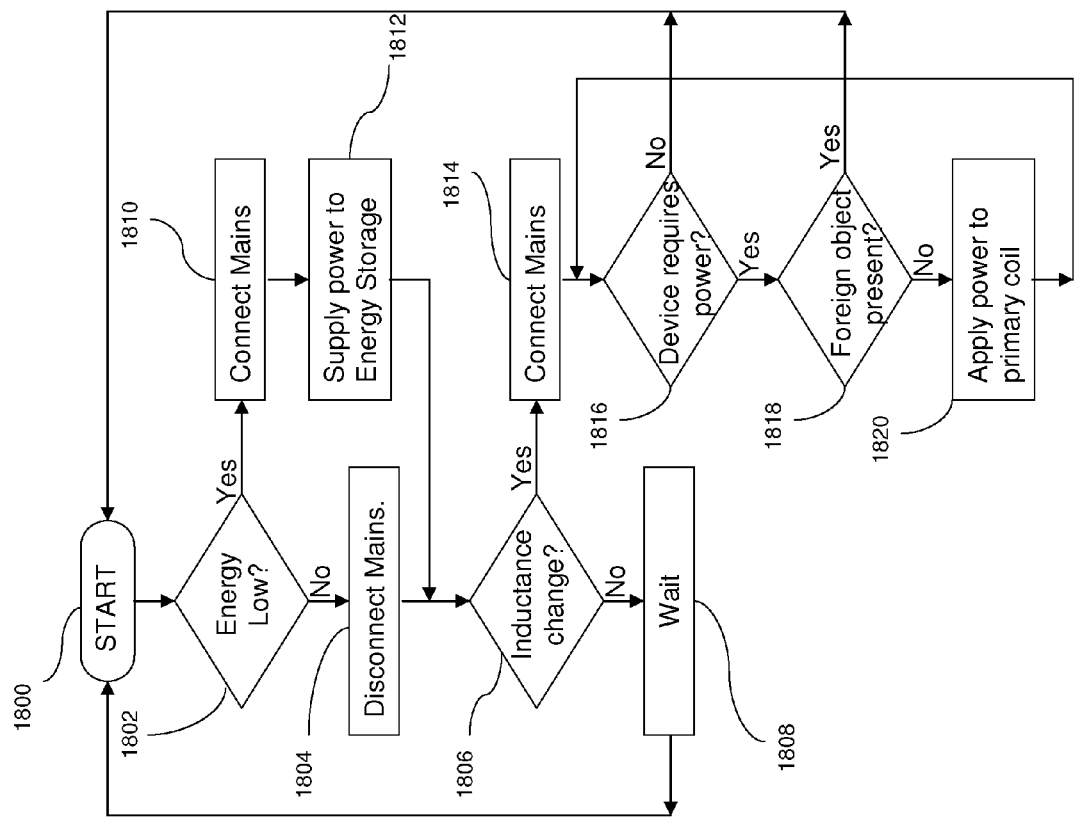
FIG. 18 shows an example flow diagram of wireless power supply operation

FIG. 18 shows an example flow diagram illustrating the operation of an ultra low power system. The system first checks 1802 the energy level in the Energy Storage element. If it is low then the mains is connected 1810 and power supplied 1812 to it to recharge it. If the Energy is not low then the mains is disconnected 1804 to reduce power consumption. The Sense Circuit 206 then sees if there has been an inductance change 1806. If there has not, then after a period of waiting 1808, the system goes back to the start 1800. If there has been an inductance change, the system connects 1814 the mains and sees if the there is a device requiring power 1816. If there is not it goes back to the start 1800. If there is, the system checks to see if there is a foreign object present 1818 (this may have been placed at the same time as the device). If there is then the system goes back to the start 1800. If there is not, then the system delivers power to the primary coil 1820 to supply power to the portable device. It continues to check that the device is still requiring power 1816 and only goes back to the start 1800 when the device no longer requires power or if a foreign object 1818 is placed on the wireless power supply.

In some embodiments, the primary unit makes a determination about whether a valid secondary device is present and whether a secondary device desires power. It should be understood that these determinations could be made simultaneously or at different times. For example, if the secondary device sends a request for power, that may be interpreted to indicate both that a valid secondary device is present and that a secondary device desires power. Further, to the extent that a secondary device desires power, it should be understood that the secondary device need not issue a request for power, or be low on power, in order to desire power. For example, the secondary device that wishes to receive a trickle charge may still be characterized as desiring power.

Figure 19:
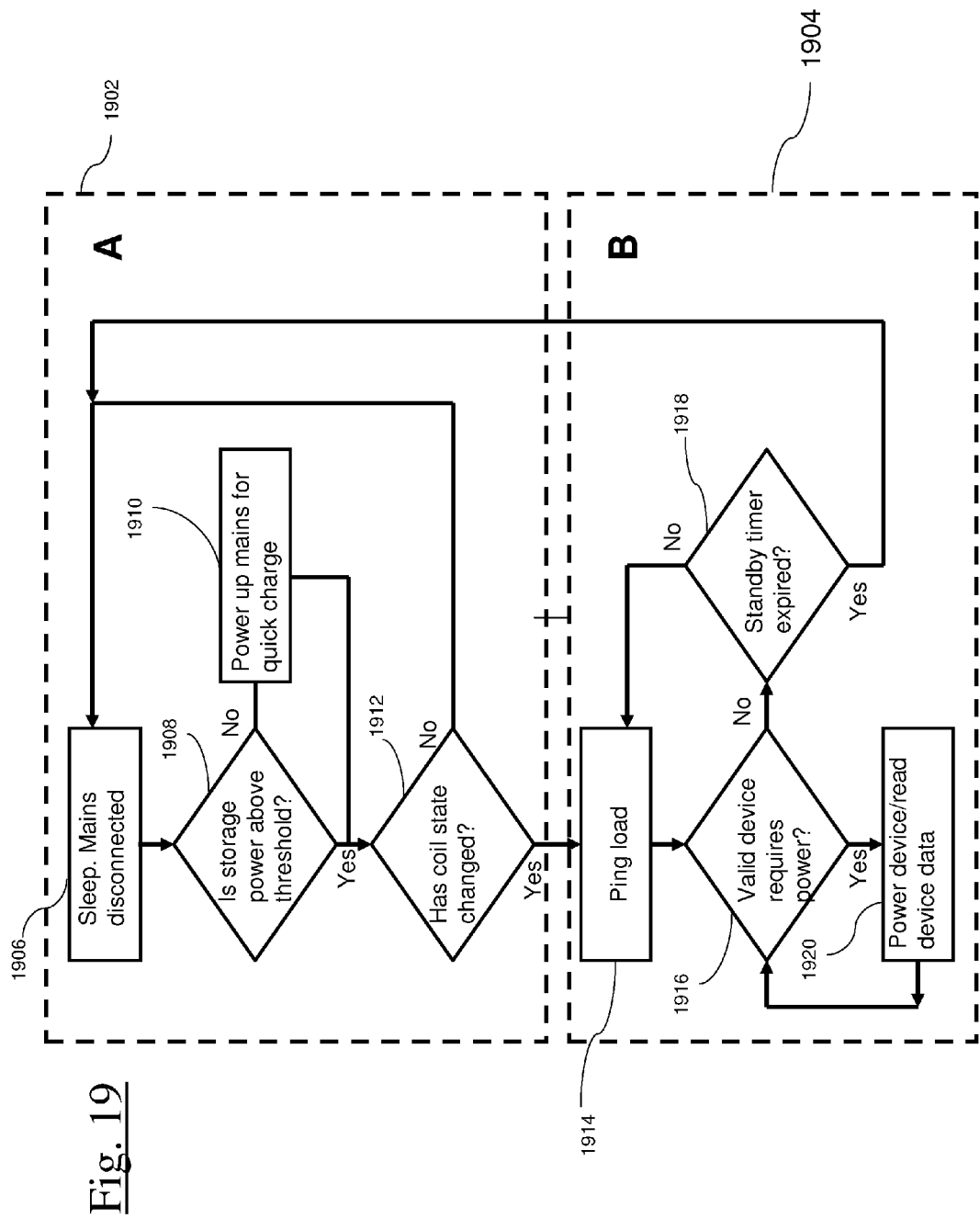
FIG. 19 shows a flow diagram of wireless power supply operation in which there are two power states

FIG. 19 shows one embodiment of a method for implementing the system in which there are two power states. In the first mode, A, 1902 the system is in the equivalent to the ultra low power mode described above 1906. In this state the Sense Circuit 206 is powered from the Energy Storage Unit 204. If the Energy Storage Unit 204 gets low 1908, then the system powers up the mains 1910 to recharge it. The Sense Circuit 206 periodically looks for a change 1912 indicating a device or object may have been placed on or removed from the charger. If the Sense Circuit 206 detects that a change has taken place then the System enters state B 1904.

In mode B 1904, system is connected to the mains. The system periodically 'pings' 1914 the system by modulating the primary coil, Lp. If there is a portable device present then it replies (e.g. by modulating its load). If the system detects 1916 that there is a valid device then after checking that there are no foreign objects present, the system will deliver full power to the primary coil 1920. The system will keep sending a 'ping' for a predetermined number of 'pings' or a predetermined amount of time 1918. These predetermined numbers may be software configurable (and/or dynamically variable). If no device is detected during this time then the system will go back into state A 1902.

One advantage of this arrangement is that it gives more opportunity to check if there is a valid device present. This prevents the system remaining in standby indefinitely if there is a valid device on it that was not detected on the first 'ping'. Some portable devices take time to 'wake up' The first 'ping' may deliver sufficient power to start-up the microprocessor. However it may take longer to 'boot up' than the 'ping' duration. Such a device should then authenticate on the second 'ping'.

Figure 20:
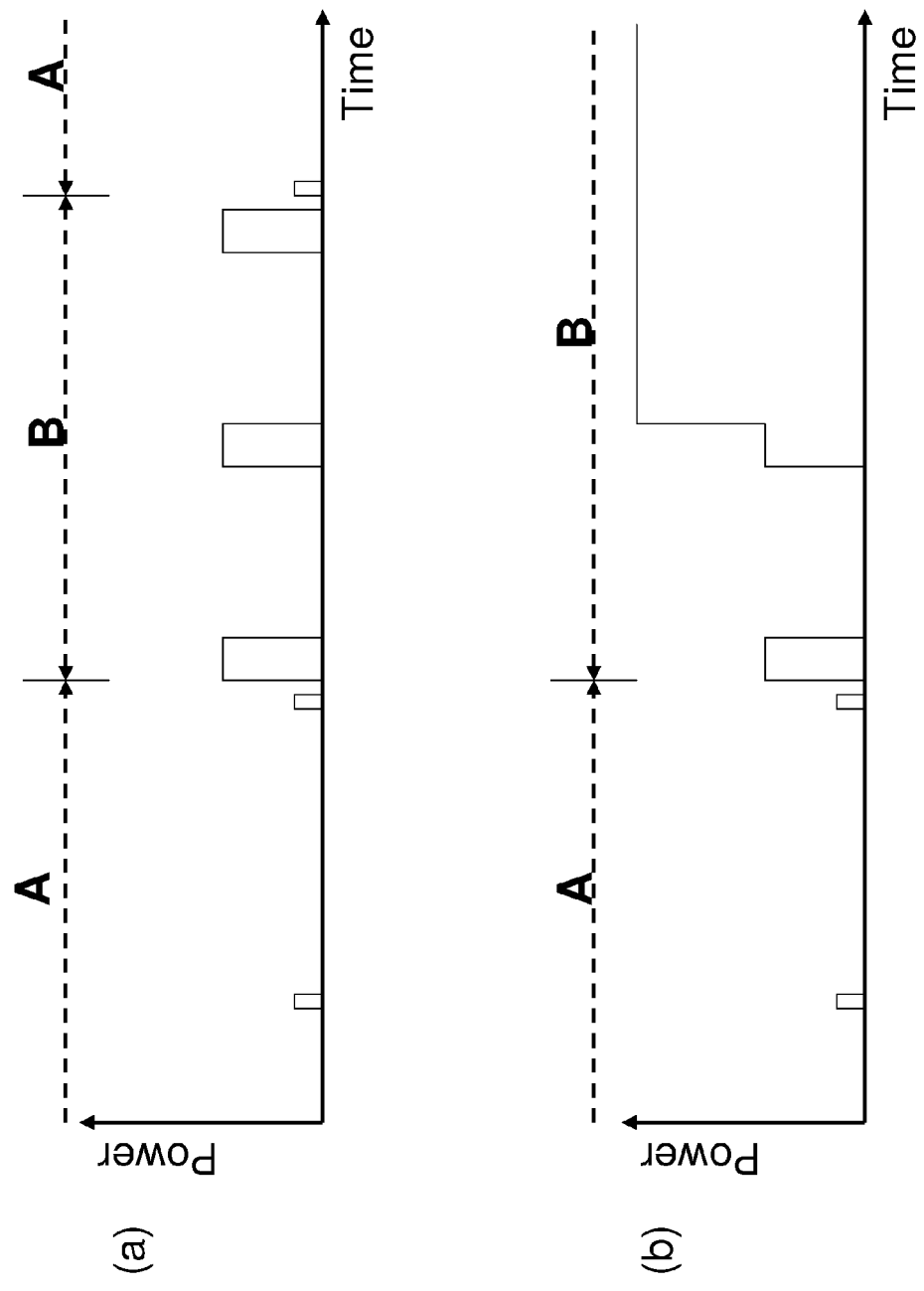
FIG. 20 shows a timing diagram of FIG. 19

FIG. 20 shows an exemplary timing diagram to illustrate the method of FIG. 19. FIG. 20(a) shows the system when a foreign object is place on the system. The system starts in mode A 1902. It sees an inductance change and then goes into mode B 1904 for three 'pings'. These 'pings' can be of a different time interval to the polling of the Sense Circuit 206. As no device is detected, the system goes back to mode A 1902. FIG. 20(b) shows the system when a valid device is placed on the system. In this example, the device does not authenticate on the first 'ping', but it is able to on the second 'ping'.

Figure 21:
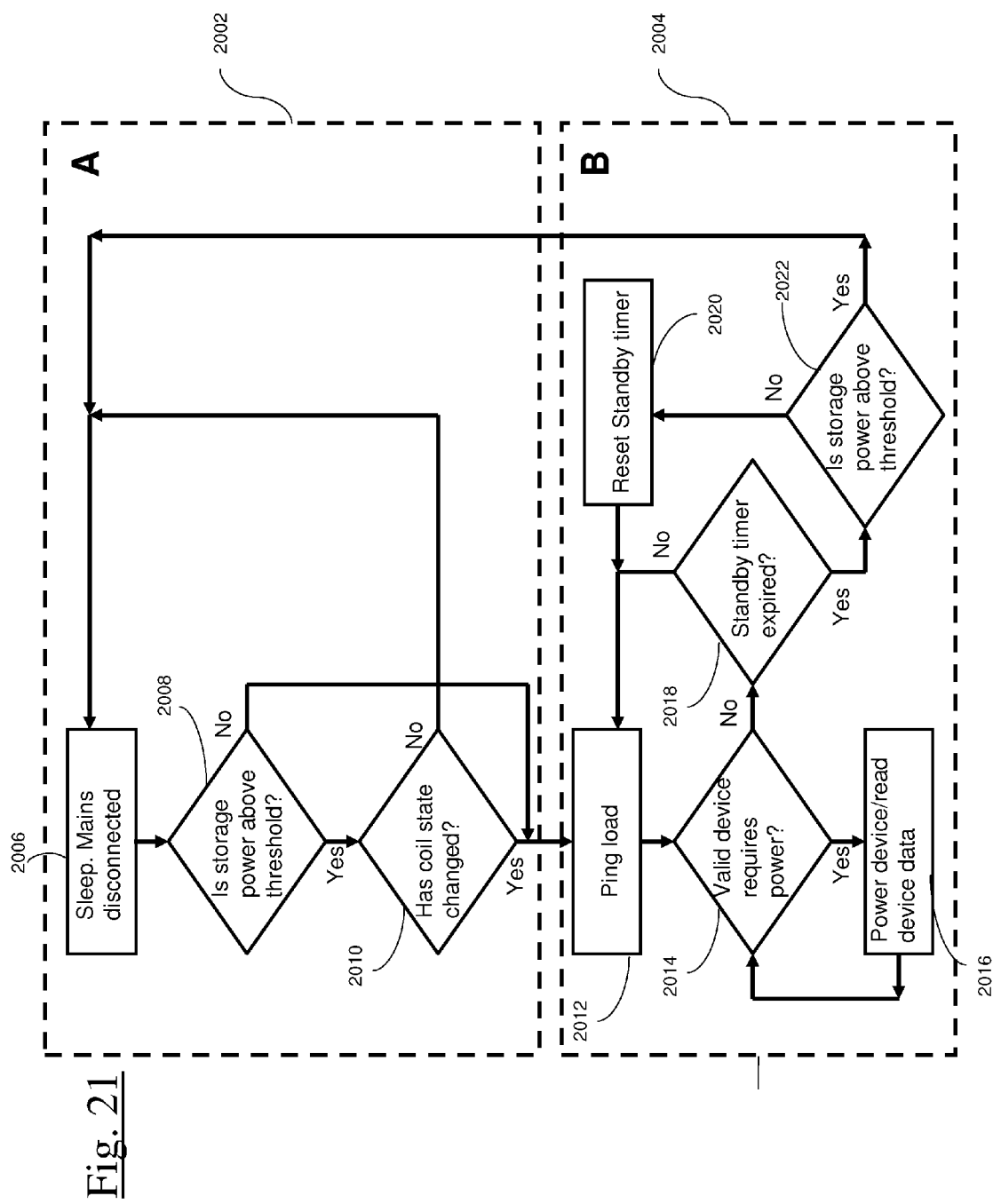
FIG. 21 shows an example flow diagram of operation in which the energy storage unit requires a relatively long recharge

If the Energy Storage unit 204 requires a relatively long time to recharge, then instead of powering up for a quick charge (for example if the Energy Storage unit 204 is a battery such as a Li-ion battery), then the example flow diagram of FIG. 21 could be used. In this flow diagram the system leaves sleep mode 2002 with the mains disconnected 2006 and enters Mode B 2004 if the Energy Storage unit 2004 falls below a set threshold 2008 or the coil state changes 2010. The system remains in Mode B 2004 until there are no devices requiring charge 2012, 2014, 2016 and the Energy Storage unit has been fully charged 2018, 2022, 2020.

Figure 22:
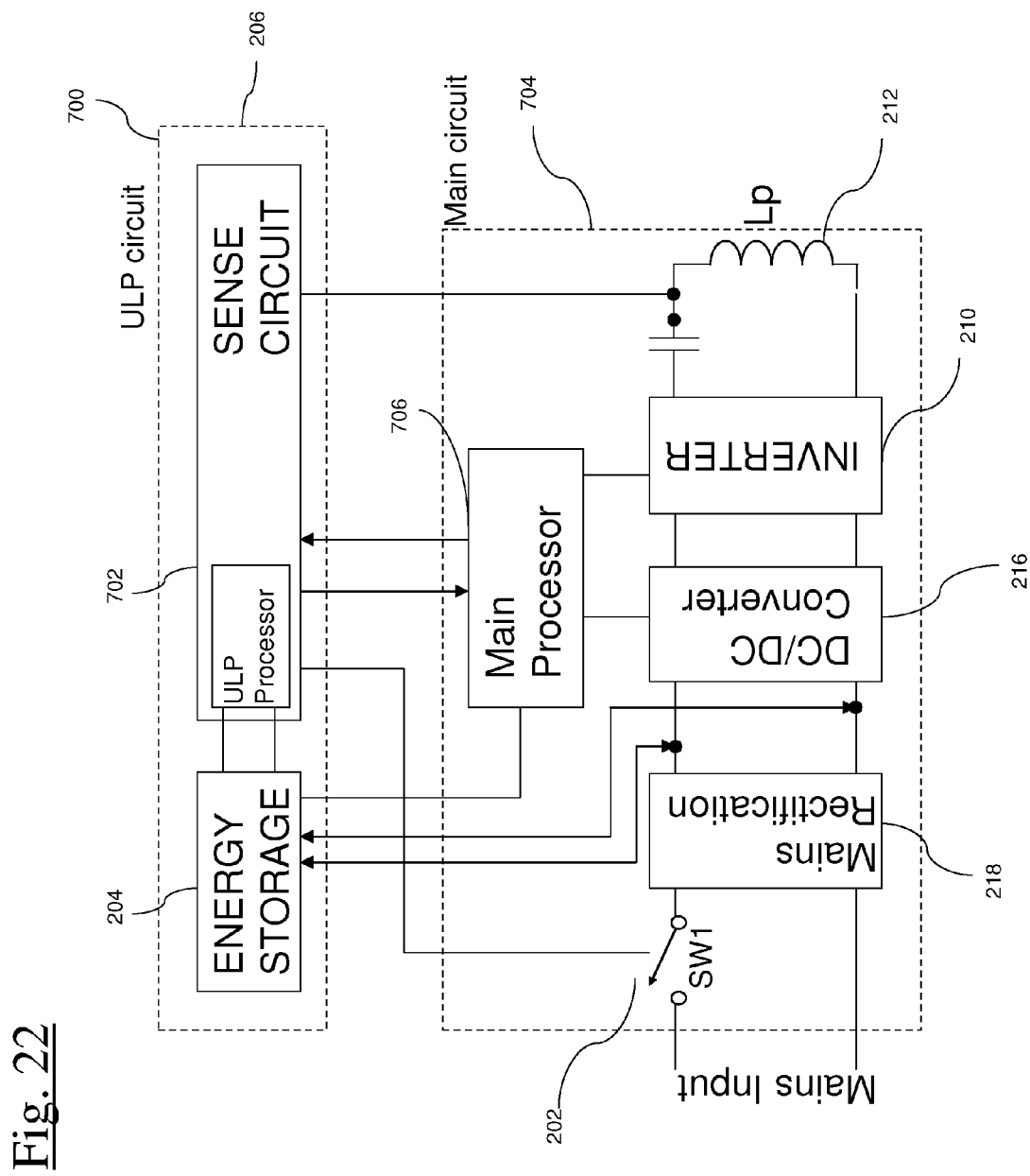
FIG. 22 shows an alternative to FIG. 2 where the energy storage unit also powers the main circuit

FIG. 22 shows an alternative embodiment in which the energy storage unit 204 is also used to power the main circuit 704 for a period of time. In order to reduce the time delay between the device triggering the system and the system powering up, the system uses the Energy Storage element 1604 as a temporary source of power. Once the Sense Circuit 206 is triggered, the mains is switched on. The system then connects the Energy Storage element 1604 to the main circuit 704 to power up the various elements. This allows the system to authenticate the device whilst the mains power is still powering on. The energy required to authenticate a device may be less than that required to deliver power. Optionally, if the Energy Storage element 1604 is of sufficient capacity to deliver power, the system may also supply power from the Energy Storage element 1604 to the device. Once the mains has powered up along with all the other supplies, the system switches over so that it is fully powered from the mains. The system can then also supply power to the energy storage unit 204 in order to recharge it.

Figure 23:
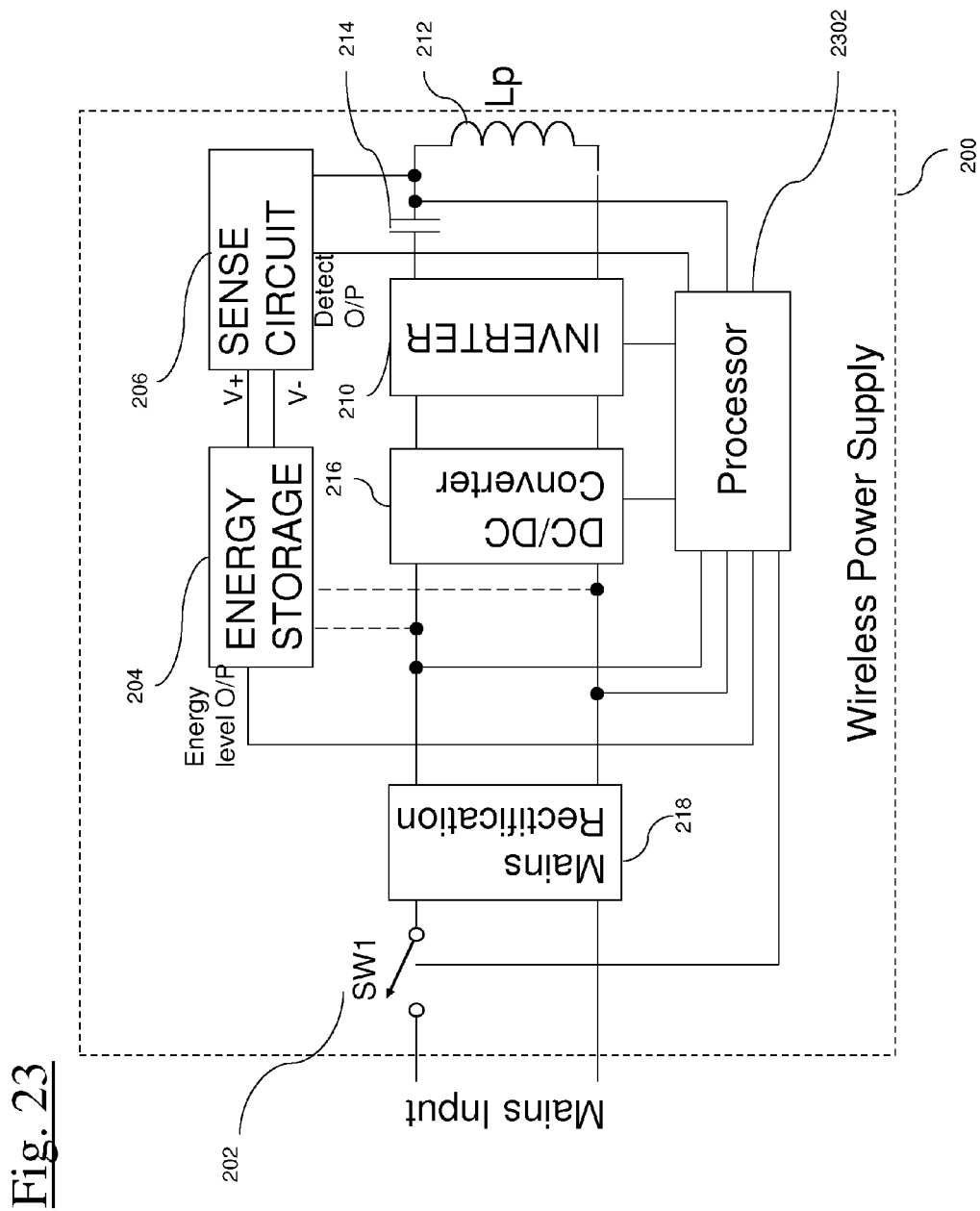
FIG. 23 shows an alternative to FIG. 2 in which a single processor performs ULP and main circuit functions

FIG. 23 shows an alternative embodiment in which a single processor 2302 is used instead of separate processors for the ULP circuit 700 and the mains circuit 704. In this arrangement, the processor 2302 would only power up the elements that it requires at any particular time. The single processor 2302 could be powered from the Energy Storage element 1604 continually, or alternatively it could switch its power input to the mains generated one if it is powered up. In order to conserve power, the single processor 2302 could 'switch' clocks so that it runs at a lower clock speed in ultra low power mode. This embodiment may additionally use the energy storage unit 204 to supply power to devices whilst it is waiting for the mains to power up. The single processor 2302 configuration could be used to implement all the embodiments in which two or more processors are used. This includes deducing information about the device from the inductance sensing and using this information subsequently, such as identifying the type of device and appropriately adjusting frequency and voltage.

The processor may be configured to be a dual core (or multi-core) processor. The two cores may run independently of each other. One core (the Main core) is used for the main wireless power circuit and the other core (the ULP core) is used for the ULP functionality (such as the sense circuit and control of the Relays). Some or all of the sense circuit may be incorporated into the ULP core (e.g. comparators for the oscillator circuit and other passive components). The main core may be powered down when in ULP mode and the ULP core may be powered down in operating mode. During transition periods, both cores may be powered. The ULP core may take its power exclusively from the energy storage unit or it may take its power from a combination of the mains circuit and the energy storage unit or it may take its power only from the mains circuit. The ULP processor may be optimised for lower power consumption than the main processor (e.g. by running at a lower clock speed). The ULP core may be isolated from the main core (e.g. by etching trenches or depositing insulating material) in order to minimise current leakage.

A number of different processors and control units are described throughout the various embodiments. The FIG. 2 embodiment includes a control unit 208 and a sense circuit 206 that includes an integrated microprocessor, for example as shown in FIGS. 4-6. The FIG. 7 embodiment includes a ULP circuit with a ULP processor separate from the sense circuit. The sense circuit may or may not have its own microprocessor in the FIG. 7 embodiment. The FIG. 16 embodiment of the energy storage device includes a charge controller. As just discussed, the FIG. 23 embodiment includes a single processor and the sense circuit does not include a processor. The FIG. 26 embodiment includes a microcontroller unit that has includes a digital oscillator output and an analogue to digital (A/D) input. It should be understood that the number and function of the microprocessors may be spread out in essentially any manner that enables the appropriate control functions to be powered up and available at the appropriate times. To the extent that there are any substantive differences introduced by the introduction of different terminology, such as processor, microprocessor, MPU, MCU, PIC, ULP processor, charge control, charge unit, or any other controller terminology, these differences in terminology should not be read to limit the scope of the invention. Instead, it should be understood that the controller locations and schemes may be exchanged among the embodiments.

Figure 24:
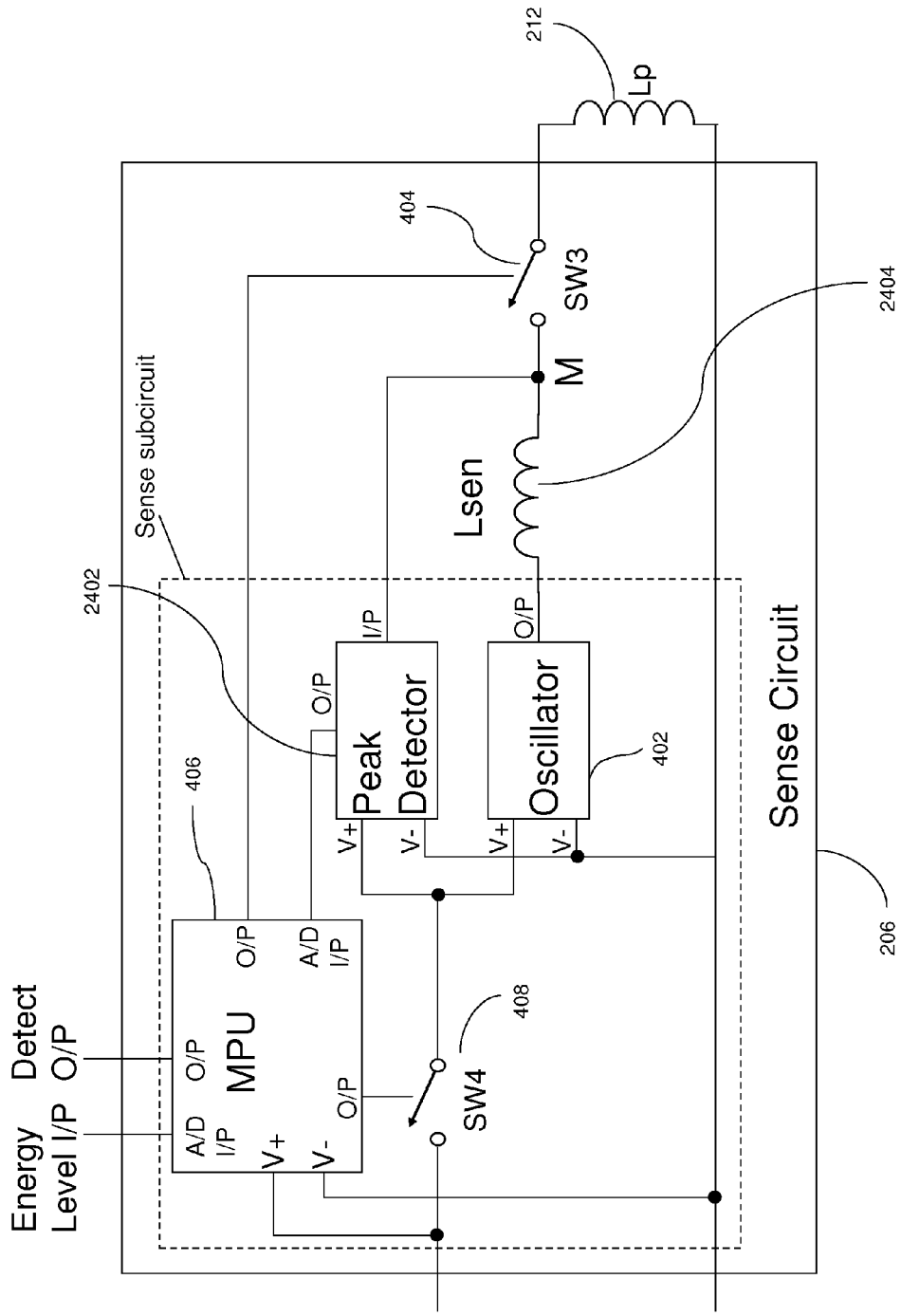
FIG. 24 shows a representative sense circuit using an additional sensing inductor

Instead of measuring the frequency of an oscillator 402 to implement the Sense Circuit 206, there are numerous other techniques that may be employed. FIG. 24 shows an alternative implementation of the Sense Circuit 206. In this arrangement, the Sense Circuit 206 uses the same coil for detection as used for the transfer of power, Lp 212. The Sense Circuit 206 has an additional inductor Lsen 2404, which forms a bridge with the primary coil, Lp 212. (Although an inductor is used any impedance: resistive, reactive or a combination of other elements may be used), This bridge may be driven with an Oscillator 402. In this embodiment, the oscillator output voltage and frequency is such that there is minimal power dissipation across the inductance bridge formed between Lsen 2404 and Lp 212. If the inductance seen across Lp 212 changes, then this will result in a change in the peak voltage at the midpoint of the bridge, M. This inductance would change if a portable device, such as that shown in FIG. 1 was placed on the wireless power supply 200, such that the secondary coil coupled to the primary coil. This would be true whether or not there was a load in the portable device. The inductance would also change if a metal object or an object containing magnetic material was placed in proximity to the primary coil, Lp 212. Likewise the inductance would change if a device or metal object was removed from the wireless power supply 200.

In this embodiment, the Sense Circuit 206 detects the peak voltage at point M using a Peak Detector 2402. The output of the Peak Detector 2402 is fed into a microprocessor unit (MPU) 406. The MPU 406 periodically reads the value of the peak detector 2402. If this value changes, between two consecutive readings then the Sense Circuit 206 determines that an inductance change has occurred, and the Wireless power supply 200 checks if there is a valid device requiring power or whether this is due to a foreign object. It may perform a running average on the measurements to reduce the effect of noise.

The sense circuit 206 may use two switches controlled by the MPU 406, SW3 404 and SW4 408. In the illustrated embodiment, SW3 404 is used to isolate the Sense Circuit 206 from the primary coil, Lp 212 when wireless power supply 200 is delivering power to the portable device. Switch SW3 404 is closed during standby mode and open during power delivery. Switch SW4 408 is used to reduce the power consumption of the Sense Circuit 206 still further. Rather than have the Oscillator 402 and Peak Detector 2402 powered continuously, the MPU 406 only closes SW4 408 for the duration of each inductance measurement. Although SW3 404 is controlled by the MPU 406 within the Sense Circuit 206 in this example, it may instead be controlled by the Control Unit 208 within the main Wireless Power Supply 200.

Figure 25:
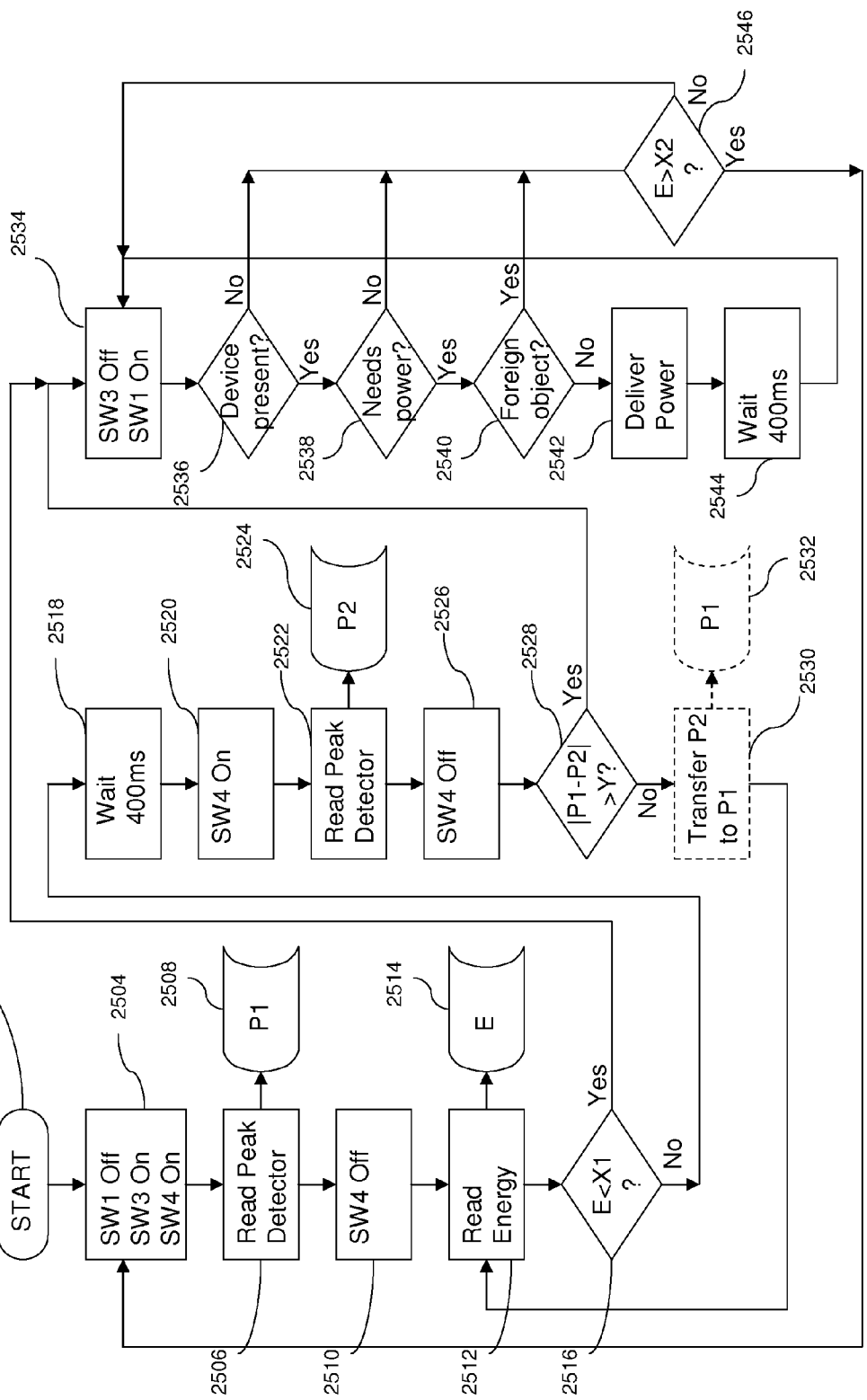
FIG. 25 shows a flow diagram illustrating separate measurements made to determine inductance change

FIG. 25 shows a flow diagram illustrating one implementation of the system. This flow chart illustrates the separate measurements made to determine the inductance change. In this variation, if the Energy Storage element 1604 is depleted then the system temporarily does not use the Sense Circuit 206, but only uses the device validation system until the Energy Storage element 1604 is charged. In FIG. 25, X1 is the threshold below which the Energy Storage element 1604 is recharged, X2 is the threshold above which it is fully charged. Y is the difference in inductance measurements to trigger the Sense Circuit 206. In this example, the memory containing the inductance reading is updated after each measurement. This means that the circuit will follow drifts over time, e.g. due to fluctuation in the coil inductance with ambient temperature. Alternatively, the memory is not updated. This will mean that there will be more false triggers due to fluctuation in ambient conditions. However, it will also prevent the system from being fooled if a device is brought very slowly into proximity with the system.

Referring now to FIG. 25, beginning at the start 2502 of the flow diagram, SW1 is opened while SW3 and SW4 are closed 2504 so that the peak detector can be read 2506 and stored into memory 2508. When the measurement is complete, SW4 is opened 2510 and the amount of energy in the energy storage element is measured 2512 and stored in memory 2514. If the amount of energy is not below the threshold 2516, then the processor waits 2518 and closes sw4 2520 to ready the peak detector 2522 and store the value into memory 2524. Once the second peak reading is taken SW4 is opened 2526 and the absolute value of the two readings are compared to a threshold 2528. If the comparison is below the threshold then there is not a large enough difference in the inductance measurements to trigger the Sense Circuit and the second measurement overwrites the first measurement in memory 2530, 2532 before returning to read the amount of energy in the energy storage element 2512. If the difference in inductance measurements triggers the Sense Circuit 2528 or the energy storage element needs to be recharged 2376, then SW3 is opened and SW1 is closed 2534. The system determines whether a device is present 2536 and whether it needs power 2538. If no foreign object is present 2540 then power is delivered to the remote device 2542. After a waiting period, a waiting period

2544, the system checks to see if the device is still present, needs power, and that no foreign objects have been placed. If a device isn't present, doesn't need power, or if a foreign object is present, then the system checks if the energy storage element is above its charged threshold 2546. The system will continue to charge the energy storage element until it is above the threshold and then return to standby 2504.

Figure 26:
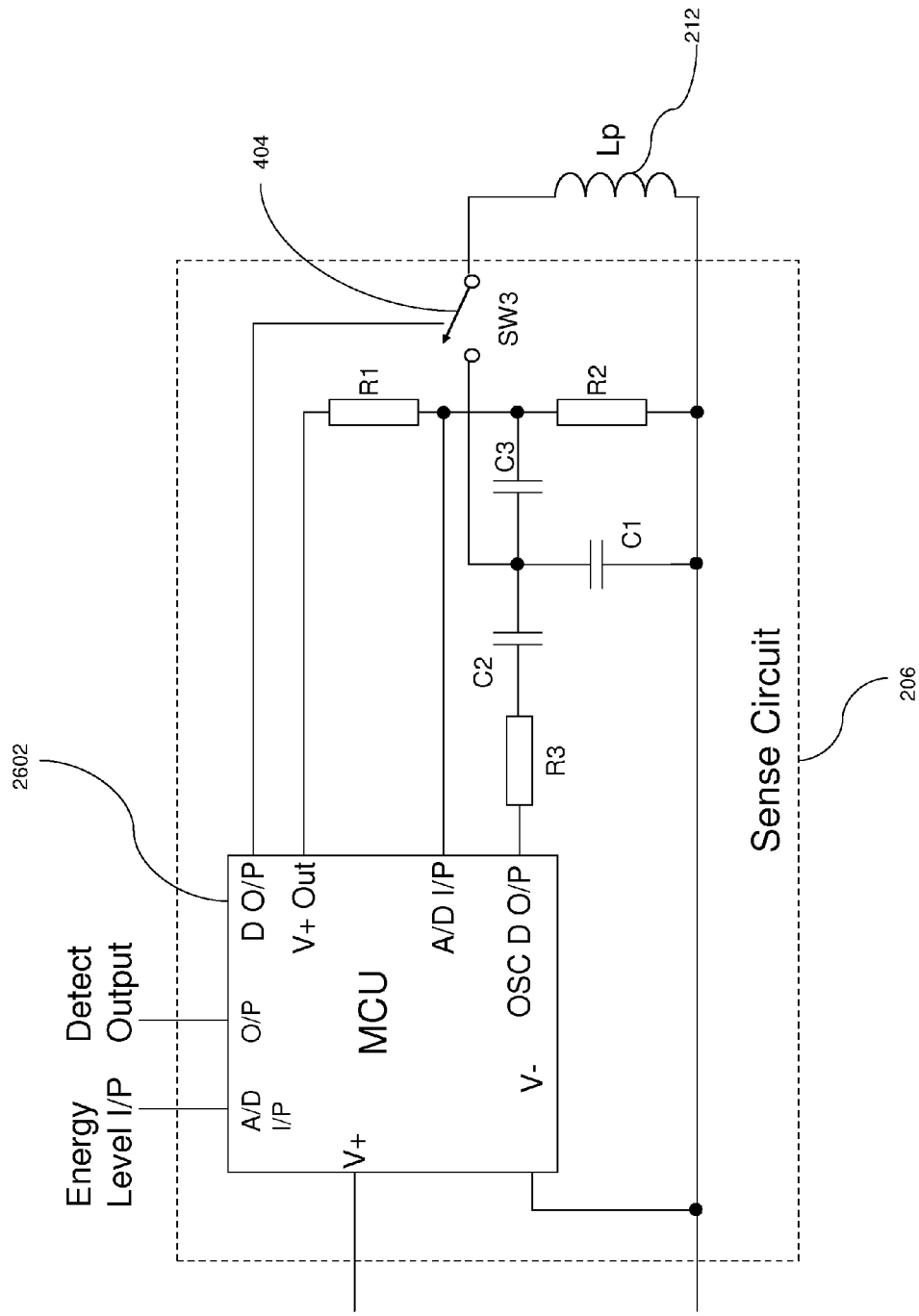
FIG. 26 shows a sense circuit of FIG. 4 utilizing a microcontroller

FIG. 26 shows one implementation of a sense circuit using a microcontroller unit (MCU) 2602. The MCU includes a digital oscillator output and an analogue to digital (A/D) input. In this implementation, the inductance of the primary coil, Lp 212 is used to form a bandpass filter. This filter is used to selectively filter the fundamental frequency component of the square-wave signal to generate a sinusoidal one. However, as the inductance of Lp 212 changes, the passband frequency also changes, thereby altering both the amplitude and phase of the resultant signal. One advantage of this embodiment is that the filtering and inductance detection are performed in the same step using only passive components.

In this embodiment, the digital squarewave output is AC coupled via C2 to the parallel combination of Lp 212 and C1. Lp and C1 are resonant in the vicinity of the oscillator frequency. This combination is then AC coupled via C3 to a level shifter formed by R1 and R2. R1 and R2 add a DC component to the signal to prevent negative voltages entering the MCU. The top of R1 is fed with the rail voltage of the oscillator. This is provided from an output pin of the MCU 2602. This means that when a measurement is not taking place that the MCU 2602 can remove this voltage and prevent power dissipation through R1 and R2. The output from the level shifter is applied to the analogue to digital converter input of the MCU 2602.

Generally, greater sensitivity can be obtained at the expense of higher power consumption, so there is a trade-off to be made. This could be for example, using amplifiers, using phase sensitive detection rather than peak detection, using higher voltage levels, or having longer acquisition times and hence less time when the Sense Circuit 206 is in sleep mode. It is possible to make this trade-off software configurable, so that depending on where the system is located, the sensitivity and power consumption can be optimised.

The frequency of the oscillator signal in the Sense Circuit 206 may dynamically adapt. This could be to position the frequency on the most sensitive part of the inductance versus output amplitude curve, or to position it in a region of low power dissipation or to position it in an optimised trade-off between the two. The frequency could be adapted at power up, periodically or whenever the Sense Circuit 206 is reset. For instance when a device or metal object is placed on the wireless power supply 200 it might take the Sense Circuit 200 close to the limit of its dynamic range. The Sense circuit 206 could adjust the oscillator to bring it back to near the centre of the range when sensing for the next event. An alternative way of implementing the system is to always adjust the frequency to the position of maximum amplitude. Any reduction in amplitude would then indicate that a change had taken place.

Figure 27:
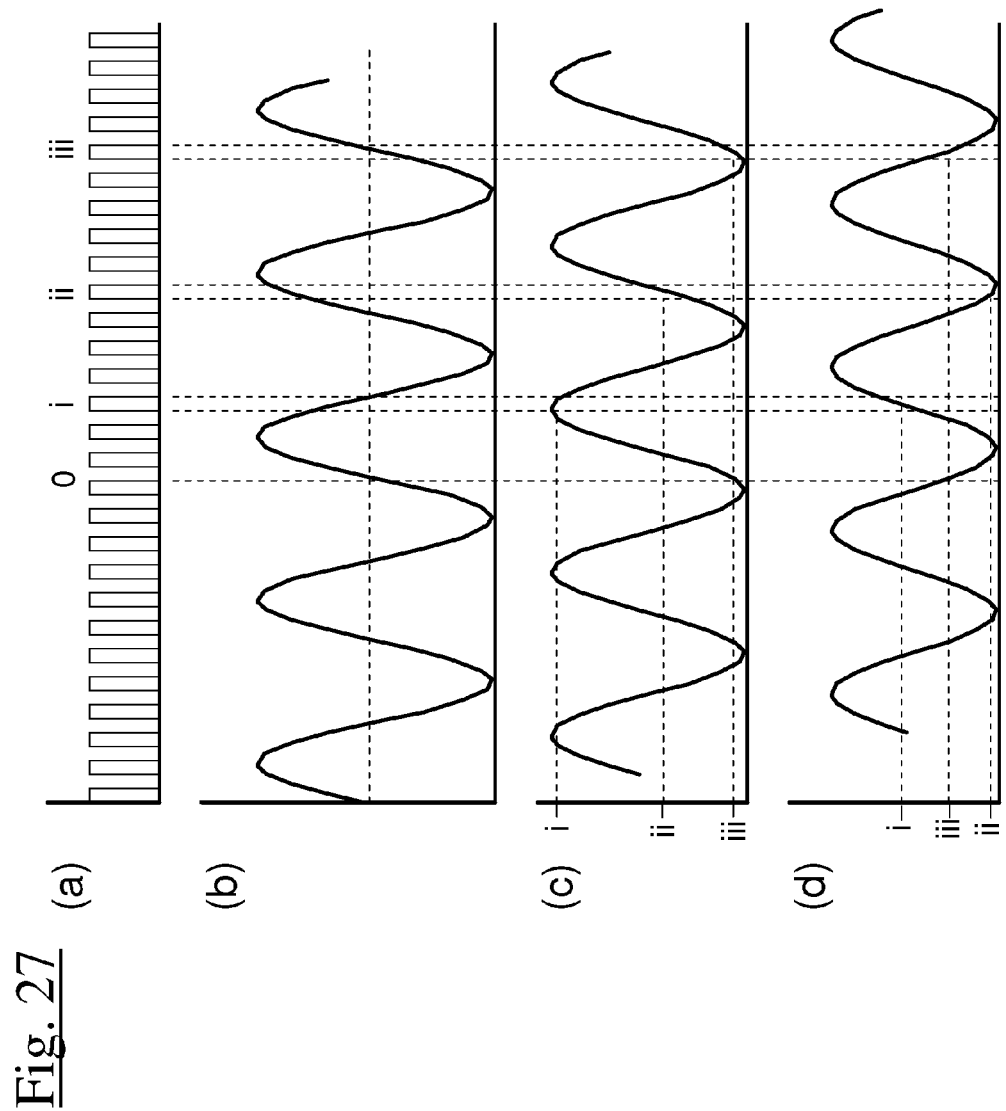
FIG. 27 shows exemplary operation of the circuit of FIG. 26

FIG. 27 shows exemplary operation of this circuit of FIG. 26. FIG. 27(*a*) shows a signal within the MCU 2602 (divided down from its internal oscillator clock). FIG. 27(*b*) shows the oscillator output from the MCU 2602 which is applied to the impedance bridge. FIG. 27(*c*) shows the signal at the midpoint of the bridge under one set of conditions. This signal differs in amplitude and/or phase. FIG. 27(*d*) shows the signal at the midpoint of the bridge under a different set of conditions (for example if a device or metal object is placed on the wireless power supply). In general FIG. 27(*d*) differs from FIG. 27(*c*) in amplitude and/or phase. The microprocessor 2602 first allows the oscillator signal to settle. For each inductance measurement, a number of readings form the A/D converter are taken at a specific number of clock cycles from a given reference point, 0. These three reading points are labelled i, ii, iii in FIG. 27(*a*). The values read by the A/D converter at these reading points are illustrated in FIGS. 27(*c*) and 27(*d*). It can be seen that in this example the values obtained in the case of FIG. 27(*d*) differ to those of FIG. 27(*c*) indicating that some change has occurred. One advantage of sampling the signal at different points, rather than simply measuring the peak signal is that the sense circuit 206 can be made more sensitive because the circuit responds to changes in phase as well as amplitude. In one embodiment, the measurement points do not coincide with the same points in the cycle of the sense frequency. In particular at least one reading may be obtained which is of significant amplitude as comparing two values close to zero is prone to errors induced by noise. One way to ensure this is to make sure that the time interval is not constant (e.g. the time interval between reading i and reading ii is different to that between reading ii and reading iii).

The Sense Circuit 206 may be sensitive to phase, because it is possible that there is a change in impedance caused by the addition of ferrite or other similar material in the secondary coil which exactly balances the impedance of the load. An alternative to making the Sense Circuit 206 phase sensitive is to make two peak amplitude measurements at different frequencies as the inductive impedance has a different frequency dependence to the AC resistance losses.

Figure 28:
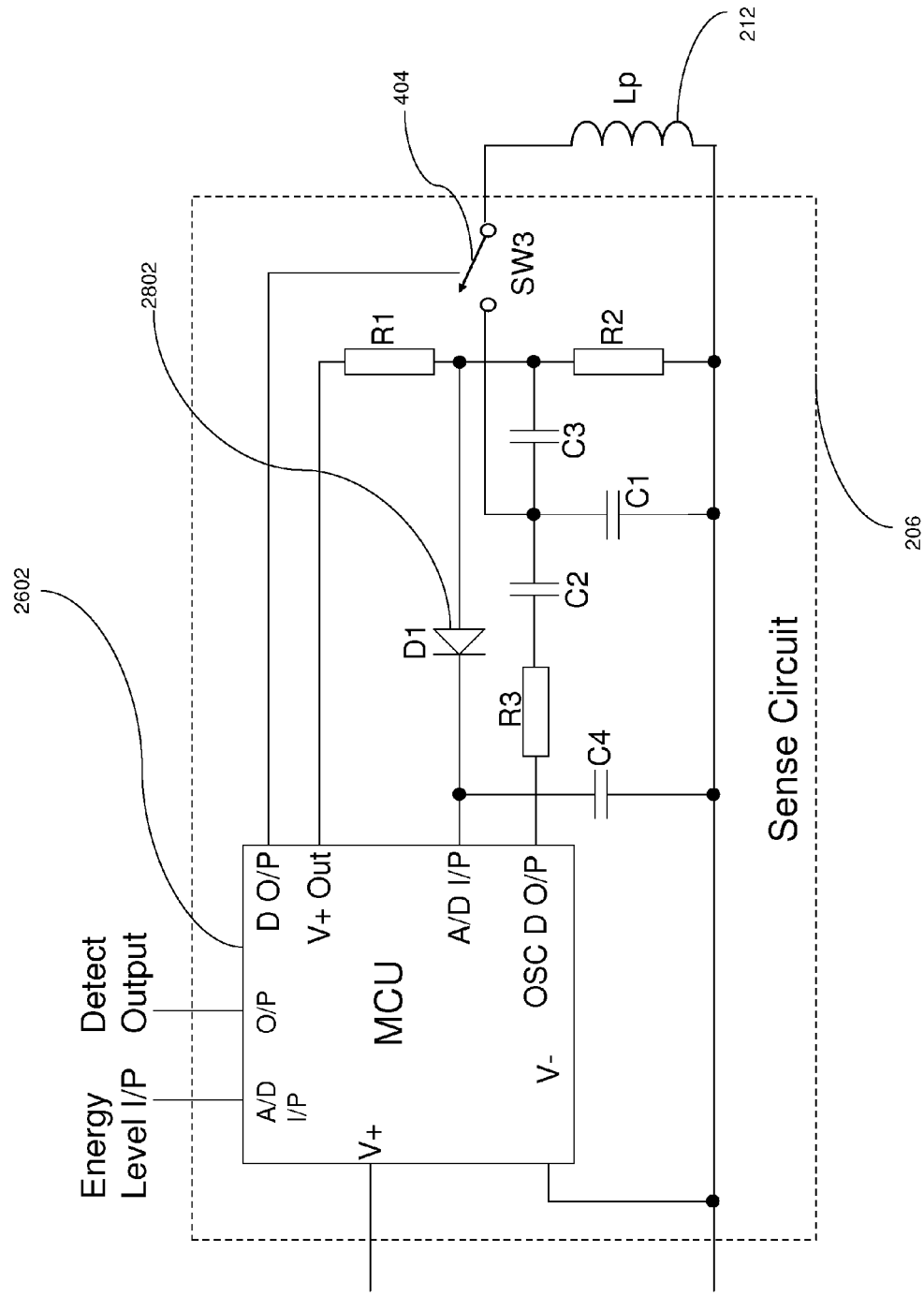
FIG. 28 shows a representative sense circuit using a peak detector

FIG. 28 shows an alternative embodiment of the FIG. 26 implementation where a peak detector is used. Some MPUs do not have fast analogue to digital converters, making a phase sensitive technique impractical. In this example, the peak detector is formed by a diode, D1 2802 and capacitor C4.

Figure 29:
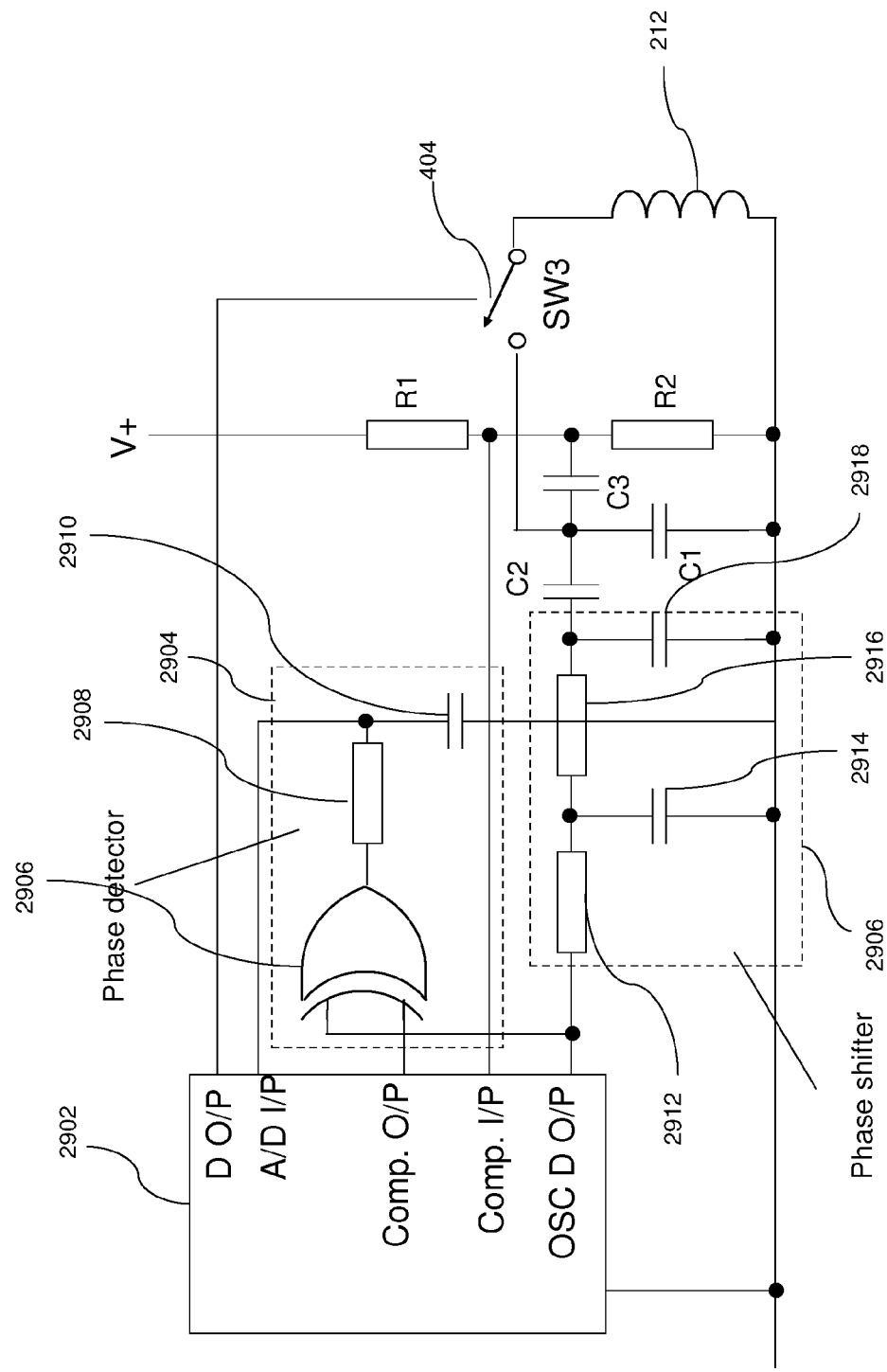
FIG. 29 shows a representative sense circuit using a phase-detection circuitry

FIG. 29 shows an alternative embodiment in which phase-sensitive detection is used. Capacitor C1 forms a bandpass filter with the primary coil, Lp 212, similar to the FIG. 26 embodiment. There are also DC blocking capacitors C2 and C3 and the level shifter (R1, R2). However, the output from the level shifter is coupled to the input of the internal comparator that the microcontroller 2902 of this embodiment employs. The other input can be set using an internal reference midway between the supply rails. This comparator is used to generate a clean digital signal from the level shifter which will be sinusoidal and attenuated. The digital signal from the comparator is coupled to one input of a phase detector (Phase Detector) 2904, the other input coming from the oscillator output. The output of the phase detector 2904 is coupled to an analogue input of the MCU. As the effective inductance of the primary coil 212 changes, the phase of the signal at the level shifter will vary with respect to the oscillator output. The phase detector 2904 has as an output an analogue voltage representative of the phase difference between signal relative to the oscillator output and is therefore a measure of the inductance.

The phase detector 2904 can be realised, for example, using a exclusive OR gate 2906 coupled to a low pass filter, the low pass filter being a series resistor 2908 and a capacitor 2910 to ground. Optionally, a phase shifter 2906 can be used in either path to the phase detector 2904. This can be used to bias the system so that the phase detector 2904 output is midway between its range when the bandpass response is centred on the oscillator frequency. Then it is possible to distinguish between positive and negative inductance excursions from the centre frequency. The phase shifter 2906 should provide 90 degrees of phase shift. This may be implemented by using two RC networks (2912, 2914, 2916, 2918)

as shown at the expense of attenuating the signal. Rather than introduce extra attenuation into the signal path, an alternative is to phase shift the oscillator signal applied to the second input of the phase detector. In this case the signal may be converted to a digital signal using a second comparator.

Figure 30:
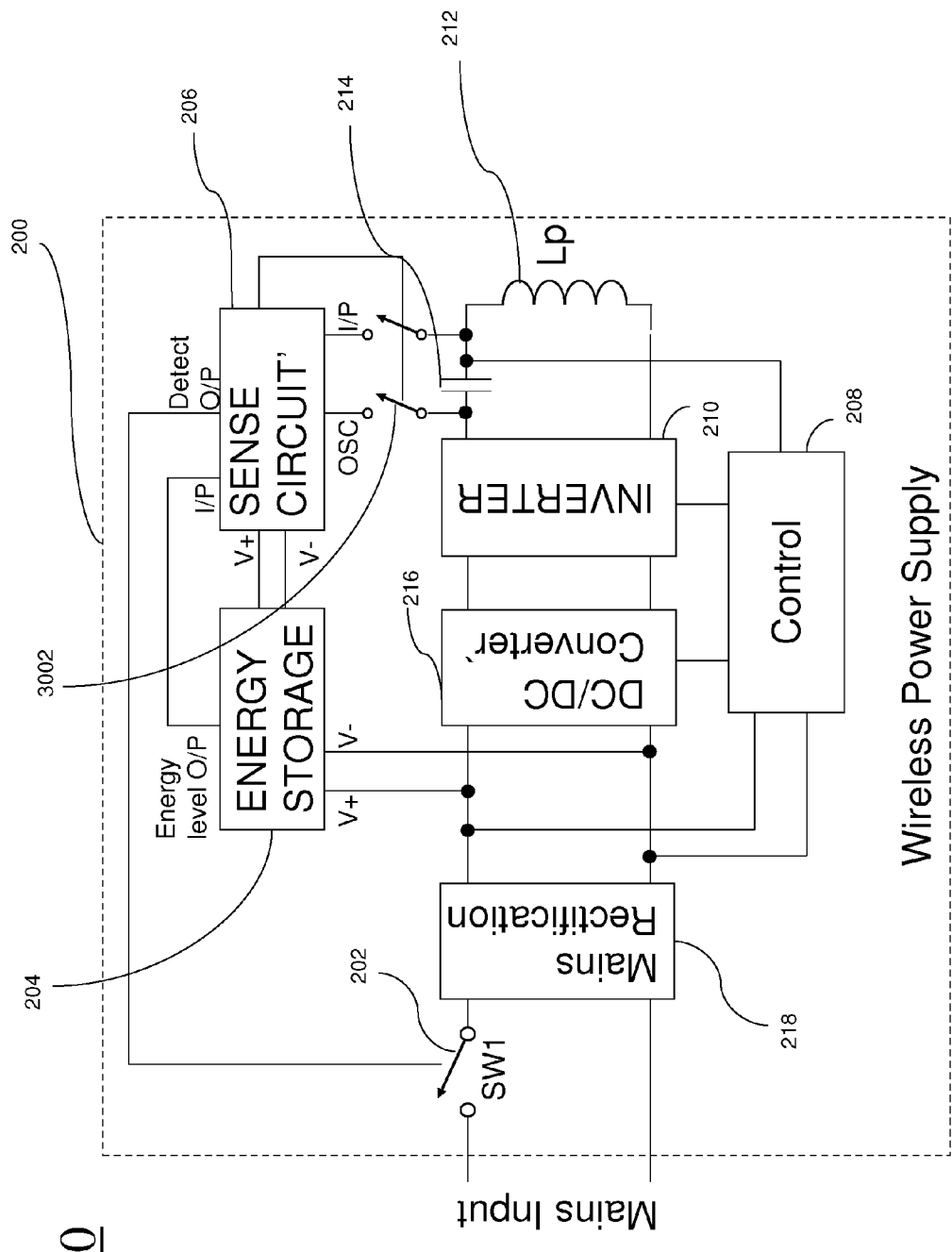
FIG. 30 shows an embodiment of a wireless power supply with sense circuits using a capacitor in series with the primary coil

FIG. 30 shows a variation on the embodiment of FIG. 24. Instead of the Sense Circuit 206 having a separate impedance (Lsen in FIG. 24), the Sense Circuit 206 uses the resonant capacitor 214 in series with the primary coil. The sense sub-circuit outlined in FIG. 24 refers to the sense circuit in the current embodiment illustrated in FIG. 30. The Oscillator 402 is applied to the point at which the capacitor 814 is connected to the inverter 210 output. The midpoint of the capacitor 214 and inductor 212 is connected to the peak detector 2402. When a device is placed in proximity to the primary coil 212, the effective inductance seen across the primary coil 212 will change, thereby changing the resonant frequency of the capacitor-inductor combination. This will in turn change the amplitude and/or phase of the signal at the peak detector. An advantage of this embodiment is that it is unnecessary to have an extra impedance element for the Sense Circuit'. However, it may mean that two switches 3002 are required to isolate the Sense Circuit' from the primary coil.

Figure 31:
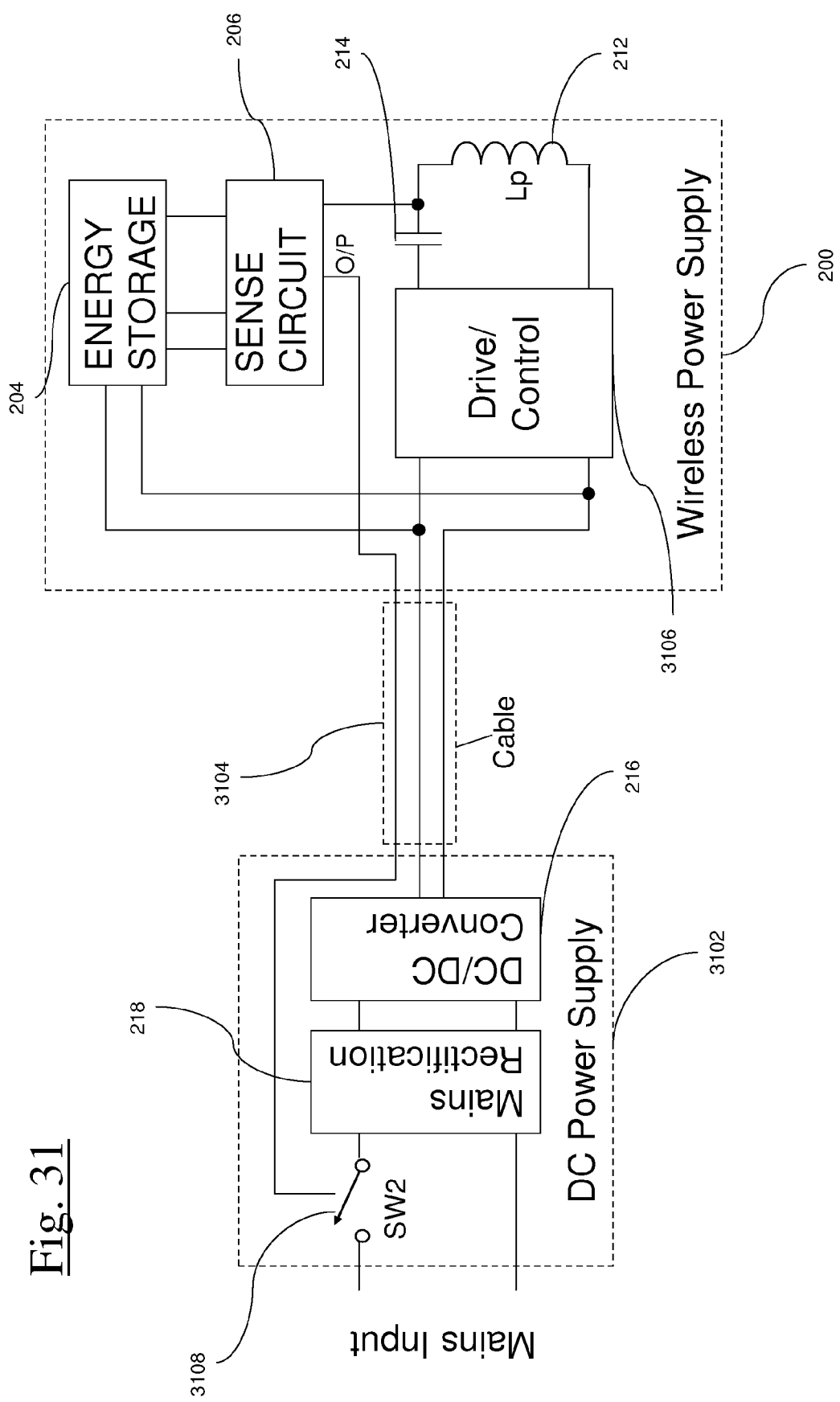
FIG. 31 shows an the embodiment of FIG. 2 with DC power input

FIG. 31 shows an example of the invention when the wireless power supply 200 has a DC input rather than a mains input. In this example, the DC Power Supply 3102 is located at the mains electricity outlet and a cable 3104 delivers DC power to the wireless power supply 200 including the drive/control unit 3106. The DC Power supply 3102 includes the Mains Rectification 218 and a DC/DC converter 216. However, it also includes a switch 3108 prior to the Mains Rectification 218. The cable 3104 between the DC Power Supply and the Wireless power supply 200 includes another line so that the switch 3108 in the DC Power Supply 3102 can be controlled by the Sense circuit 206.

The DC supply 3102 may be also be used without the Wireless power supply 200, to power different equipment. Other equipment that has a DC power input may benefit from the DC Power supply 3102 of FIG. 31. Such equipment would have an Energy Storage Unit 204 which powers a small MPU 406 when it is in its standby state. Upon receiving a trigger signal from a stimulus, the equipment could signal via the cable 3104 to close switch SW2 3108. Such stimulus may come from a remote control signal (e.g. optical, wireless, RF, ultrasonic), or from a proximity sensor or from another piece of equipment, or from a timer etc.). Alternatively the equipment may have a push button switch which activates SW2 3108 without the need for a separate energy storage unit 1604 or microprocessor 406.

Figure 32:
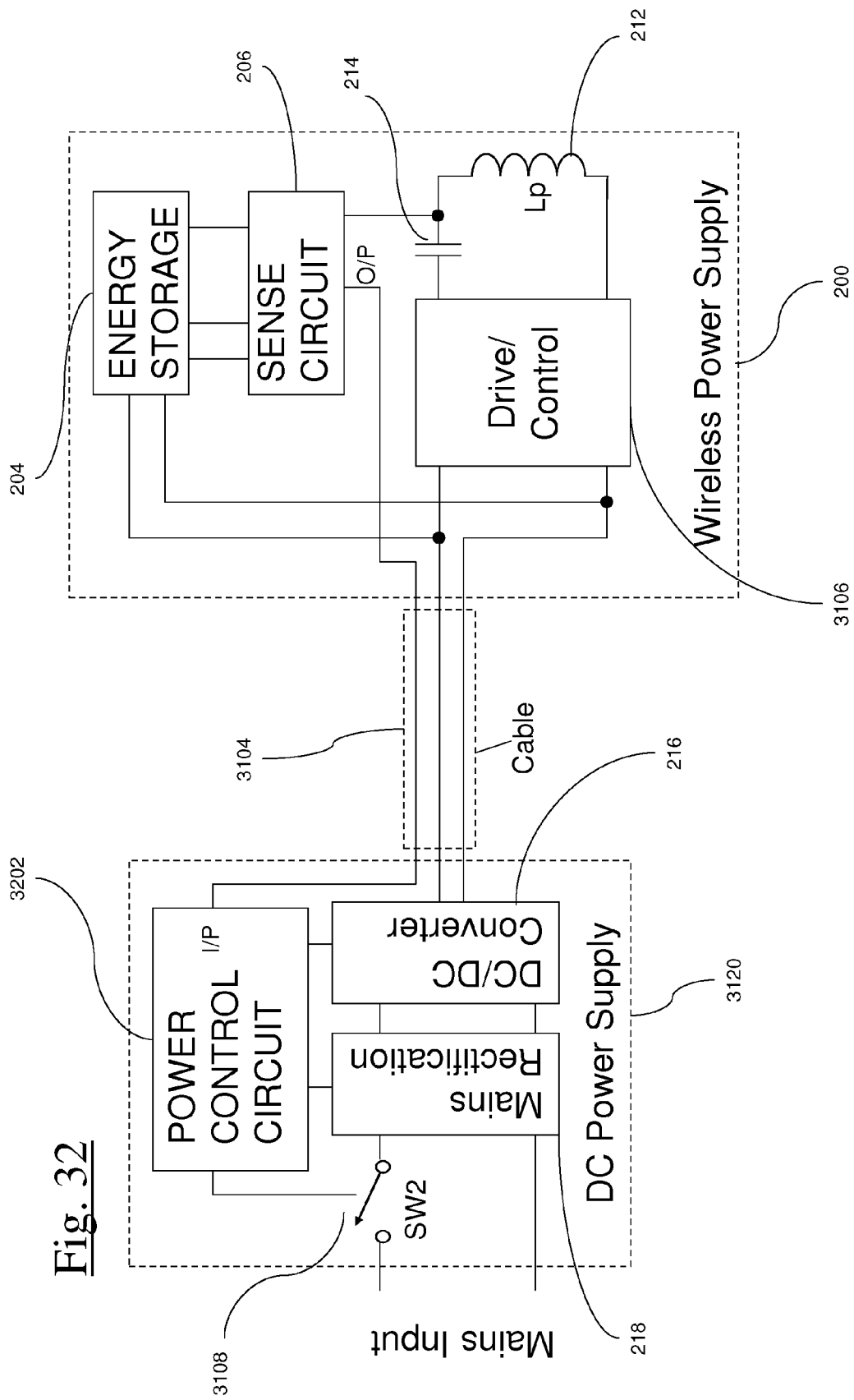
FIG. 32 shows an embodiment of FIG. 2 with a smart power supply

FIG. 32 shows one embodiment of a smart power supply 3120 with logic 3202 controlling a similar process at the power supply 3120. This same power supply 3120 may control voltage levels and the sleep cycle of the power supply 3120. Such power supplies are used to power newer laptops. A simple command or logic level can control various aspects of the power supply 3120 along with starting and ending a sleep cycle of much lower power drain.

Figure 33:
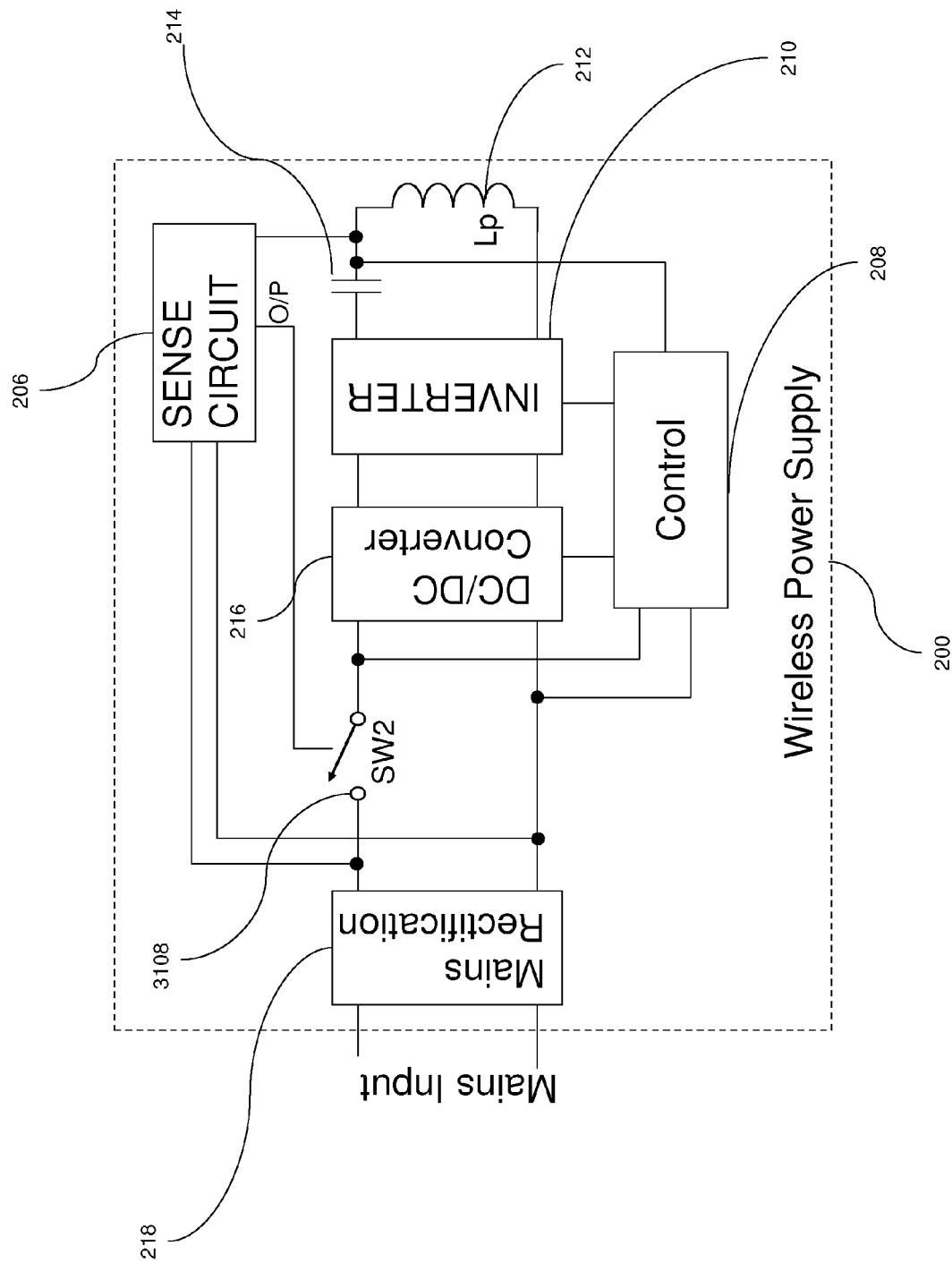
FIG. 33 shows an embodiment of FIG. 2 where a separate storage element is not used

FIG. 33 shows an embodiment where a separate energy storage element 1604 is not used. In this configuration it is not possible to have the switch 3108 before the Mains Rectification as there is no secondary power source. Instead, the Mains Rectification 218 operates throughout. The Sense Circuit 206 is powered off the output of the Mains Rectification unit 218. The switch 3108 is then placed between the Mains Rectification 218 unit and all the other units (or as many as practically possible). There will be losses associated with the mains rectification. The switch 3108 may also be placed at other points in the system to selectively keep different parts of the system running during standby.

Figure 34:
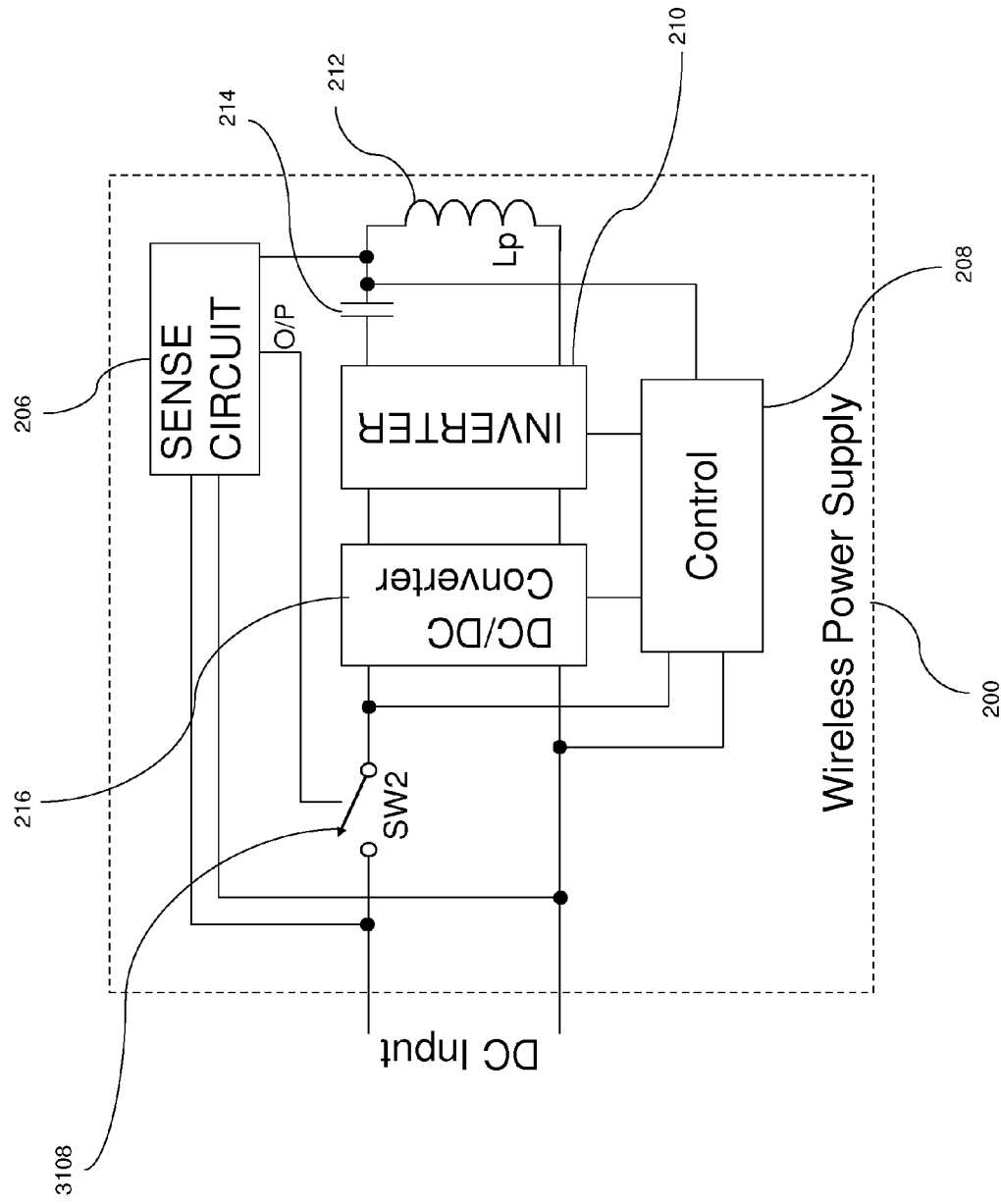
FIG. 34 shows an embodiment of FIG. 33 where power input is DC

FIG. 34 shows an embodiment where the power input is direct current. One application for this embodiment is in automotive applications. The operation is very similar to the FIG. 33 embodiment.

Figure 35:
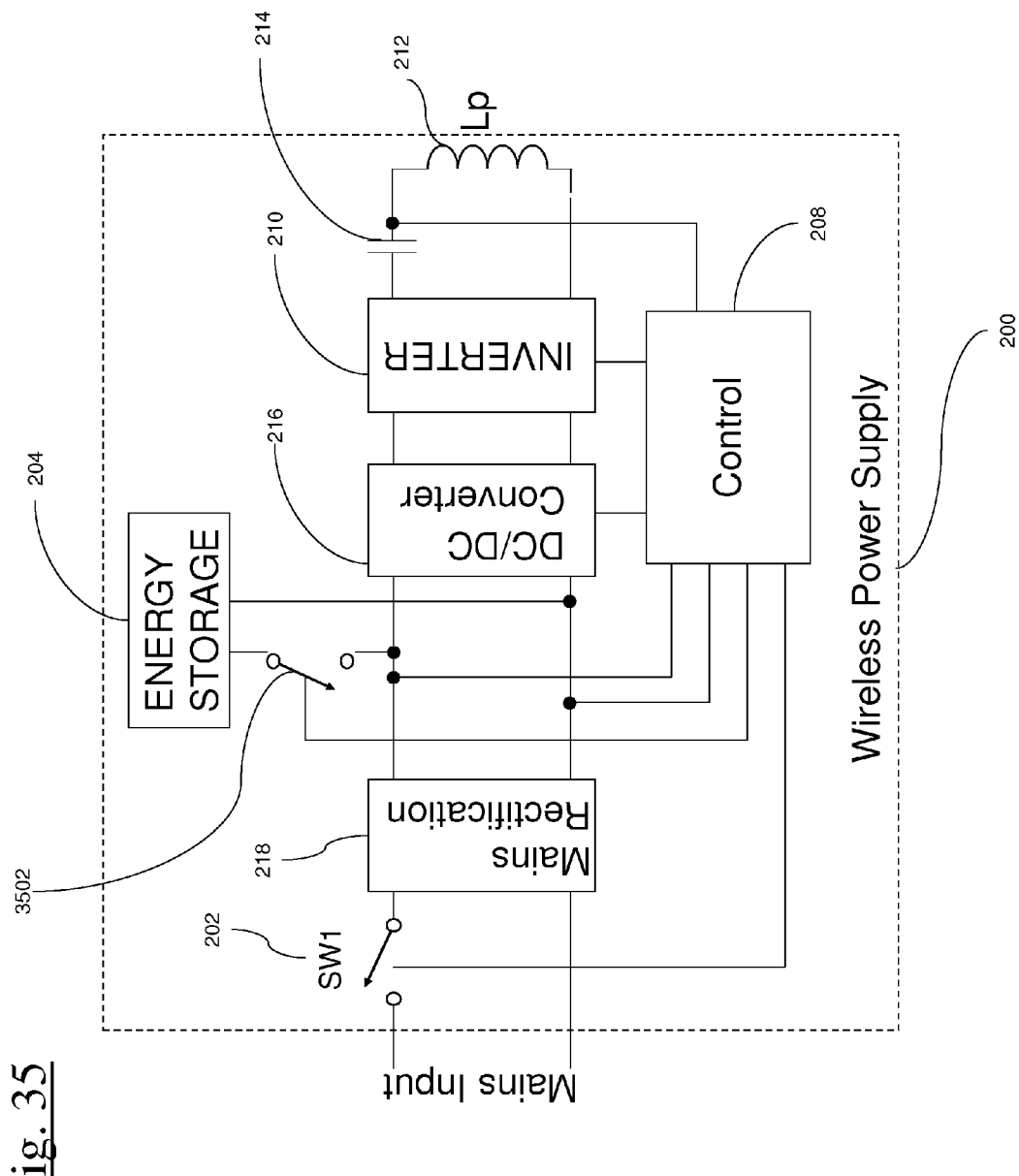
FIG. 35 shows an embodiment of FIG. 2 where a sense circuit is not used

FIG. 35 shows an embodiment where a separate Sense Circuit 206 is not used. Instead the devices are detected by periodically applying power to the primary coil 212 using a method similar to that disclosed in GB2414121 (incorporated by reference). However, this embodiment differs from GB2414121 in that there is an Energy Storage unit 204 present and a switch 3502 to switch off the supply of electricity from the mains. During standby, the control unit 208 is powered from the Energy Storage element 1604. The control unit 208 is also able to deliver power to the primary coil 212 via the Inverter 210 from the Energy Storage element 1604. Every so often power is applied to the primary coil 212 for a short time to see if the device communicates back to acknowledge its presence. However, the level of power required for the device to communicate is less than the power required to transfer full power to the device. The control unit 208 is therefore able to activate the inverter 210 to deliver a lower level of power and therefore the amount of energy taken from the Energy Storage element 1604 is less. If the control unit 208 receives a signal that a device is present, then it can switch on the Mains Rectification 218 so that the system is powered from the Mains rather than the Energy Storage unit 204. If there is a valid device present, then it can also communicate its power requirement. The wireless power supply 200 measures the power being drawn from the primary coil 212 and compares it to the power requirement of the device. If there is no significant difference between the two then the wireless power supply 200 determines that there is a valid device and no foreign objects and therefore enables full power delivery to the device.

Instead of receiving a communication from the device that it is present, the wireless power supply 200 may simply detect that something is present merely by monitoring the power drawn from the primary coil 212. If the power drawn changes between successive measurements (or it is greater than a threshold value), then either there is a device drawing the power or alternatively a foreign object. In the current embodiment, the wireless power supply 200 determines whether there is a foreign object present before applying full power. This method is similar to the Sense Circuit 206, except that the inverter 210 is being used as the Oscillator 402. In order to reduce the power consumption, to the frequency may be shift so that it is away from resonance and there is a large reactance to reduce power dissipation. The rail voltage applied to the Inverter 210 may be reduced.

Figure 36:
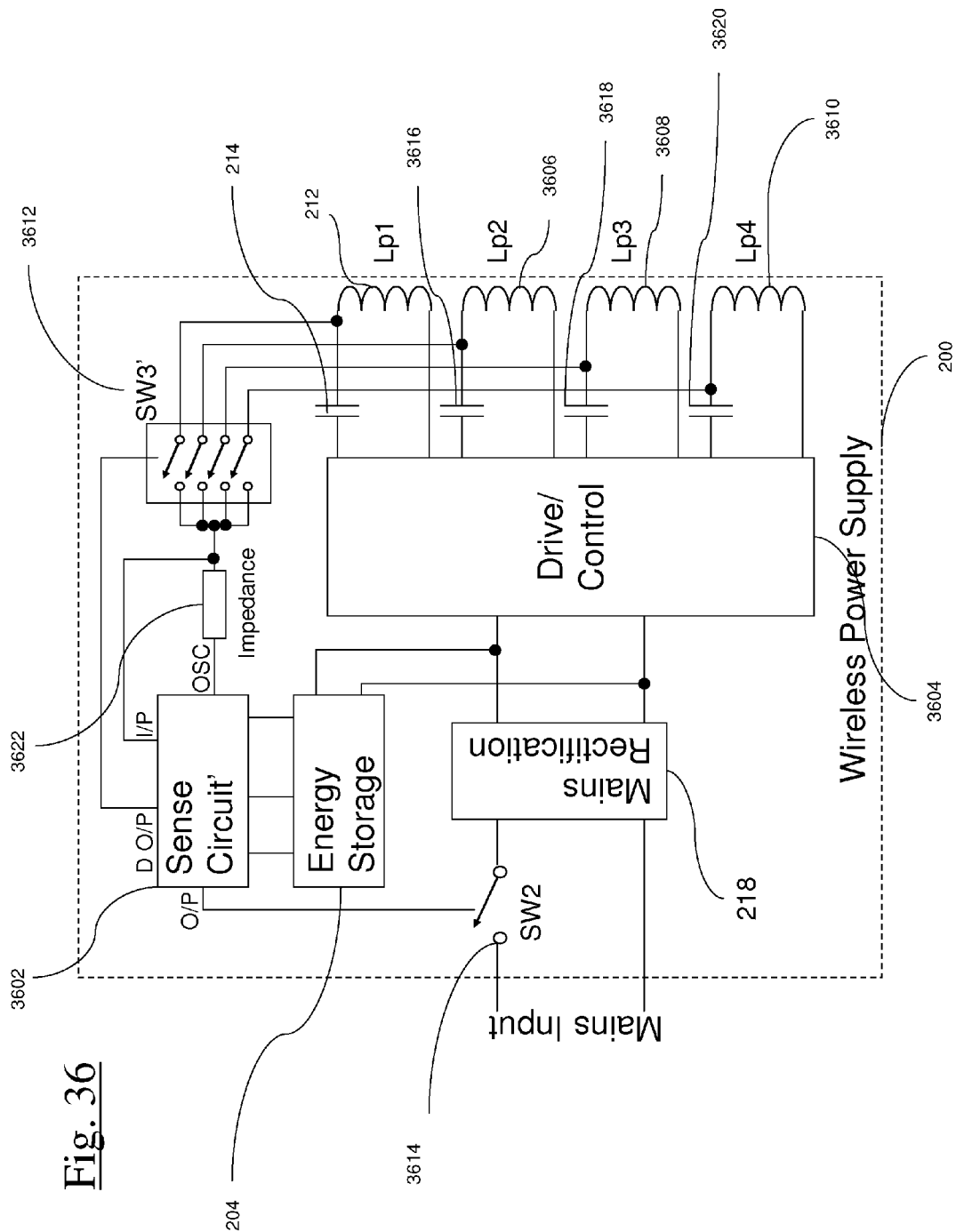
FIG. 36 shows an embodiment of FIG. 2 where there are multiple primary coils

FIG. 36 shows an embodiment in which there are a number of primary coils 212, 3606, 3608, 3610 and capacitors 214, 3616, 3618, 3620 present. These individual primary coils may each be used to supply power to a portable device. This allows multiple devices to be powered simultaneously. Alternatively the primary coils 212, 3606, 3608, 3610 may differ from one another, so that different types of device may be powered, for example as provided in WO2004038888. Alternatively some configurations of wireless power supply 200 have an array of coils, to allow a device to be positioned anywhere over a continuous area and still receive power. An example of such a system is described in WO03105308. In a wireless power supply 200 with multiple coils, the Sense Circuit 3602 may be shared across some or all the coils, saving the need for multiple Sense Circuits 206. Every time a device (or other object) is placed onto the wireless power supply 200 or removed from the wireless power supply 200, the sense circuit 3602 is triggered. The impedance element 3622, discussed in connection with FIG. 24, is illustrated outside the sense circuit 3602 in this embodiment. The wireless power supply unit 200 would then poll each inactive coil to see which coils had a valid device in proximity by closing SW2 3614 allowing the circuits in the wireless power supply 200 to receive power, as discussed above. The wireless power supply 200 would then apply power to the coils requiring power after first checking for the presence of foreign objects. In one embodiment, some devices on the power supply may or may not desire power, for example some of the devices may have a full battery. Accordingly the wireless power supply may be portioned so that some portions are powered up and others are not.

In FIG. 36 a multipole switch 3612 is used to connect all the coils in the wireless power supply 200 in parallel. The Sense Circuit 3602 will trigger when a device (or object) is placed in proximity to any of the coils 212, 3606, 3608, 3610, because any individual inductance change will alter the overall inductance of the parallel combination. In the current embodiment, the main control circuit polls each coil to determine which should be powered. As an alternative, rather than gang all the switches together in FIG. 21, the switches may be individually controlled by the MPU. In such a system, the MPU has to perform separate measurement for each coil. Although this means that the overall detection time is longer (and hence standby power greater) it does mean that the sensitivity to inductance changes will be greater.

Rather than couple the primary coils Lp1, Lp2 212, 3606, 3608, 3610, etc with DC connections, they could be coupled by winding a few turns of a sense coil around each primary coil 212, 3606, 3608, 3610. It may be possible to eliminate some or all of the switches 3612 using this method.

Figure 37:
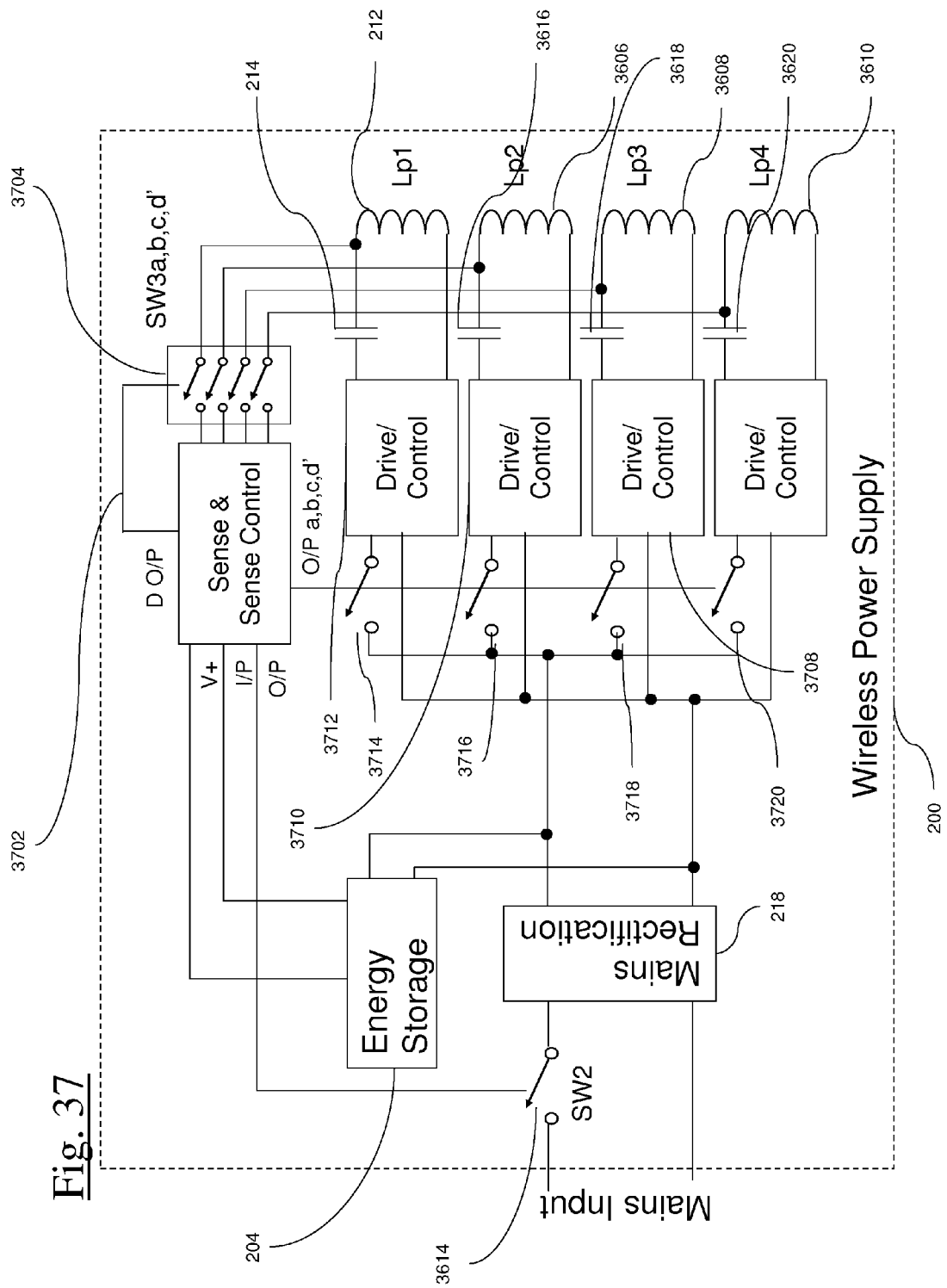
FIG. 37 shows an embodiment of FIG. 36 that allows combinations of active primary coils

FIG. 37 shows one embodiment of a system for minimising the power to multiple channels for power conservation. This configuration allows any combination of active primaries to charge or power as needed. It also allows the sense and sense control unit 3702 to time out each channel or primary separately using switches 3714, 3716, 3718, and 3720 allowing each to have independent ultra low power modes. A multipole switch 3704 similar to the one used in the FIG. 36 embodiment may also be employed. Once all are powered down it can even then turn off the main power and also control auxiliary devices and power.

In FIG. 37 each primary coil 212, 3606, 3608, 3610 has a separate driver/control unit 3712, 3710, 3708 associated with it. Of course, a single drive/control unit 3604 may be implemented instead as shown in the FIG. 36 embodiment.

Figure 38:
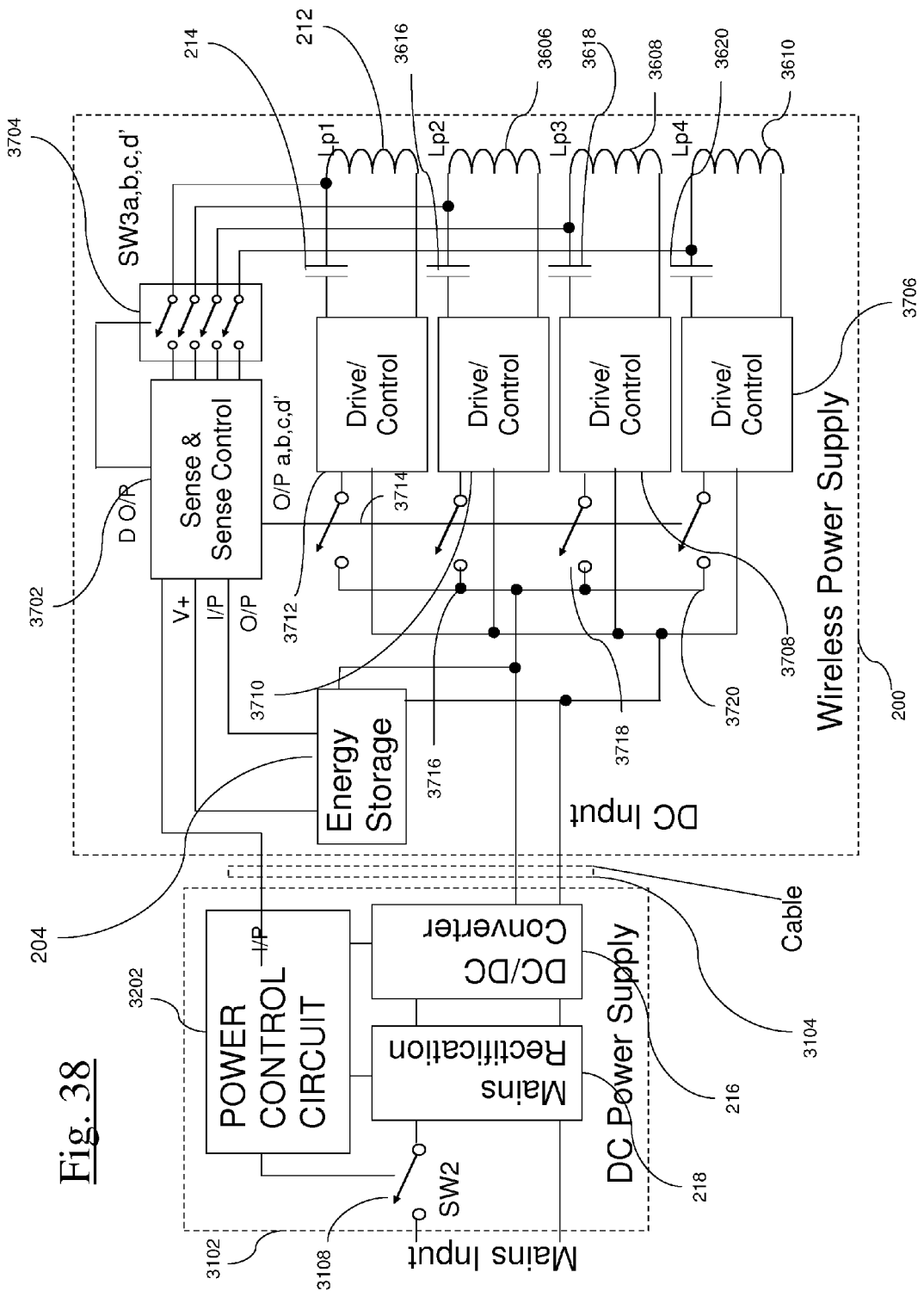
FIG. 38 shows an embodiment of FIG. 37 that allows remote control of a DC power supply

FIG. 38 shows one embodiment of the use of an ultra low power system in a multichannel system. Each channel or primary controller can shut down secondary systems first and then primary for even lower power consumption. This system allows a DC power supply 3102 to be controlled remotely via a logic communications link.

Figure 39:
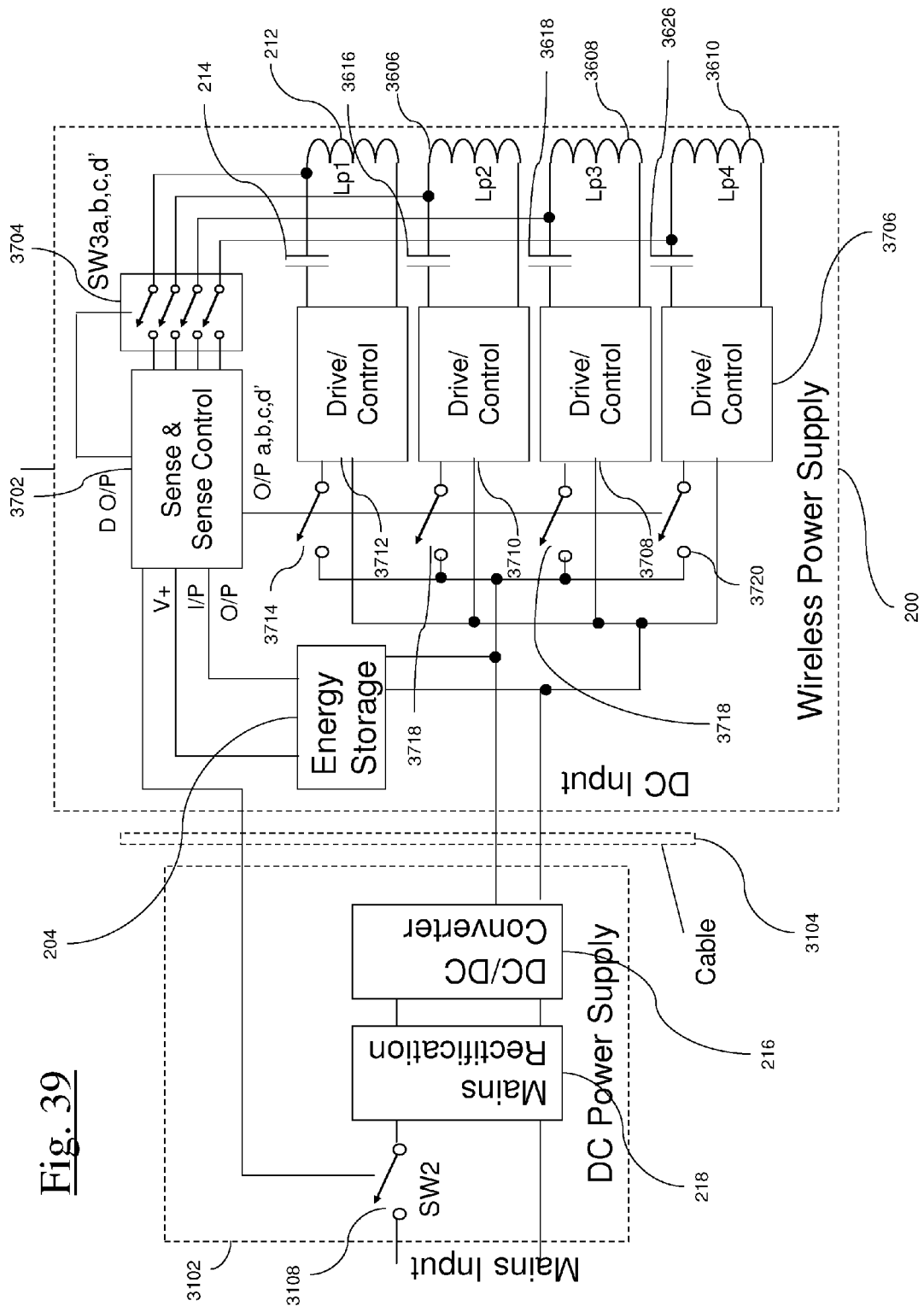
FIG. 39 shows an embodiment of FIG. 36 that allows remote control of a DC power supply

FIG. 39 shows one embodiment of a power supply with direct power shut off using SW2 3108 controlled by the Sense Circuit 3702.

Figure 40:
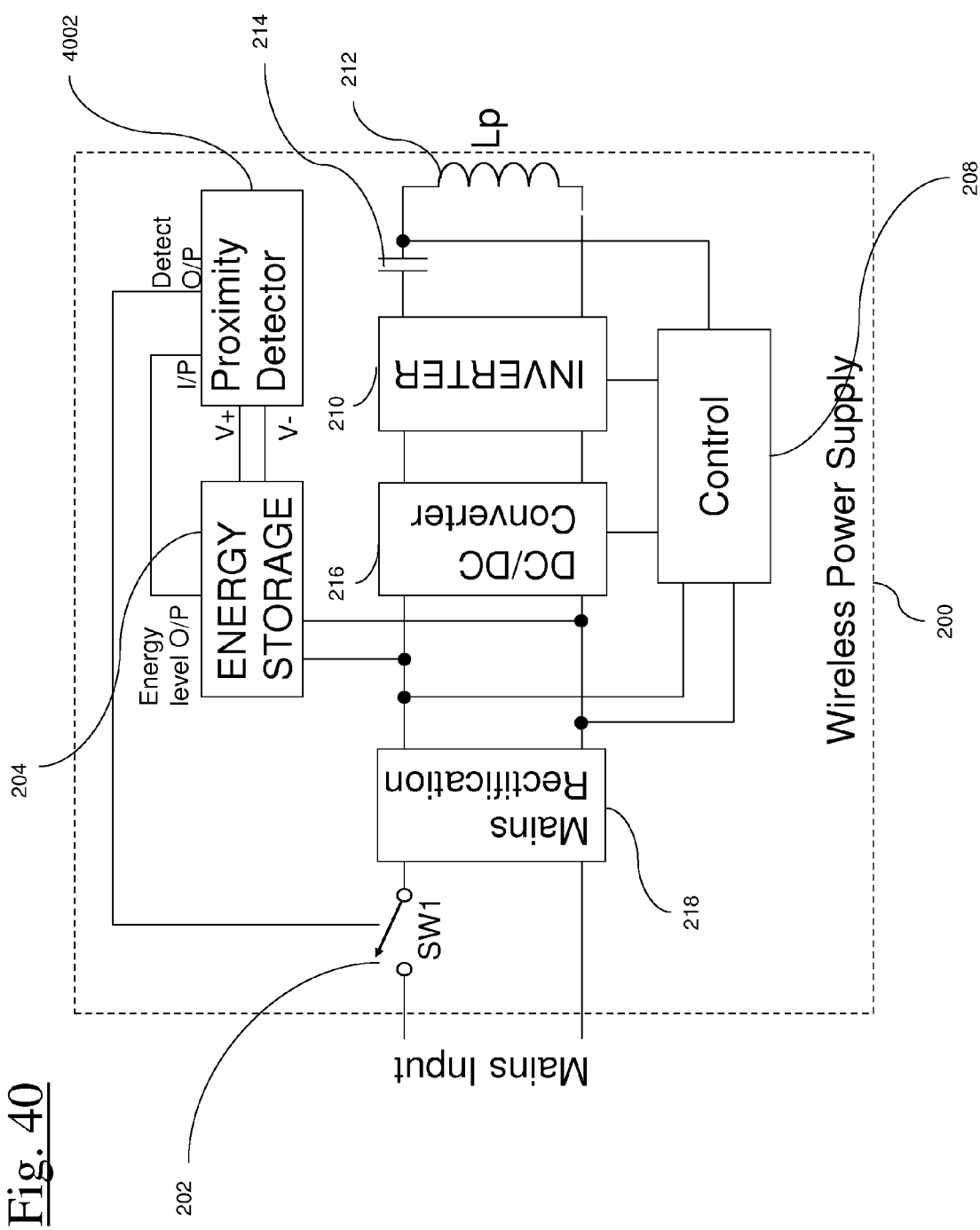
FIG. 40 shows an embodiment of FIG. 2 using a proximity sensor

In the embodiment illustrated in FIG. 40 a Sense Circuit that acts as a Proximity Detector 4002 is used to initially detect that a device or foreign object has been placed in the vicinity of the wireless power supply 200. It also detects if a device or foreign object is removed from the wireless power supply 200. This Proximity Detector 4002 is completely separate from the primary coil 212 and therefore not connected to it. In one embodiment, the Proximity Detector 4002 only knows that a change in the devices or objects present has occurred.

Optionally, an inductive proximity sensor could be formed using another coil in the wireless power supply 200 which is independent of the coil used to transfer power. Another type of proximity detector 4002 that could be used is a capacitive proximity detector. The presence of the object causes a change in the dielectric constant between two metal electrodes. Alternatively the capacitance may change because of a change in mutual capacitance between the sensor and an object. Another type of proximity detector 4002 is a Hall Effect sensor, in which there is a change in voltage in response to a change in magnetic field. The presence of a ferrite core or other material with similar properties within the portable device may result in altering the magnetic field.

There are a number of different ways of implementing the proximity detector 4002. An optical detector could be used, for example a photocell device. When a device is placed on the wireless power supply 200, less ambient light enters the photocell, thereby indicating the presence of the device. False triggers generated by fluctuating light conditions would not have a dramatic impact. Alternatively an LED or Laser could be used to generate light at visible or invisible frequencies and the reflected light could be detected. Another option would be an ultrasonic proximity detector. It is also possible to use a contact-based detector, such as a pressure switch. When a device is placed on the wireless power supply 200, the pressure applied is sufficient to make an electrical contact thus providing the same signal that the sense circuit would provide. It is possible to have an element in the portable device which facilitates its detection. For instance the device may contain a permanent magnet. When this magnet is in proximity to the wireless power supply 200 it activates a switch within the wireless power supply 200 by magnetic attraction. Additional sense circuits that act as proximity detectors could include a hall sensor, a reed switch, a motion sensor, a switch, a pressure sensor, a light sensor, or any other sensor capable of detecting presence of an object within proximity of the primary unit.

There are a number of possible configurations of Sense Circuit 206 that could be used. Instead of using an inductance bridge, other reactive and/or resistive elements could be use to form the bridge. The reactive elements may be capacitive or inductive. A resonance may be formed in order to increase the sensitivity of the bridge to inductance changes.

In some embodiments, the separate energy source is an external means. These external means could include energy harvesting (whereby stray RF energy in the atmosphere from RF emitting devices is extracted), solar, thermal, wind, motion energy, hydroelectric etc. Instead of using a rechargeable energy source a non-rechargeable source could be used such as a primary cell. Other forms of energy storage which could be used include fuel cells. Another form of energy storage is to use the energy stored in a spring. Similar techniques have been used for windup radios, lights and torches. The user could wind a handle to store energy in the spring. In another embodiment, a Mains DC power supply may provide an additional output of a low amount of power, such as 30 mW, having its own standby mode.

Another way of implementing the Sense Circuit 206 is for it to periodically send out short pings of energy (for example at RF or other frequencies) and wait for a valid device to reply by sending a message back on the same or a different frequency. Such pings of information could be transmitted using the same inductive coil or alternatively a separate antenna may be used. Alternatively the device itself could initiate the process. The Sense circuit 206 could periodically listen for pings of information so that it can determine that a device is present. The information could be a sinusoidal tone, or other type of tone (e.g. square or triangular wave) or a pulse sequence or an information packet.

The Mains Rectifier 218 may include a transformer to step down the AC voltage, a diode bridge to convert the AC voltage to a DC voltage and a smoothing capacitor. There may also be other components such as inductors or filters to reduce ripple or for electromagnetic compliance. There may also be a DC to DC converter (which may be a switched mode DC to DC converter) to convert the DC voltage to a different DC voltage. Instead of a full diode bridge (consisting of 4 diodes) a half bridge may used (2 diodes) or alternatively a centre-tapped transformer in conjunction with two diodes. The diodes may be Schottky diodes. Instead of diodes, transistors (which may be MOSFET transistors) may be used to reduce the voltage drop. Techniques may be used to avoid transient surges when the mains switch is operated. These may employ filters. Alternatively the load may be switched on gradually using a MOSFET with variable on-resistance. Series connected switches may also be used.

In the embodiments described both the magnetic field and the inductive coils could take a variety of forms. The field generated may be perpendicular or parallel or any other orientation with respect to the power transfer surface. The coils could be flat spiral wound coils, with or without a magnetic core; they could be PCB coils. The coils could be wound around a ferrite rod or rectangular rod. The coils may or may not have shielding. The coil axes may be parallel or perpendicular to the power transfer surface. The current and/or voltage during the standby sensing would typically be much lower than during power transfer. The frequency applied during the sensing standby may be different to or the same as the frequency applied during power transfer. Some or all of the voltage, current and frequency may vary or be static during operation and/or standby sensing.

The switches could be electromagnetic relays, MOSFET transistors, solid state relays, or other components. Latching relays are optional, they do not rely on a control voltage to be present continually and therefore the leakage current and hence power loss will be less. However latching relays can be considerably more costly than non latching ones. As an alternative it is possible to use non latching relays, configured so that SW1 is open and SW4 is closed in the absence of a control voltage. An electronic latch can then be made such that when the main Control Logic powers up, it supplies its own power to the relays to keep them in position.

Although the operation of this invention has been illustrated in the context of an inductive wireless power system 200, it may also applicable to other types of wireless power systems. For instance it would be used where the energy is transmitted via RF radiation (including but not limited to microwave frequencies). The wireless power may also be transmitted by evanescent wave coupling (e.g. Witricity). The power may also be transferred by capacitive coupling. The power may also be transmitted optically. Other forms of inductive, capacitive, magnetic, electrostatic or electromagnetic power transfer may be used. There is no need for the portable device to have an energy storage device. It is unnecessary for the wireless power transmitter to have a connection to mains electricity. The transmitter may be powered by an internal or external power source such as a battery, supercapacitor, fuel cell or fuel powered generator or other. Alternatively it may derive its power by other means (e.g. energy harvesting, solar, wind, motion, thermal, hydroelectric etc.)

Figure 41:
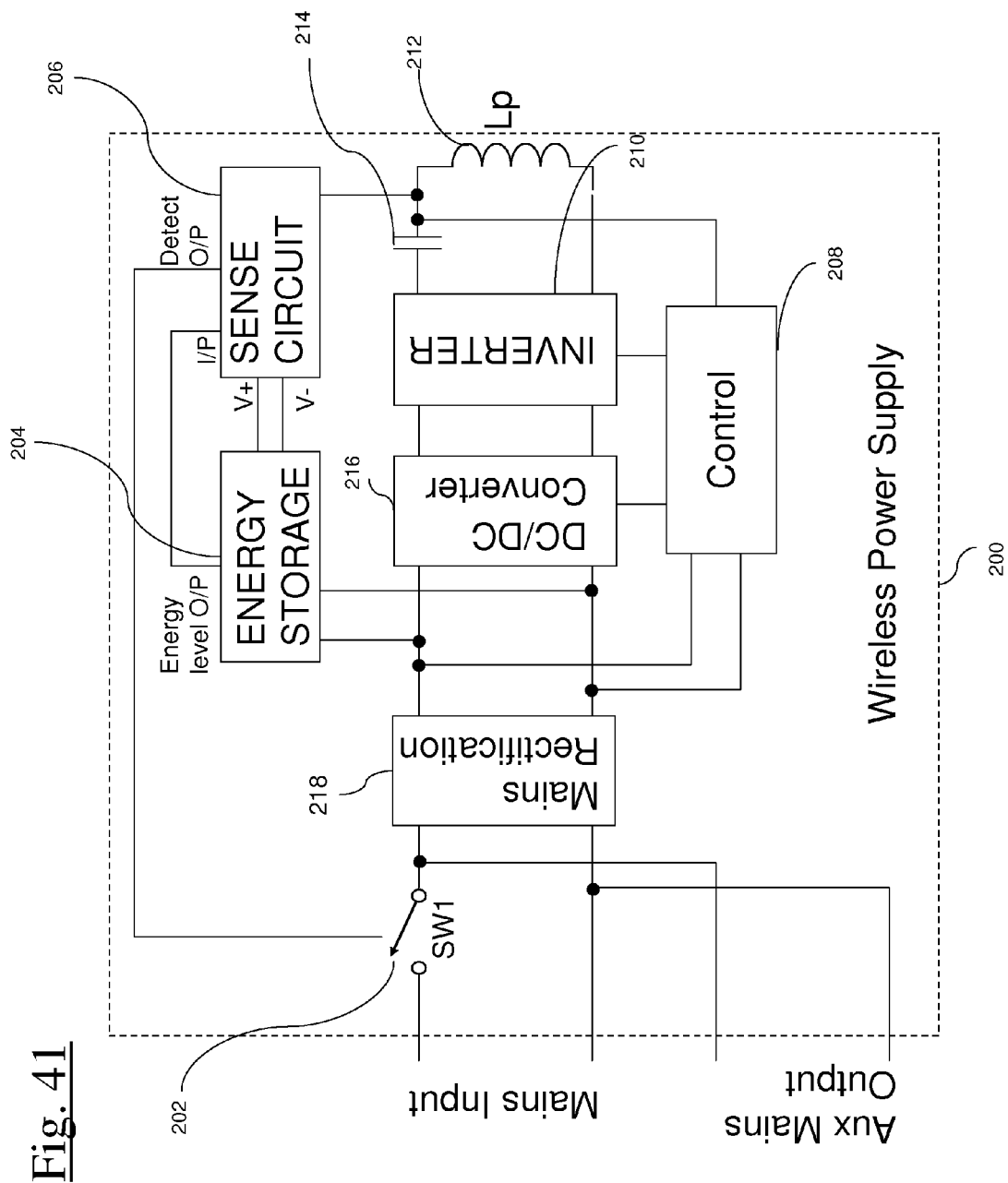
FIG. 41 shows an embodiment of FIG. 2 having auxiliary mains output

FIG. 41 shows the addition of controlling an auxiliary circuit using one embodiment of the method. This could be additional equipment that would be affected by this control. When SW1 202 is closed to allow mains electricity through to the Wireless Power Supply 200, it also allows the mains electricity through to the auxiliary output socket. Any equipment connected to this socket will also be switched on.

Figure 42:
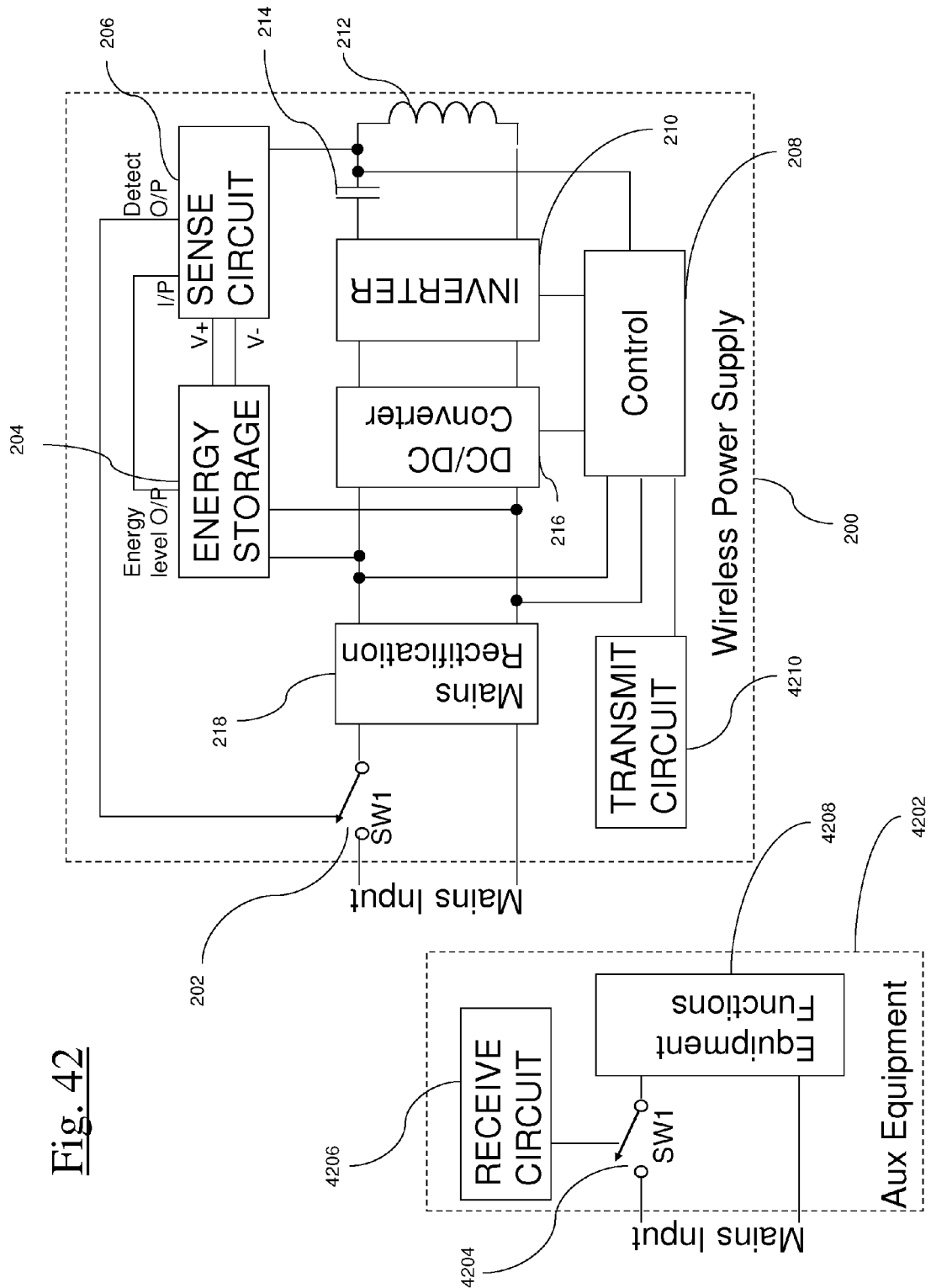
FIG. 42 shows an embodiment of FIG. 2 having remote control of an auxiliary circuit

FIG. 42 shows one embodiment of a remote controlled auxiliary unit. The main circuit 704 controls a signal that is sent to a second device 4202 that controls additional power, for example via a switch 4204, and or functions as needed. The signal may be transmitted by conventional wired connection, optical fibre, wireless, free space optical, ultrasound etc. It should also be noted that this wireless control can be any type of receiver/transmitter pair or transceiver pair 4206, 4210. Some examples of communication formats include Zigbee, ZWave, (mesh networks) current line carrier, X10, or others. These control technologies make controlling other system functions 4208 easier as they are designed to control appliances, thermostats, lighting and other powered devices. This can be a simple command set with commands being sent to control external devices. The auxiliary unit may include a battery or other power source to provide some power while the mains power supply is disconnected from a some or all of the auxiliary unit. In one embodiment, mains power is used as the other power source to supply power to the receive circuit while other circuitry within the auxiliary unit is decoupled from the mains power supply.

Figure 43:
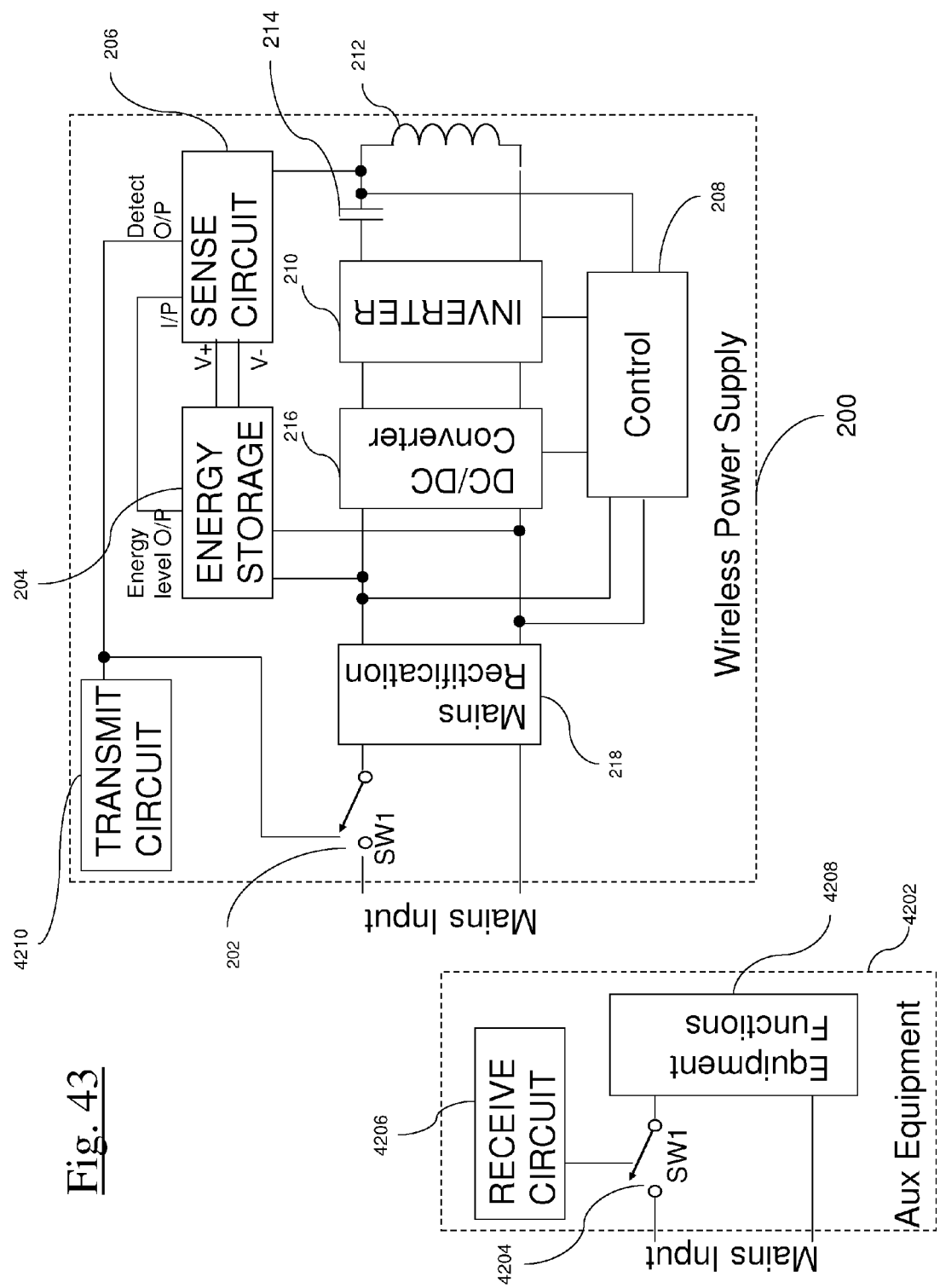
FIG. 43 shows an embodiment of FIG. 42 giving the sense circuit direct access to the remote control

FIG. 43 shows an alternative embodiment, similar to the FIG. 27 embodiment, except that the Sense Circuit 206 transmits the signal directly.

Figure 44:
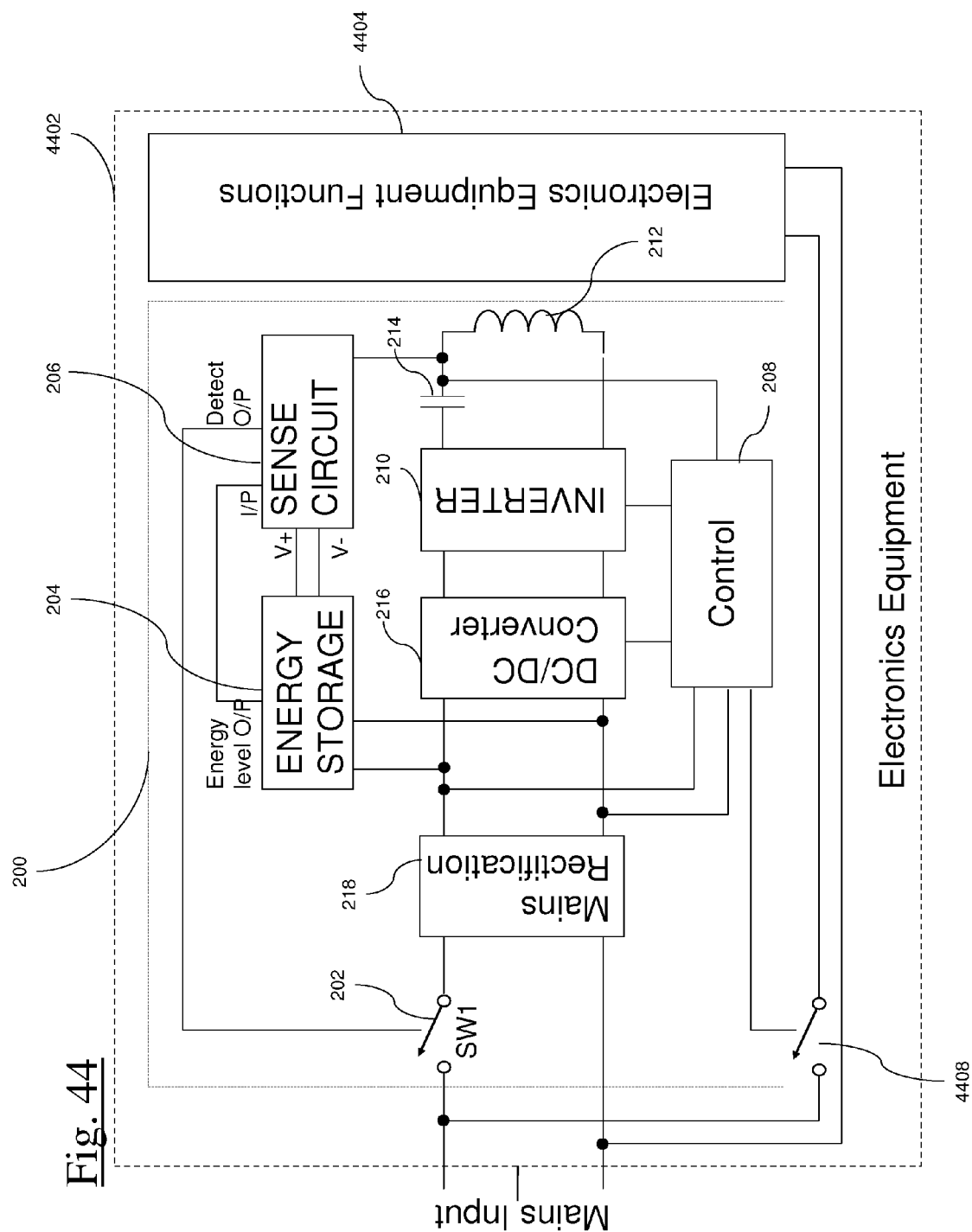
FIG. 44 shows an embodiment of FIG. 2 integrated into another electronic device
Figure 45:
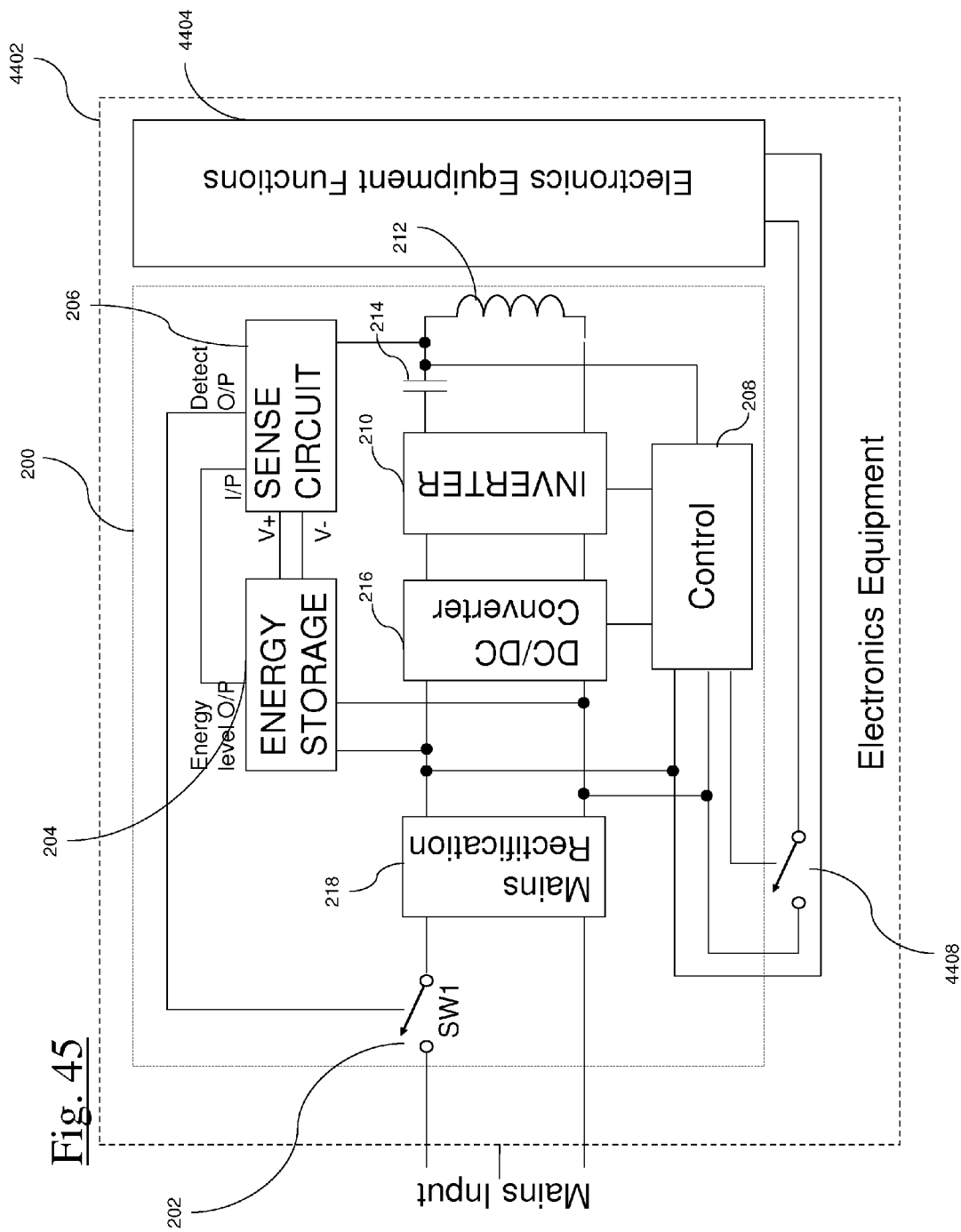
FIG. 45 shows an embodiment of FIG. 2 integrated into another electronic device

FIGS. 44 and 45 show alternative embodiments whereby the wireless power supply is integrated with another piece of electronic equipment 4402. The control circuit 208 within the wireless power system is able to control the supply of power to the rest of the electronics circuitry 4404, 4408.

Although the system has been illustrated in the context of a wireless power system, it is also applicable to other systems, where the system comes out of standby in response to an object, person or animal coming in proximity to it.

One possible class of system is radio frequency identification (RFID) and associated technologies such as Near Field Communications (NFC) and contactless smart cards. In these systems information is exchanged between a reader 4606, 4608 and a tag 4604 or device by a radio frequency or inductive means. The tag/device 4604 may be passive, in which it takes its power from the received electromagnetic power, avoiding the need for an internal battery. Alternatively the tag/device 4604 may be active and have internal batteries for power. The devices typically have an antenna consisting of a coil, transmit/receive circuitry and a microprocessor or other logic for control. A simple tag may be passive and simply transmit back a serial number to give its identity. More complex NFC devices being embedded into mobile phones can transmit and receive information between the reader and the phone. The readers are used for a variety of purposes, for example cashless payment systems, advertising, local information. It is undesirable to for such systems to be permanently on, as they may not be visited frequently.

FIG. 46 shows an example of the invention being used in an RFID system (applicable to NFC and other contactless payment systems). When the RFID tag 4604 is placed in proximity to the reader 4602, the Sense Circuit 206 determines that there is tag/device in proximity. The system therefore connects the mains supply and powers up the reader 4602. The reader then looks for tags/devices 4604 in proximity and communicates with them. It is unnecessary for the reader

4602 to transfer power to the tag/device. After the reader 4602 has finished communicating with all the tags/devices 4604 in proximity, it can re-enter the standby state. The system remains in this state until the next change occurs (either tags/devices are removed or placed).

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;
   in response to a determination that a valid secondary device is not present, restricting power supplied to said primary unit; and
   further including in response to determining that a valid secondary device is present, determining whether said valid secondary device desires power, and in response to a determination that no present valid secondary devices desire power, restricting power supplied to said primary unit.

2. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;
   in response to a determination that a valid secondary device is not present, restricting power supplied to said primary unit; and
   wherein said pulse of power includes a communication signal.

3. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;
   in response to a determination that a valid secondary device is not present, restricting power supplied to said primary unit; and
   wherein said pulse of power is sufficient to enable communication from a secondary device.

4. The method for reducing power consumption in said primary unit of claim 3 wherein said detecting uses a lower amount of power than said pulse of power.

5. The method for reducing power consumption in said primary unit of claim 3 wherein said detecting includes at least one of detecting a change in magnetic field indicative of presence of an object, detecting a change in capacitance, detecting a change in mass, detecting a change in motion indicative of presence of an object, detecting a change in pressure indicative of presence of an object, and detecting a change in light level indicative of presence of an object.

6. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;
   in response to a determination that a valid secondary device is not present, restricting power supplied to said primary unit;
   receiving communication from said secondary device indicative of the status of said secondary device; and
   wherein said determining whether a valid secondary device is present is at least in part a function of said status of said secondary device.

7. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;
   in response to a determination that a valid secondary device is not present, restricting power supplied to said primary unit; and
   wherein said detecting presence of an object includes detecting at least one of a change in number of objects in proximity to said primary unit; and a change in position of one or more objects in proximity to said primary unit.

8. A method for reducing power consumption in a primary unit capable of transferring power to a secondary device, said secondary device separable from said primary unit, said method comprising the steps of:
   detecting presence of an object within proximity of said primary unit;
   sending a pulse of power to said object in response to detecting presence of said object within proximity of said primary unit;
   determining whether a valid secondary device is present in proximity to said primary unit in response to sending said pulse of power to said object;

in response to a determination that a valid secondary device is not present, restricting power supplied to said primary unit; and wherein said detecting presence of an object and said sending said pulse of power utilize power from different power sources.

9. A method for reducing power consumption in a primary unit capable of transferring power to a secondary device, said secondary device separable from said primary unit, said method comprising the steps of:

detecting presence of an object within proximity of said primary unit;

sending a pulse of power to said object in response to detecting presence of said object within proximity of said primary unit;

determining whether a valid secondary device is present in proximity to said primary unit in response to sending said pulse of power to said object;

in response to a determination that a valid secondary device is not present, restricting power supplied to said primary unit; and wherein said detecting utilizes power from an energy storage element; and in response to determining that a valid secondary device is present, supplying power to said primary unit sufficient to transfer power to said secondary device in order to at least one of charge a secondary device battery and directly power said secondary device.

10. A method for reducing power consumption in a primary unit capable of transferring power to a secondary device, said secondary device separable from said primary unit, said method comprising the steps of:

detecting presence of an object within proximity of said primary unit;

sending a pulse of power to said object in response to detecting presence of said object within proximity of said primary unit;

determining whether a valid secondary device is present in proximity to said primary unit in response to sending said pulse of power to said object;

in response to a determination that a valid secondary device is not present, restricting power supplied to said primary unit; and wherein said detecting utilizes power from an energy storage element; and in response to determining that a valid secondary device is present, both recharging said energy storage element and supplying power to said primary unit sufficient to transfer power to said secondary device in order to at least one of charge a secondary device battery and directly power said secondary device.

11. A method for reducing power consumption in a primary unit capable of transferring power to a secondary device, said secondary device separable from said primary unit, said method comprising the steps of:

detecting presence of an object within proximity of said primary unit;

sending a pulse of power to said object in response to detecting presence of said object within proximity of said primary unit;

determining whether a valid secondary device is present in proximity to said primary unit in response to sending said pulse of power to said object;

in response to a determination that a valid secondary device is not present, restricting power supplied to said primary unit; and wherein as a function of said determination of whether a valid secondary device is present, communicating with an auxiliary unit to control the power supplied to said auxiliary unit.

12. A method for reducing power consumption in a primary unit capable of transferring power to a secondary device, said secondary device separable from said primary unit, said method comprising the steps of:

applying a pulse of low power to said primary unit;

detecting whether there is a draw of power in said primary unit indicative of a load within proximity to said primary unit;

upon detecting a load, supplying power to said primary unit at a higher level than said pulse of low power;

determining whether a valid secondary device is present in proximity to said primary unit in response to said supply of power at said higher level;

in response to a determination that a valid secondary device is not present, restricting power supplied to said primary unit; and further including in response to determining that a valid secondary device is present, determining whether said valid secondary device desires power, and in response to a determination that no present valid secondary devices desire power, restricting power supplied to said primary unit.

13. A method for reducing power consumption in a primary unit capable of transferring power to a secondary device, said secondary device separable from said primary unit, said method comprising the steps of:

applying a pulse of low power to said primary unit;

detecting whether there is a draw of power in said primary unit indicative of a load within proximity to said primary unit;

upon detecting a load, supplying power to said primary unit at a higher level than said pulse of low power;

determining whether a valid secondary device is present in proximity to said primary unit in response to said supply of power at said higher level;

in response to a determination that a valid secondary device is not present, restricting power supplied to said primary unit; and wherein said applying the pulse of low power to said primary unit generates a sufficiently small magnetic field such that said secondary device cannot supply sufficient power to its circuitry to allow communication with said primary unit.

14. A method for reducing power consumption in a primary unit capable of transferring power to a secondary device, said secondary device separable from said primary unit, said method comprising the steps of:

applying a pulse of low power to said primary unit;

detecting whether there is a draw of power in said primary unit indicative of a load within proximity to said primary unit;

upon detecting a load, supplying power to said primary unit at a higher level than said pulse of low power;

determining whether a valid secondary device is present in proximity to said primary unit in response to said supply of power at said higher level;

in response to a determination that a valid secondary device is not present, restricting power supplied to said primary unit; and wherein said power to said primary unit at said higher level than said pulse of low power includes a communication signal.

15. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit; and
wherein said power to said primary unit at said higher level than said pulse of low power is sufficient to enable communication from a secondary device.

16. The method for reducing power consumption in said primary unit of claim 15 wherein in response to a determination that a valid secondary device is present, supplying power to said primary unit to transfer power to said valid secondary device.

17. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit;
receiving communication from said secondary device indicative of the status of said secondary device; and
wherein said determining whether a valid secondary device is present is at least in part a function of said status of said secondary device.

18. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit;
wherein said detecting presence of a load includes detecting at least one of
a change in number of objects in proximity to said primary unit; and
a change in position of one or more objects in proximity to said primary unit.

19. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit; and
wherein said pulse of low power and said higher level of power utilize power from different power sources.

20. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit; and
wherein said pulse of low power utilizes power from an energy storage element; and in response to determining that a valid secondary device is present, supplying power to said primary unit sufficient to transfer power to said secondary device in order to at least one of charge a secondary device battery and directly power said secondary device.

21. A method for reducing power consumption in a primary unit capable of transferring power to a secondary device, said secondary device separable from said primary unit, said method comprising the steps of:
applying a pulse of low power to said primary unit;
detecting whether there is a draw of power in said primary unit indicative of a load within proximity to said primary unit;
upon detecting a load, supplying power to said primary unit at a higher level than said pulse of low power;
determining whether a valid secondary device is present in proximity to said primary unit in response to said supply of power at said higher level;
in response to a determination that a valid secondary device is not present, restricting power supplied to said primary unit; and
wherein said pulse of low power utilizes power from an energy storage element; and in response to determining that a valid secondary device is present, both recharging said energy storage element and supplying power to said primary unit sufficient to transfer power to said secondary device in order to at least one of charge a secondary device battery and directly power said secondary device.

22. A method for reducing power consumption in a primary unit capable of transferring power to a secondary device, said secondary device separable from said primary unit, said method comprising the steps of:
- applying a pulse of low power to said primary unit;
- detecting whether there is a draw of power in said primary unit indicative of a load within proximity to said primary unit;
- upon detecting a load, supplying power to said primary unit at a higher level than said pulse of low power;
- determining whether a valid secondary device is present in proximity to said primary unit in response to said supply of power at said higher level;
- in response to a determination that a valid secondary device is not present, restricting power supplied to said primary unit; and
- wherein as a function of said determination of whether a valid secondary device is present, communicating with an auxiliary unit to control the power supplied to said auxiliary unit.

23. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode;
- wherein said sense circuit includes:
  - an impedance element;
  - an oscillator coupled to said impedance element, said oscillator converting said second power input to AC power;
  - a peak detector for detecting a peak voltage across said impedance element; and
  - a microprocessor programmed to periodically read the value of the peak detector, detect a change in impedance, and activate said switch to selectively couple said first power input to said primary circuit.

24. The primary unit of claim 23 further including a switch to selectively connect said peak detector and said oscillator to said second power input for the duration of a peak detection measurement.

25. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode;
- wherein said sense circuit includes:
- an oscillator circuit selectably coupled to a primary coil located within said primary subcircuit; and
- a microprocessor programmed to measure the frequency of said oscillator circuit.

26. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said impedance element includes a primary coil located in said subcircuit for transferring power to a secondary device, and said sense circuit includes a switch to selectively connect said primary coil to said sense circuit for the duration of a peak detection measurement.

27. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said sense circuit includes a microprocessor with a watchdog timer that enables the microprocessor to only wake up during a sense circuit measurement.

28. The primary unit of claim 27 wherein said sense circuit includes at least one of a hall sensor, a reed switch, a motion sensor, a switch, a capacitance sensor, a mass sensor, a pressure sensor, and a light sensor.

29. The primary unit of claim 27 wherein said sense circuit is programmed to control a switch operable to selectively couple said first power input to an auxiliary unit.

30. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode;
- a receiver for receiving communication from said secondary device indicative of the status of said secondary device; and
- wherein said identification unit determines whether said secondary device is valid at least in part as a function of said status of said secondary device.

31. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said primary subcircuit includes an identification unit, and wherein in response to said coupling of said first power input to said primary subcircuit, said identification unit is programmed to identify whether a valid secondary device is present within proximity of the primary unit, and in response to a determination that a valid secondary device is not present power to said primary subcircuit is restricted by operating said switch to disconnect said primary subcircuit from said first power input.

32. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said primary subcircuit includes an identification unit, and wherein in response to said coupling of said first power input to said primary subcircuit, said identification unit is programmed to identify whether said secondary device desires power, and in response to a determination that no secondary device desires power, power to said primary subcircuit is restricted by operating said switch to disconnect said primary subcircuit from said first power input.

33. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said second power input comprises an energy storage element; and wherein said energy storage element is recharged while said first power input is coupled to said primary subcircuit.

34. A primary unit capable of transferring power to a secondary device, said secondary device separable from said primary unit, said primary unit comprising:
- a first power input for supplying power during a power supply mode;
- a second power input for supplying power during a detection mode, wherein said second power input provides less power than said first power input;
- a primary subcircuit capable of transferring power to a secondary device;
- a switch operable to selectively couple said first power input to said primary subcircuit;
- a sense circuit for detecting the presence of an object within proximity of the primary unit, said sense circuit powered by said second power input, wherein said sense circuit operates said switch to decouple said primary subcircuit from said first power input during said detection mode, wherein said primary unit consumes less power during said detection mode than during said power supply mode; and
- wherein said second power input comprises an energy storage element.

35. A primary unit capable of transferring power to a secondary device, said secondary device separable from said primary unit, said primary unit comprising:
- a power supply circuit for wirelessly transferring power to a secondary device during a power supply mode;
- a detection circuit for detecting the presence of an object within proximity of the primary unit during a detection mode;
- an identification unit for identifying whether a detected object is a valid secondary device during an identification mode;
- a switch operable to selectively couple and decouple said power supply circuit to a supply of power;
- a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode; and
- wherein said identification unit, during said identification mode determines whether said detected valid secondary device desires power.

36. A primary unit capable of transferring power to a secondary device, said secondary device separable from said primary unit, said primary unit comprising:
- a power supply circuit for wirelessly transferring power to a secondary device during a power supply mode;
- a detection circuit for detecting the presence of an object within proximity of the primary unit during a detection mode;
- an identification unit for identifying whether a detected object is a valid secondary device during an identification mode;
- a switch operable to selectively couple and decouple said power supply circuit to a supply of power;
- a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode;
- wherein said detection mode includes:
- restricting the supply of power to the power supply circuit by opening said switch;
- detecting the presence of an object within proximity of the primary unit;
- upon detecting the presence of an object within proximity of the primary unit, entering a different mode; and
- wherein said power supply mode includes:
  - supplying power to the primary unit by closing said switch;
  - identifying if there is a secondary device in proximity;
  - remaining in the power supply or entering the detection mode in dependence upon the identification.

37. A primary unit capable of transferring power to a secondary device, said secondary device separable from said primary unit, said primary unit comprising:
- a power supply circuit for wirelessly transferring power to a secondary device during a power supply mode;
- a detection circuit for detecting the presence of an object within proximity of the primary unit during a detection mode;
- an identification unit for identifying whether a detected object is a valid secondary device during an identification mode;
- a switch operable to selectively couple and decouple said power supply circuit to a supply of power;
- a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode;
- wherein said detection circuit includes:
- an impedance element;
- an oscillator coupled to said impedance element, said oscillator converting said second power input to AC power;
- a peak detector for detecting a peak voltage across said impedance element; and
- a microprocessor programmed to periodically read the value of the peak detector, detect a change in impedance, and activate said switch to selectively couple said first power input to said primary circuit.

38. The primary unit of claim 37 wherein said impedance element includes a primary coil located in said power supply circuit for transferring power to a secondary device, and said sense circuit includes a switch to selectively connect said primary coil to said sense circuit for the duration of a peak detection measurement.

39. A primary unit capable of transferring power to a secondary device, said secondary device separable from said primary unit, said primary unit comprising:
- a power supply circuit for wirelessly transferring power to a secondary device during a power supply mode;
- a detection circuit for detecting the presence of an object within proximity of the primary unit during a detection mode;
- an identification unit for identifying whether a detected object is a valid secondary device during an identification mode;
- a switch operable to selectively couple and decouple said power supply circuit to a supply of power;
- a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode;
- wherein said detection circuit includes:
- an oscillator circuit selectably coupled to a primary coil located within said primary subcircuit; and
- a microprocessor programmed to measure the frequency of said oscillator circuit.

40. A primary unit capable of transferring power to a secondary device, said secondary device separable from said primary unit, said primary unit comprising:
- a power supply circuit for wirelessly transferring power to a secondary device during a power supply mode;

a detection circuit for detecting the presence of an object within proximity of the primary unit during a detection mode;
an identification unit for identifying whether a detected object is a valid secondary device during an identification mode;
a switch operable to selectively couple and decouple said power supply circuit to a supply of power;
a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode; and
further including a switch to selectively connect said peak detector and said oscillator to said second power input for the duration of a peak detection measurement.

41. A primary unit capable of transferring power to a secondary device, said secondary device separable from said primary unit, said primary unit comprising:
a power supply circuit for wirelessly transferring power to a secondary device during a power supply mode;
a detection circuit for detecting the presence of an object within proximity of the primary unit during a detection mode;
an identification unit for identifying whether a detected object is a valid secondary device during an identification mode;
a switch operable to selectively couple and decouple said power supply circuit to a supply of power;
a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode; and
wherein said detection circuit includes a microprocessor with a watchdog timer that enables the microprocessor to only wake up during a sense circuit measurement.

42. The primary unit of claim 41 wherein said detection circuit includes at least one of a hall sensor, a reed switch, a motion sensor, a switch, a pressure sensor, and a light sensor.

43. A primary unit capable of transferring power to a secondary device, said secondary device separable from said primary unit, said primary unit comprising:
a power supply circuit for wirelessly transferring power to a secondary device during a power supply mode;
a detection circuit for detecting the presence of an object within proximity of the primary unit during a detection mode;
an identification unit for identifying whether a detected object is a valid secondary device during an identification mode;
a switch operable to selectively couple and decouple said power supply circuit to a supply of power;
a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode;
a receiver capable of receiving communication from said secondary device indicative of a status of said secondary device; and
wherein said primary unit includes an identification circuit that determines whether said secondary device is valid at least in part as a function of said status of said secondary device.

44. A primary unit capable of transferring power to a secondary device, said secondary device separable from said primary unit, said primary unit comprising:
a power supply circuit for wirelessly transferring power to a secondary device during a power supply mode;
a detection circuit for detecting the presence of an object within proximity of the primary unit during a detection mode;
an identification unit for identifying whether a detected object is a valid secondary device during an identification mode;
a switch operable to selectively couple and decouple said power supply circuit to a supply of power;
a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode; and
wherein said primary unit includes an identification unit, and wherein in response to said detection circuit detecting the presence of an object within proximity of the primary unit, said identification unit is programmed to identify whether a valid secondary device is present within proximity of the primary unit, and
in response to a failure to identify a valid secondary device, said control circuit operates said switch to decouple said power supply circuit from said supply of power.

45. A primary unit capable of transferring power to a secondary device, said secondary device separable from said primary unit, said primary unit comprising:
a power supply circuit for wirelessly transferring power to a secondary device during a power supply mode;
a detection circuit for detecting the presence of an object within proximity of the primary unit during a detection mode;
an identification unit for identifying whether a detected object is a valid secondary device during an identification mode;
a switch operable to selectively couple and decouple said power supply circuit to a supply of power;
a control circuit located within the primary unit programmed to alternately operate said primary unit in said detection mode, said identification mode, and said power supply mode, wherein said control circuit operates said switch to decouple said power supply circuit from said supply of power during said detection mode, wherein said primary unit consumes less power during said detection mode than during said power supply mode; and
wherein said primary unit takes power from a mains power source during power supply mode and takes power from a secondary power source during detection mode.

46. A method for reducing power consumption in a primary unit capable of transferring power to a secondary device, said secondary device separable from said primary unit, said method comprising the steps of:
provide a primary unit capable of selectively operating in a detection mode, an identification mode, and a power supply mode;
detecting presence of an object within proximity of said primary unit during said detection mode, wherein said detection mode includes:
restricting the supply of power to at least a portion of the primary unit;
detecting presence of an object within proximity of the primary unit;
in dependence upon said detecting, either staying in said detection mode or entering said identification mode;
identifying said object during said identification mode, wherein said identification mode includes:
identifying whether said detected object is a valid secondary device;
upon identifying a valid secondary device entering said power supply mode;
upon failing to identify a valid secondary device entering said detection mode;
supplying power wirelessly to the secondary device during said power supply mode, wherein said power supply mode includes:
supplying power to said primary unit at a higher level than during said detection mode, said higher level of power sufficient for said primary unit to function as a wireless power supply;
wherein said identification mode includes:
receiving communication from said secondary device indicative of the status of said secondary device; and
wherein said identifying whether said detected object is a valid secondary device is at least in part a function of said status of said secondary device.

47. The method for reducing power consumption in said primary unit of claim 46 wherein said detecting includes at least one of detecting a change in magnetic field indicative of presence of an object, detecting a change in capacitance, detecting a change in mass, detecting a change in motion indicative of presence of an object, detecting a change in pressure indicative of presence of an object, and detecting a change in light level indicative of presence of an object.

48. A method for reducing power consumption in a primary unit capable of transferring power to a secondary device, said secondary device separable from said primary unit, said method comprising the steps of:
providing a primary unit capable of selectively operating in a detection mode, an identification mode, and a power supply mode;
detecting presence of an object within proximity of said primary unit during said detection mode, wherein said detection mode includes:
restricting the supply of power to at least a portion of the primary unit;
detecting presence of an object within proximity of the primary unit;
in dependence upon said detecting, either staying in said detection mode or entering said identification mode;
identifying said object during said identification mode, wherein said identification mode includes:
identifying whether said detected object is a valid secondary device;
upon identifying a valid secondary device entering said power supply mode;
upon failing to identify a valid secondary device entering said detection mode;
supplying power wirelessly to the secondary device during said power supply mode, wherein said power supply mode includes:
supplying power to said primary unit at a higher level than during said detection mode, said higher level of power sufficient for said primary unit to function as a wireless power supply; and
wherein said detecting presence of an object includes detecting at least one of a change in number of objects in proximity to said primary unit; and a change in position of one or more objects in proximity to said primary unit.

49. A method for reducing power consumption in a primary unit capable of transferring power to a secondary device, said secondary device separable from said primary unit, said method comprising the steps of:
providing a primary unit capable of selectively operating in a detection mode, an identification mode, and a power supply mode;
detecting presence of an object within proximity of said primary unit during said detection mode, wherein said detection mode includes:
restricting the supply of power to at least a portion of the primary unit;
detecting presence of an object within proximity of the primary unit;
in dependence upon said detecting, either staying in said detection mode or entering said identification mode;
identifying said object during said identification mode, wherein said identification mode includes:
identifying whether said detected object is a valid secondary device;
upon identifying a valid secondary device entering said power supply mode;
upon failing to identify a valid secondary device entering said detection mode;
supplying power wirelessly to the secondary device during said power supply mode, wherein said power supply mode includes:
supplying power to said primary unit at a higher level than during said detection mode, said higher level of power sufficient for said primary unit to function as a wireless power supply; and
wherein said primary unit uses power from different power sources during detection mode and said power supply mode.

50. A method for reducing power consumption in a primary unit capable of transferring power to a secondary device, said secondary device separable from said primary unit, said method comprising the steps of:
providing a primary unit capable of selectively operating in a detection mode, an identification mode, and a power supply mode, detecting presence of an object within proximity of said primary unit during said detection mode, wherein said detection mode includes:
restricting the supply of power to at least a portion of the primary unit;
detecting presence of an object within proximity of the primary unit;
in dependence upon said detecting, either staying in said detection mode or entering said identification mode;
identifying said object during said identification mode, wherein said identification mode includes:
identifying whether said detected object is a valid secondary device;

upon identifying a valid secondary device entering said power supply mode;

upon failing to identify a valid secondary device entering said detection mode;

supplying power wirelessly to the secondary device during said power supply mode, wherein said power supply mode includes:

supplying power to said primary unit at a higher level than during said detection mode, said higher level of power sufficient for said primary unit to function as a wireless power supply; and wherein during said detection mode power said primary unit uses power from an energy storage element;

and said power supply mode includes recharging said energy storage element.

51. A method for reducing power consumption in a primary unit capable of transferring power to a secondary device, said secondary device separable from said primary unit, said method comprising the steps of:

providing a primary unit capable of selectively operating in a detection mode, an identification mode, and a power supply mode;

detecting presence of an object within proximity of said primary unit during said detection mode, wherein said detection mode includes:

restricting the supply of power to at least a portion of the primary unit;

detecting presence of an object within proximity of the primary unit;

in dependence upon said detecting, either staying in said detection mode or entering said identification mode;

identifying said object during said identification mode, wherein said identification mode includes:

identifying whether said detected object is a valid secondary device;

upon identifying a valid secondary device entering said power supply mode;

upon failing to identify a valid secondary device entering said detection mode;

supplying power wirelessly to the secondary device during said power supply mode, wherein said power supply mode includes:

supplying power to said primary unit at a higher level than during said detection mode, said higher level of power sufficient for said primary unit to function as a wireless power supply; and wherein during said detection mode said primary unit uses power from an energy storage element.

* * * * *